United States Patent
Benitez et al.

(10) Patent No.: US 10,432,920 B2
(45) Date of Patent: Oct. 1, 2019

(54) IMMERSIVE COMPACT DISPLAY GLASSES

(71) Applicant: TESSELAND LLC, Glendale, CA (US)

(72) Inventors: Pablo Benitez, Madrid (ES); Juan Carlos Minano, Madrid (ES)

(73) Assignee: TESSELAND, LLC, Glendale, CA (US)

( * ) Notice: Subject to any disclaimer, the term of this patent is extended or adjusted under 35 U.S.C. 154(b) by 550 days.

(21) Appl. No.: 15/038,956

(22) PCT Filed: Nov. 24, 2014

(86) PCT No.: PCT/US2014/067149
§ 371 (c)(1),
(2) Date: May 24, 2016

(87) PCT Pub. No.: WO2015/077718
PCT Pub. Date: May 28, 2015

(65) Prior Publication Data
US 2017/0171533 A1    Jun. 15, 2017

Related U.S. Application Data

(60) Provisional application No. 61/908,335, filed on Nov. 25, 2013, provisional application No. 62/022,878, filed on Jul. 10, 2014.

(51) Int. Cl.
*H04N 13/04*   (2006.01)
*H04N 13/344*  (2018.01)
(Continued)

(52) U.S. Cl.
CPC ......... *H04N 13/344* (2018.05); *G02B 3/0037* (2013.01); *G02B 27/0012* (2013.01);
(Continued)

(58) Field of Classification Search
CPC .................. H04N 13/044; H04N 13/0497
See application file for complete search history.

(56) References Cited

U.S. PATENT DOCUMENTS

| 7,992,996 B2 | 8/2011 | Sugihara et al. |
| 8,317,321 B2 | 11/2012 | Haddock et al. |

(Continued)

FOREIGN PATENT DOCUMENTS

| JP | 2011053353 A | 3/2011 |
| JP | 2013044896 A | 3/2013 |

OTHER PUBLICATIONS

International Search Report of International Application No. PCT/US2014/067149, dated Mar. 20, 2015.
(Continued)

*Primary Examiner* — William C Vaughn, Jr.
*Assistant Examiner* — Jerry T Jean Baptiste
(74) *Attorney, Agent, or Firm* — Drinker Biddle & Reath LLP

(57) ABSTRACT

A display generates a real image of object pixels, from which an optical system with lenslets generates an immersive virtual image of image pixels, by each lenslet projecting light from the display to a respective pupil range on an imaginary eyeball subtending 15 degrees whole angle at the center of the eyeball. Object pixels are in clusters, each associated with a lenslet that produces from the object pixels a partial virtual image. The partial virtual images combine to form the immersive virtual image. Imaging light rays on the pupil range via a given lenslet come from the associated cluster. Imaging light rays falling on the pupil range from a given cluster pass through the associated lenslet. Imaging light rays exiting a given lenslet towards the pupil range from one image pixel of the immersive virtual image are from a single object pixel of the associated cluster.

23 Claims, 38 Drawing Sheets

(51) Int. Cl.
*H04N 13/383* (2018.01)
*H04N 13/398* (2018.01)
*G02B 27/22* (2018.01)
*G02B 3/00* (2006.01)
*G02B 27/01* (2006.01)
*G02B 27/00* (2006.01)

(52) U.S. Cl.
CPC ..... *G02B 27/0172* (2013.01); *G02B 27/2214* (2013.01); *H04N 13/383* (2018.05); *H04N 13/398* (2018.05); *G02B 2027/0123* (2013.01)

(56) References Cited

U.S. PATENT DOCUMENTS

| | | | | |
|---|---|---|---|---|
| 9,454,007 | B1* | 9/2016 | Smith | G02B 27/0172 |
| 2004/0108971 | A1 | 6/2004 | Waldern et al. | |
| 2005/0104802 | A1* | 5/2005 | Hebert | G02B 27/017 |
| | | | | 345/7 |
| 2006/0132381 | A1* | 6/2006 | Takayama | G02B 27/017 |
| | | | | 345/7 |
| 2007/0001954 | A1* | 1/2007 | Shishido | G09G 3/3233 |
| | | | | 345/89 |
| 2007/0279344 | A1* | 12/2007 | Kimura | G09G 3/2022 |
| | | | | 345/77 |
| 2010/0056274 | A1 | 3/2010 | Uusitalo et al. | |
| 2011/0254932 | A1* | 10/2011 | Doung | H04N 13/341 |
| | | | | 348/56 |
| 2014/0266990 | A1 | 9/2014 | Makino et al. | |
| 2015/0015814 | A1* | 1/2015 | Qin | G02B 27/2214 |
| | | | | 349/13 |

OTHER PUBLICATIONS

Written Opinion of the International Searching Authority of International Application No. PCT/US2014/067149, dated Mar. 20, 2015.

Official Action dated Sep. 4, 2018 in corresponding Japanese Appl. No. 2016-554821.

* cited by examiner

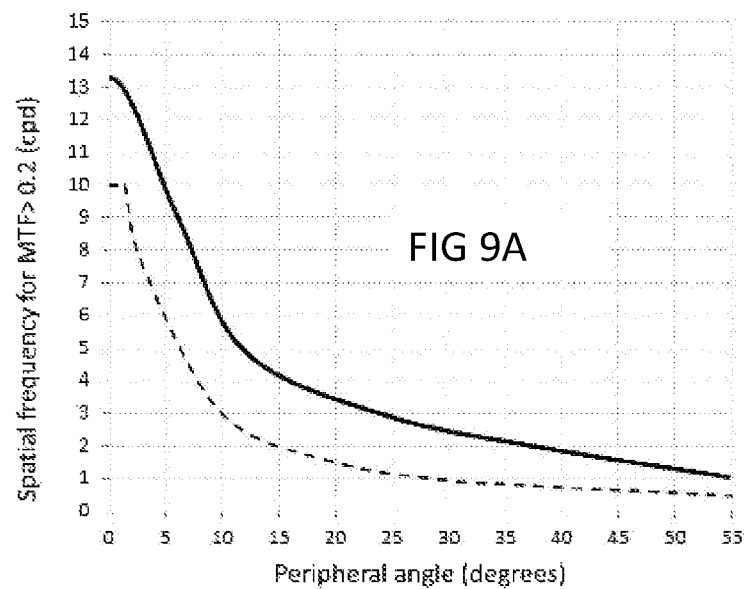
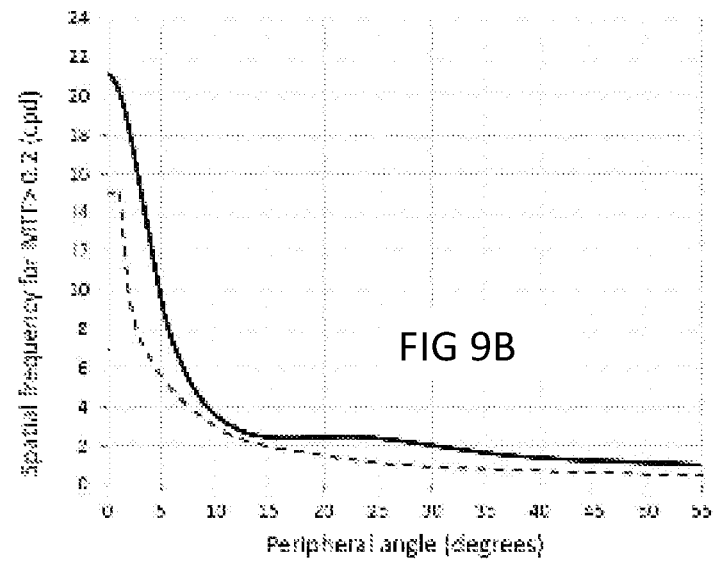

IMMERSIVE COMPACT DISPLAY GLASSES

CROSS REFERENCE TO RELATED APPLICATIONS

This application is a U.S. regional stage of international patent application no. PCT/US 2015/067149, filed on 24 Nov. 2014, publication no. WO 2015/077718. This application claims benefit of commonly invented and assigned U.S. Provisional Patent Applications No. 61/908,335, filed on 25 Nov. 2013, and No. 62/022,878 filed on 10 Jul. 2014, both for "Immersive Compact Display Glasses." Both of those applications are incorporated herein by reference in their entirety.

FIELD OF THE INVENTION

The application relates to visual displays, and especially to head-mounted display technology.

BACKGROUND

References Cited

U.S. Pat. No. 5,161,057 K. C. Johnson
U.S. Pat. No. 5,822,021 Johnson et al.
U.S. Pat. No. 6,529,331 R. W. Massof
U.S. Pat. No. 6,639,733 Miñano et al
U.S. Pat. No. 7,163,332 T. Shuimizu et al.
U.S. Pat. No. 7,460,985 Benítez et al.
U.S. Pat. No. 7,667,783 Q. I. Hong
US 2004/0108971 M. Popovich
US 2011/0304825 A1 M. Sieler et al
WO 2012/055824 M. S. Griffith
http://pabloartal.blogspot.com.es/2013/09/more-on-kappa-angle-of-human-eye.html ("Artal").
G. Belay et al., Design of a multichannel, multiresolution smart imaging system, Appl. Opt. 51, 4810-4817 (2012).
A. Brückner, J. Duparre, P. Dannberg, A. Brauer, and C. Hoffmann, *Ultra-compact vision system for automotive applications*, in "Proc. 4th EOS Topical Meeting on Advanced Imaging Techniques," (Jena, Germany, 2009), pp. 166-167.
A. Brückner et al., *Thin wafer-level camera lenses inspired by insect compound eyes*, Opt. Exp. Vol. 18, no. 14 (2010)
A. Brückner, "Microoptical Multi Aperture Imaging System" Ph.D. Thesis dissertation Friedrich Schiller University, Jena, Germany, 2011 http://www.db-thueringen.de/servlets/DerivateServlet/Derivate-24992/br%C3%BCckner/dissertation_a_brueckner_Multi_Aperture_Imaging_Systems_2011_12_22.pdf ("Brückner 2011")
http://dea.brunel.ac.uk/3dvivant/assets/documents/WP6%203DVIVANT%20D6.5.pdf
D. Cheng et al., *Design of a wide-angle, lightweight head-mounted display using free form optics tiling*, Opt. Lett. 36, 2098-2100 (2011)
D. Dumas et al., *Curved focal plane detector array for wide field cameras*, Applied Optics, Vol. 51, No. 22, 1 Aug. 2012 ("Dumas")
J. Duparré and R. Völkel, *Novel Optics/Micro Optics for Miniature Imaging Systems*, Proc. SPIE 6196, Photonics in Multimedia, 619607 (Apr. 21, 2006); doi:10.1117/12.662757 ("Duparré")
G. Forbes, *Shape specification for axially symmetric optical surfaces*, Optics Express, Vol. 15, Issue 8, pp. 5218-5226 (2007)
G. Forbes, *Characterizing the shape of freeform optics*, Optics Express, Vol. 20, Issue 3, pp. 2483-2499, (2012) ("Forbes 2012")
J. L. Kerr, *Visual resolution in the periphery*, Perception & Psychophysics, 1971, Vol. 9 (3B) ("Kerr")
Douglas Lanman, David Luebke, Near-Eye Light Field Displays, ACM SIGGRAPH 2013 Emerging Technologies, July 2013
J. E. Melzer, *Overcoming the Field of View: Resolution Invariant in Head Mounted Displays*, SPIE Vol. 3362, 1998
Donald C. O'Shea, Thomas J. Suleski, Alan D. Kathman, Dennis W. Prather, *Diffractive Optics: Design, Fabrication, and Test*, ISBN: 978-0819451712 ("O'Shea");
V. Soifer, *Computer design of diffractive optics*, (Woodhead Publishing Series in Electronic and Optical Materials) 2012, ISBN: 978-1845696351 ("Soifer").
D. J. Struik, *Lectures on Classical Differential Geometry*, Dover, 2012
T. Tsujimura, *OLED displays: Fundamentals and Applications*, Wiley, 2012
Hongen Tu, Yong Xu, *A silicon-on-insulator complementary-metal-oxide-semiconductor compatible flexible electronics technology*, Appl. Phys. Lett. 101, 052106 (2012); http://dx.doi.org/10.1063/1.4739937 ("Tu")
G. D. Wasserman and E. Wolf, *On the theory of aplanatic aspheric systems*, Proc. Phys. Soc. B 62: 2 (1949) ("Wasserman")
R. Winston, J. C. Miñano, and P. Benítez, *Nonimaging optics*, New York: Elsevier-Academic Press, 2005 ("Winston").

Definitions

| | |
|---|---|
| cluster | Set of active opixels that illuminates the pupil range through a given lenslet. The number of clusters coincides with that of lenslets. |
| digital display | Electronic component that modulates the light spatially, which can be self-emitting as an OLED display or externally illuminated by a front or a backlight system as an LCD or an LCOS. |
| eye pupil | Image of the interior iris edge through the eye cornea seen from the exterior of the eye. In visual optics, it is referenced to as the input pupil of the optical system of the eye. Its boundary is typically a circle from 3 to 7 mm diameter depending on the illumination level. |
| eye sphere | Sphere centered at the approximate center of the eye rotations and with radius the average distance of the eye pupil to that center (typically 13 mm). |
| field of view | Field of View; defined as the horizontal and vertical full angles subtended by the virtual screen from the eye pupil center when the two eyes rest looking frontwards. |
| fixation point | Point of the scene that is imaged by the eye at center of the fovea, which is the highest resolution area of the retina. |
| gaze vector | Unit vector of the direction linking the center of the eye pupil and the fixation point. |

-continued

| | |
|---|---|
| gazed region of virtual screen | Region of the virtual screen containing the fixation points for all positions of the eye pupil within the union of the pupil ranges. It contains all the ipixels that can be gazed. |
| guard | Corridor between adjacent clusters of the digital display that contains inactive opixels. The guard avoids optical cross-talk while guaranteeing certain tolerance for the optics positioning. |
| human angular resolution | Minimum angle subtended by two point sources which are distinguishable by an average perfect-vision human eye. The angular resolution is a function of the peripheral angle and of the illumination level. |
| inactive area | Region of the digital display in which the opixels are inactive. |
| ipixel | Virtual image of the opixels belonging to the same web. Preferably, this virtual image is formed at a certain distance from the eye (from 2 m to infinity). It can also be considered as the pixel of the virtual screen seen by the eye. |
| ipixel-to-pupil print | Region of the surface S2 crossed by rays linking the eye pupil and an ipixel. This region depends on the particular ipixel, the eye pupil diameter, the surface S2 and the gaze vector. |
| lenslet | Each one of the individual lenses of the optics array, which collects light from the digital display and projects it to the eye sphere. The lenslet is designed to form an image of opixels into ipixels. Each lenslet may be formed by one or more optical surfaces. There is one lenslet per cluster. |
| main chief ray | Ray passing through the center of the exit pupil aperture of a lenslet towards the center of the eye pupil when the eye pupil is positioned so the angle between the gaze vector and that ray is a minimum among all possible positions within the pupil range of that lenslet. |
| opixel | Physical pixel of the digital display. There are active opixels, which are lit to contribute to the displayed image, and inactive opixels, which are never lit. An inactive opixel can be physically nonexistent, for instance, because the display lacks at that opixel position at least one necessary hardware element (OLED material, electrical connection) to make it functional, or it can be unaddressed by software. The use of inactive opixels reduces the power consumption and the amount of information to be managed. |
| optical cross-talk | Undesired situation in which one opixel is imaged into more than one ipixel. |
| outer region of virtual screen | Region of the virtual screen formed by the ipixels which do not belong to the gazed region of virtual screen, i.e., it is formed by ipixels that can be seen only at peripheral angles greater than zero. |
| peripheral angle | Angle formed by a certain direction and the gaze vector. |
| PoF | Plane of Focus; plane on the virtual screen space of sharpest focus around the chief ray for a given lenslet. |
| popixel | Also called preferential opixel. There is a popixel for every ipixel. The popixel is the opixel that is found by tracing backwards the ray passing from the center of the eye pupil and the center of the ipixel when the eye pupil is located so the angle between the gaze vector and that ray is a minimum. When the ipixel belongs to the gazed region of virtual screen this angle is zero and thus the ipixel is being gazed. When the ipixel belongs to the outer region of virtual screen the eye pupil will be located at the edge of the union of all pupil ranges. |
| pupil range | 1. Region of the eye sphere illuminated by a single cluster through its corresponding lenslet. When the eye pupil intersects the pupil range of a given lenslet, then the image corresponding to its corresponding cluster is projected on the retina. For a practical immersive design, a pupil range comprising a circle of 15 degrees full angle on the eye sphere is sufficient. 2. The union of all pupil ranges corresponding to all lenslets of the array. It is a spherical shell to a good approximation. If all accessible eye pupil positions for an average human are considered, the boundary of the union of eye pupil ranges is approximately an ellipse with angular horizontal semi-axis of 60 degs and vertical semi-axis of 45 degs relative to the front direction. |
| surface S1 | Refractive surface of the lenslet array that is closer to the digital display. |
| surface S2 | Refractive surface of the lenslet array which is closer to the eye. |
| virtual screen | Surface containing the ipixels, preferably being a region of the surface of a sphere concentric with the eye and with radius in the range from 2 m to infinity. |
| web | Set of active opixels displaying always the same information and that may be electrically interconnected so all of them turn on and off always at once. All of them correspond to the same ipixel. |

Design Rules

| | |
|---|---|
| R1 | There is a one-to-one correspondence between webs and ipixels, and the lenslets are designed to image all the opixels of every web into its corresponding ipixel. |
| R2 | The intersection of any two clusters is the empty set and the union of all clusters plus the inactive area is the whole digital display. |
| R3 | The intersection of any two webs is the empty set and the union of all webs plus the inactive area is the whole digital display. This implies that every active opixel is to be imaged onto a single ipixel. |
| R4 | Every active opixel belongs to a single cluster and to a single web. This is not an independent rule but a consequence of R1 and R2. |
| R5 | The opixels of clusters are adjacent one to another, the clusters are topologically connected sets. |
| R6 | Every opixel of a web belongs to a different cluster, and thus no two adjacent opixels belong to the same web. Therefore, the webs are topologically disconnected sets that tessellate the digital display |
| R7 | If an inactive opixel were lit, its light rays would impinge on the eye sphere outside the pupil range |
| R8 | When an active opixel is lit, a substantial fraction its lit rays impinge on the eye sphere inside the pupil range of its cluster's lenslet. |

State of the Art

Head mounted display technology is a rapidly developing area. One aspect of head mounted display technology provides a full immersive visual environment (which can be described as virtual reality), such that the user only observes the images provided by one or more displays, while the outside environment is visually blocked. These devices have application in areas such as entertainment, gaming, military, medicine and industry.

A head mounted display consists typically in one or two displays, their corresponding optical systems, which image the displays into a virtual screen to be visualized by the user's eye, and a helmet that visually blocks the external environment and provides structural support to the mentioned components. The display may also have a pupil tracker and/or a head tracker, such that the image provided by the display changes according to the user's movement.

An ideal head mounted display combines a high resolution, a large field of view, a low and well-distributed weight, and a structure with small dimensions. Although some technologies successfully achieve these desired features individually, so far no known technology has been able to combine all of them. That results in an incomplete or even uncomfortable experience for the user. Problems may include a low degree of realism and eye strain (low resolution or optics imaging quality), failure to create an immersive environment (small field of view), or excessive pressure on the user's head (excessive weight).

One approach used to increase the field of view while maintaining a high resolution is tiling, i.e., using multiple displays per eye arranged in a mosaic pattern, and not in the same plane. That approach is presented in the reference: J. E. Melzer, "Overcoming the Field of View: Resolution Invariant in Head Mounted Displays", SPIE Vol. 3362, 1998, or D. Cheng et al., "Design of a wide-angle, lightweight head-mounted display using free-form optics tiling," Opt. Lett. 36, 2098-2100 (2011). The U.S. Pat. No. 6,529,331 B2 also presents this solution, for focal distances around 22 mm. In contrast to that prior system, in the presently disclosed devices, a single display per eye is used.

WO 2012/055824 discloses the use of a single spherical display and an optical system with a liquid lenslet array, which, with its smaller focal length of each of the lenslets, allows for a compact design. However, this technology uses lenslets of high f-number (they recommend f/15 in page 24, line 15) which does not allow for the free movement of the eye pupil since the effect of optical cross-talk between different lenslets appears, hence creating ghost images. In that patent application, the problem is addressed by using a pupil tracker to detect the position of the pupil and activating only certain pixels of the spherical display, thus increasing the complexity, cost and weight of the device.

In US 2004/0108971 also an array of switchable holographic lenslets is disclosed to produce a compact device, either using one spherical display, one flat display or an assembly of five flat displays tiled in a polyhedral configuration. In that patent application, the difficulty of addressing the high amount of information to be displayed is discussed, but the solution proposed is based (as in WO 2012/055824) on the use of an eye-tracker to change in real time the switchable lenslets and the information on the display, presenting high resolution only where the eye is gazing (referred to as Area Of Interest in US 2004/0108971) and even correcting the geometric distortion.

U.S. Pat. No. 7,667,783 discloses an array of tunable liquid crystal lenslets with a flat or cylindrical display. However, in that earlier patent the lenslets have a very low fill factor, which will necessarily create artifacts visible to the user. Additionally, it uses a black mask to prevent optical cross-talk, which is an element that the presently disclosed devices do not require. In order to correct the imaging quality of the further lenslets in the cylinder rims, that patent discloses a bias lens. The bias lens is drawn as a continuous lens (FIG. 2 of U.S. Pat. No. 7,667,783), which would be necessarily non-compact, or as an additional lenslet array (FIG. 8 of U.S. Pat. No. 7,667,783), whose schematic drawing is wrong, since to produce the indicated deflection the lenslet should be prismatic type, not as shown therein. In both cases, there is no reference to how to correct the additional power, field of curvature and astigmatism of said lenses.

Lenslet arrays have found considerable applications in virtual machine sensors, in the field of multi-aperture cameras. They have capacity of increasing the field of view of the overall system while using a small focal length, which provides compactness. There are two major approaches to lenslet array based sensors inspired by insect eyes: (1) apposition systems and (2) superposition systems. The superposition systems use several neighboring lenses to illuminate a single sensor area, forming a single real image of the environment. It has therefore little connection to the present application.

There are several subtypes of apposition multi-aperture camera systems, the best known being the ones using only one pixel per optical channel, i.e. per lenslet, while in the present disclosure there is a multiplicity of pixels per optical channel. An example of this apposition lenslet array system can be found in A. Brückner, "Microoptical Multi Aperture Imaging System" Ph.D. Thesis dissertation Friedrich Schiller University, Jena, Germany, 2011, page 28. Another example is found in J. Duparré and R. Völkel, "Novel Optics/Micro-Optics for Miniature Imaging Systems", Proc. SPIE 6196, Photonics in Multimedia, 619607 (Apr. 21, 2006); doi:10.1117/12.662757, in which also single sided toroidal lenslets for correcting the astigmatism are disclosed.

A second type of apposition multi-aperture camera system uses optical stitching, where each optical channel transfers its related part of the FOV and where adjacent partial images are optically stitched together in a way that the image details at the intersections between adjacent partial images are preserved. An example can be found in the Optical Cluster Eye in Brückner 2011, page 75. In Brückner's system, each optical channel captures a non-overlapping part of the FOV and uses four lenslets, with masks to avoid crosstalk. This contrasts with the presently disclosed devices, where the FOV captured by each optical channel overlaps with others, and does not require masks to avoid crosstalk.

A third type of apposition multi-aperture camera systems uses electronic stitching of segments. In A. Brückner et al., "Thin wafer-level camera lenses inspired by insect compound eyes", Opt. Exp. Vol. 18, no. 14 (2010), a system using a multichannel approach is used such that in each channel, only part of the whole FOV is recorded and a final image is created by stitching all the partial images by means of software processing (FIG. 1). In multi-aperture cameras with electronic stitching, the pitch of the lenslets is always greater than the pitch of their illuminated sectors in the sensor to widen its field of view and minimize the sensor area. This implies that the input pupil of the camera is virtual, located behind the sensor, and its position and shape are not relevant and are not taken into account in the design. This contrasts with the present disclosure, in which the pupil range is real instead of virtual, and its position and shape are specifications of the optical design. Moreover, the definition of the pupil range allows us to avoid the optical crosstalk between each pair of lenslets without the use of shields, while multi-aperture cameras include several shields to avoid crosstalk. Electronic stitching can also be used to increase the resolution of a specific portion of the field of view, through different optical channels with different angular resolution and field of view, which allows saving resources and has a number of applications. A good example of this last approach can be found in G. Belay et al., "Design of a multichannel, multi-resolution smart imaging system," Appl. Opt. 51, 4810-4817 (2012).

Another prior art approach to multi-aperture cameras is given in the same reference of A. Brückner et al, "Thin wafer-level camera lenses inspired by insect compound eyes", Opt. Exp. Vol. 18, no. 14 (2010), page 24384 (and also in Brückner 2011, page 38) where it is referred to as "increased sampling". As presented in FIG. 2, the partial images of each adjacent pair of lenslets are "braided" to enable a higher resolution for a lower focal length, and focused into the sensor through sectors of pixels. The braiding described by Brückner eliminates completely the redundancy in the sensor-to-field mapping, that is, there is a bijective (i.e. point to point) mapping between the pixels in the sensors (called opixels herein) and the pixels in the field (called ipixels herein).

In contrast, in the embodiments described in the present application, there is always redundancy, even when resolution is augmented in our interlacing embodiments, that is, we use a surjective (i.e. more-than-one-to-one) mapping between the digital display pixels (opixels) and the screen pixels (ipixels). This redundancy is intrinsically used to make all the pixels on the screen visible wherever the eye pupil is positioned within its designed pupil range, while in Brückner's system there is neither need for nor reference to such considerations.

Additionally, in multi-aperture cameras such as those in the cited references, all the pixels of the sensor are considered of equal relevance, and the imaging quality of the lenslets is equalized and balanced inside each sector, especially when braiding is used. On the contrary, embodiments of the present optical designs are unbalanced to optimize their degrees of freedom to image better the opixels whose image will be directly gazed by the eye (which will be focused on the fovea, where the human angular resolution is much higher), while the image quality corresponding to our peripheral vision is relaxed.

Recently, the company NVIDIA has shown a Near-To-Eye (NTE) light field display prototype [Douglas Lanman, David Luebke, "Near-Eye Light Field Displays" ACM SIGGRAPH 2013 Emerging Technologies, July 2013]. The NVIDIA NTE light field display is basically formed by an array of lenslets and a digital display device (plus additional mechanics and electronics components) where the image to be imaged on the retina is decomposed in small cluster images (one per lenslet). The lenslets of the NVIDIA NTE light field display are identical (identical meaning that any lenslet can be obtained by copying an original one with a simple translation rigid movement) and the digital display is flat. In the present embodiments either identical lenslets are only used together with a Fresnel lens or the lenslets differ in something else than a simple translation motion as in the spherical digital display where at least one rotation is needed to generate a lenslet by copying an original one. Additionally, the opixel-to-ipixel mapping in the NVIDIA NTE light field display (see section 6.6) is done as in a light field display with the purpose to solve accommodation-convergence conflict, using multiple virtual screen surfaces. This means that opixels are devoted to generating the light field that allows accommodation at expense of a lower resolution image, or in other words, ipixels at different distances from the eye are to be generated and for this purpose more opixels are needed than in the case of virtual screen surface. This is further discussed in V. F. Pamplona et al., "Tailored Displays to Compensate for Visual Aberrations", ACM Transactions on Graphics, Vol. 31, No. 4, Article 81, July 2012, wherein it is disclosed that in order to minimize the blurring caused to provide accommodation, lenslet pitch below 200 microns is recommended. In the present embodiments, the opixel-to-ipixel mapping is optimized for high resolution, with a single virtual screen surface, which does not allow for accommodation, and the pitch of our lenslets is preferably in the 0.5 to 20 mm range.

Another use for lenslet arrays is projection displays. US 2011/0304825 A1 discloses a projection display, where each lenslet projects light into the entire area of the real screen, and the image is formed by superposition of all the projections, with no need to design a pupil range, as occurs in multi-aperture imaging cameras. In contrast, in the embodiments disclosed herein, each lenslet only projects a fraction of the field of view overlapped with the adjacent ones and the image on the virtual screen is created by stitching each segment of the image, illuminating the pupil range within which the eye pupil will move.

Recently, a lenslet array based 3D holoscopic monitor was presented in the 3D Vivant project (http://dea.brunel.ac.uk/3dvivant/assets/documents/WP6%203DVIVANT%20D6.5.pdf). That system, after an image is captured and represented entirely by a planar intensity distribution using a multi-aperture camera, uses a lenslet array on top of a display to project the planar intensity distributions to create a 3D holoscopic image. That system uses an only one display LCD panel and cylindrical lenslet array to create unidirectional 3D holoscopic images for both eyes of the user, unlike the present embodiments, which use revolution or freeform lenses and one display for each eye. That earlier device uses the lenslet array and LCD display projection to create a real image between the user's eyes and the display, which limits the compactness of the system, since the normal eye does not focus at distance closer than 250 mm. That is opposite to the present embodiments, which create a virtual image that is not located in between the eye and the display, but beyond the display, allowing a very compact design. The earlier device also uses a pinhole array, which the present embodiments do not use.

Additionally, there are several interesting features that are unique in embodiments of the present disclosure and that can provide a significant improvement with respect to the state of the art, which include:

The use of freeform surfaces in the lenslet arrays to provide high image quality over a very wide FOV for a cylindrical or a flat digital display.

The design of the lenslets using a specified pupil range without optical cross-talk to allow for natural eye movement in which the imaging quality of the lenslets is adapted to the human angular resolution.

The design of large freeform lenslets from 2-fold to 9-fold configurations.

The organization of the opixel of the digital display in inactive and active opixels for minimum power consumption adapted to the pupil range.

The massive parallel addressing of the opixels of the digital display via the concept of webs and its combination with the adaptation to the human angular resolution.

SUMMARY

On embodiment provides a display device comprising a display, operable to generate a real image comprising a plurality of object pixels, and an optical system, comprising an array of a plurality of lenslets, arranged to generate an immersive virtual image from the real image, the immersive virtual image comprising a plurality of image pixels, by each lenslet projecting light from the display to a respective pupil range, wherein the pupil range comprises an area on the surface of an imaginary sphere of from 21 to 27 mm diameter, the pupil range including a circle subtending 15 degrees whole angle at the center of the sphere. The object pixels are grouped into clusters, each cluster associated with a lenslet, so that the lenslet produces from the object pixels a partial virtual image comprising image pixels, and the partial virtual images combine to form said immersive virtual image. Substantially all imaging light rays falling on said pupil range through a given lenslet come from pixels of the associated cluster, and substantially all such imaging light rays falling on the pupil range from object pixels of a given cluster pass through the associated lenslet. Substantially all such imaging light rays exiting a given lenslet towards the pupil range and virtually coming from any one image pixel of the immersive virtual image are generated from a single object pixel of the associated cluster.

The array may be placed at a distance from the imaginary sphere between 5 and 40 mm, preferably between 10 and 20 mm, the array subtending a solid angle from the closest point of the imaginary sphere comprising a cone with 40 degs, preferably 50 degs, whole angle, with the display on a side of the array remote from the imaginary sphere, at a distance from the array of no more than 80 mm, preferably no more than 40 mm.

The lenslets may comprise at least two lenslets that cannot be made to coincide by a simple translation rigid motion.

The partial virtual images combined to form said immersive virtual image may be interlaced.

The rays directed towards the pupil range and virtually coming from at least one image pixel of the immersive virtual image may be generated from a plurality of object pixels, each of which object pixels belong to different clusters. The rays directed towards the pupil range and virtually coming from more than 10% of the image pixels of the immersive virtual image may then be generated from a plurality of object pixels, each of which object pixels belong to different clusters. The object pixels generating the rays towards the pupil range and virtually coming from any one image pixel of the virtual image may then be operated as a respective web, wherein all the object pixels of one web are caused to display the same information, thus ensuring that the same image is projected into the entire pupil range. The object pixels belonging to any one web may then be electrically connected together in series or parallel, or a display driver may address the object pixels belonging to any one web with the same information to display.

At least some of the lenslets may be freeform.

At least one lenslet aperture may enclose a 2 mm diameter circle.

The virtual image may be consistent as seen from all positions within the pupil range, without adjustment responsive to pupil tracking.

The display may be part of a spherical shell, concentric with the aforementioned imaginary sphere, the lenslet array may then be formed by lenslets all of them lying on another spherical shell concentric with the display, and the lenslets may be supposable so that the overlapping parts of their optically active surfaces coincide. Alternatively, the display may be a cylindrical shell, that cylinder having an axis that passes through the center of the imaginary sphere, the lenslet array may be formed by lenslets all of them lying on another cylindrical shell coaxial with the display, and the optically active surfaces or the lenslets may have cross-sections in planes perpendicular to the axis of the cylinder that are superposable so that the overlapping parts of the optically active surfaces coincide. In another alternative, the display may be flat.

The display device may further comprise a mounting operative to maintain the device in a substantially constant position relative to a normal human head with one eye at the position of the imaginary sphere.

There may be a second said display device, a mounting to position the first and second display devices relative to one another such that the positions of the respective imaginary spheres match the relative positions of the two eyes of a human being, and a display driver operative to cause the two displays to display objects such that the two virtual images combine to form a single image when viewed by a human observer with eyes at the positions of the respective imaginary spheres.

The mounting may be operative to maintain the device in a substantially constant position relative to a human head with the eyes at the positions of the two imaginary spheres.

The mounting may include mounting features to hold corrective lenses in front of users' eyes with a defect of vision.

The displays of the first and second display devices may form a single display.

The display device may be arranged to produce partial virtual images each of which contains a part projected by an eye onto a 1.5 mm fovea of the eye when the eye is at the position of the imaginary sphere with its pupil within the pupil range, and that part of each virtual image may have a higher resolution than a peripheral part.

The display device may further comprise one or more of a sound producing device, and/or a camera and a display driver operative to reproduce on the display an image captured by the camera, or two of either or each to provide stereoscopic sound or vision.

The device may further comprise a head-tracking device and a display driver operative to reproduce on the display an image fixed to the physical ground.

The display device may further comprise a system to adjust the distance from the array of lenslets to the digital display to compensate for interpupillary distance and/or defects of vision of the user.

Another embodiment provides a display device comprising an array of light emitting elements grouped in one or more clusters, wherein first light emitting elements in a peripheral part of at least some clusters are larger than second light emitting elements in a central part of the same cluster.

Another embodiment provides a display device comprising an array of light emitting elements grouped in one or more clusters, wherein in at least some clusters first light emitting elements in a peripheral part of the cluster are connected so as to be activated in groups of contiguous elements, and second light emitting elements in a central part of the cluster are arranged to be activated individually.

The first light emitting elements in a said group of contiguous elements may be wired together so as to be activated by a common electrical signal.

A controller may be programmed to operate the light emitting elements, and may then be programmed to activate the second light emitting elements individually, and to activate the groups of first light emitting elements only as said groups of contiguous elements.

The ratio of the average area of the first light emitting elements to the average area of the second light emitting elements may be in the range from 1.5:1 to 10:1.

The ratio of the area occupied by the first light emitting elements to the area occupied by the second light emitting elements may be in the range of from 1:2 to 2:1.

Another embodiment provides a display device comprising a display, operable to generate a real object image comprising a plurality of object pixels, and a display driver, operable to receive data representing a visual image and to control the display to generate the object image so that clusters of contiguous pixels of the display reproduce overlapping portions of the visual image, pixels of different clusters that display the same pixel of the visual image are linked into a web, and the display driver drives each web as a single entity. The display device may be combined with an array of lenses arranged to generate a virtual image of each cluster of contiguous pixels, so aligned that the virtual images overlap and combine to form a virtual image of the visual image.

BRIEF DESCRIPTION OF DRAWINGS

The above and other aspects, features and advantages will be apparent from the following more particular description of certain embodiments, presented in conjunction with the following drawings. In the drawings:

FIG. 9a and FIG. 9b are graphs of Modulation Transfer Functions (MTF) cut-off frequencies of the present disclosure vs. the peripheral viewing angle.

FIG. 24, show alternative designs for 2 and 4-fold configuration, where the smooth and differentiable surface in 2D is S2 instead of S1 (FIG. 24a) or neither (FIG. 24b).

DETAILED DESCRIPTION

Figure 1:
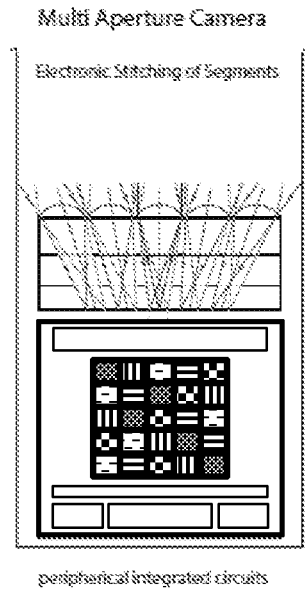
FIG. 1 is an apposition multi-aperture camera (prior art).
Figure 2:
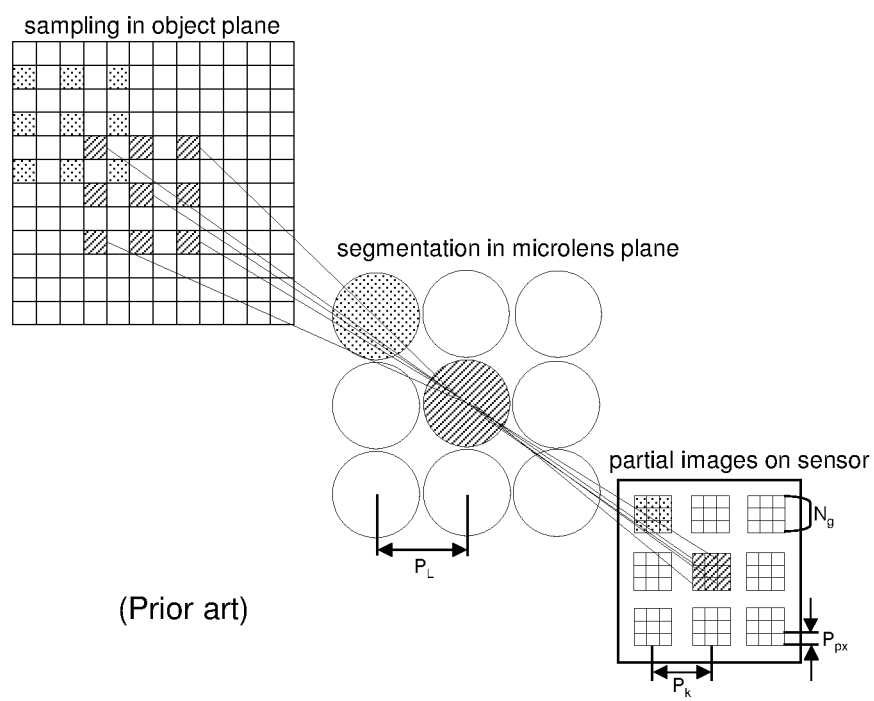
FIG. 2 is a schematic view of a braided multi-aperture camera (prior art).

A better understanding of various features and advantages of the present devices will be obtained by reference to the following detailed description of embodiments thereof and the accompanying drawings, which set forth illustrative embodiments that utilize particular principles of the present disclosure. Although these drawings depict embodiments of the contemplated methods and devices, they should not be construed as foreclosing alternative or equivalent embodiments apparent to those of ordinary skill in the subject art.

The described embodiments are in the area of virtual reality projection devices, in which in general two fixed or moving images are projected on the eyes of a user. The two images are preferably different, to provide stereoscopic visualization of depth. The described embodiments aim to provide simultaneously an ultra-wide field of view, high resolution, low weight, and small volume. The wide field of view, combined with the feedback from a head-tracking sensor to compensate for head movement, can make it possible to present a three-dimensional virtual reality fixed relative to the ground, which will provide a more complete immersive experience.

For an effective immersive experience, the ultra-wide field of view is to be provided independently of the eye pupil orientation relative to the head. This approach considers the pupil range as a design parameter, preferably defined as the region of the eye sphere formed by the union of all the eye pupil regions generated when the eye is moved. It is then a spherical shell in good approximation. If all physically accessible pupil positions for an average human are considered, the boundary of the maximum pupil range is approximately an ellipse with angular horizontal semi-axis of 60 degs and vertical semi-axis of 45 degs relative to the front direction, subtended at the center of rotation of the eye. However, for a practical immersive design, an elliptical cone of semi-axis in the 15 to 30 degrees range can be considered sufficient.

Consider the family of straight lines defined by the gaze vectors when the gaze is at the boundary of the pupil range. This family of straight lines forms a cone whose intersection with the virtual screen is a line that encloses a region of the virtual screen called in this specification the "gazed region of virtual screen". (In the general case, the cone does not have a circular base, but may be approximated to a cone with an elliptical base.) Thus, this region will be directly gazed by the eye. The region of the image surface outside the gazed one is called here the "outer region of virtual screen".

One general principle of this system projects a wide angle (immersive) image to each eye, the system consisting of:
- A display whose exit surface coincides preferably with a plane or a cylinder, and which is composed by a multiplicity of physical pixels called "opixels" which are grouped in "clusters".
- A lenslet array with a multiplicity of unit cells which are not necessarily identical, each one referred to as "lenslet" and associated to a single cluster, so the light that each cluster sends to its associated lenslet is deflected by this lenslet to completely fill the pupil range on the eye surface; said lenslets providing a virtual image composed by ipixels on a virtual screen, preferably spherical, lying at a certain distance from the eye; said virtual image being defined by a mapping from opixels to ipixels in which every opixel is associated to a single ipixel but every ipixel is generally associated to a multiplicity of opixels which form the "web" associated to said ipixel.

Introductory Example

Figure 3:
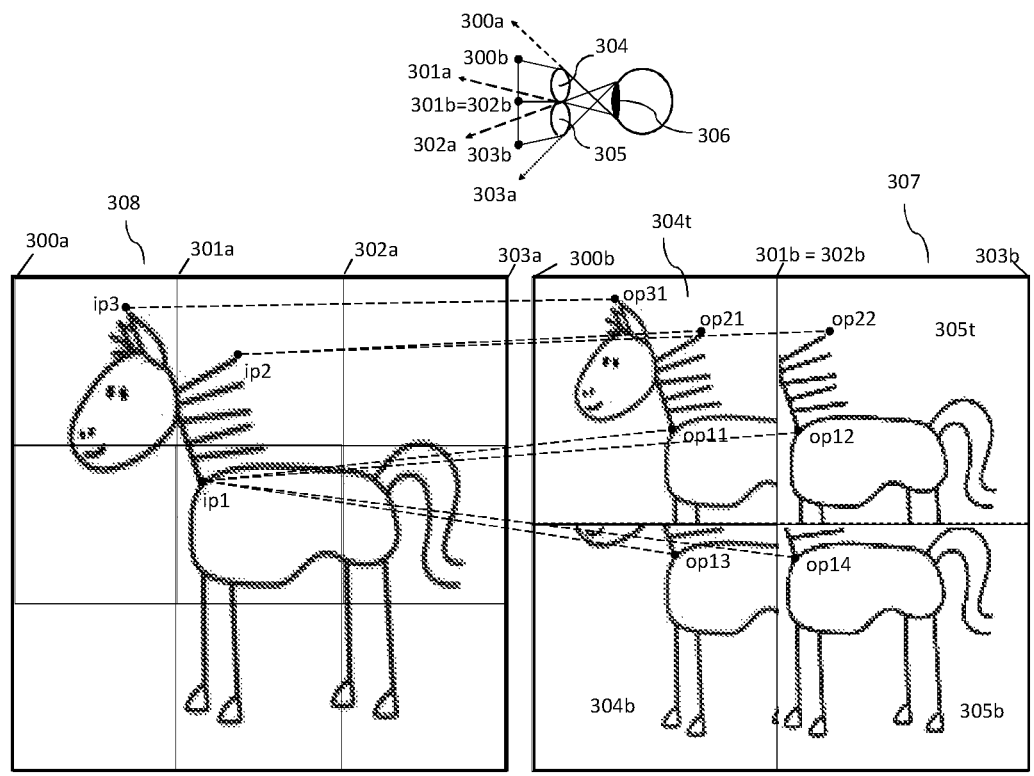
FIG. 3 is a schematic view of ipixels to opixels mapping.

FIG. 3 shows a simple example with only four clusters 304$t$, 304$b$, 305$t$ and 305$b$, which form the compound image created by opixels on the digital display 307. Said opixels are projected by the lenslet array optics to form the image of ipixels on the virtual screen 308 (which for simplicity has been drawn here flat with a rectangular contour). Therefore, every opixel belongs to a single cluster (design rule R4) and the intersection of any two clusters is the empty set and the union of all clusters is the whole digital display (design rule R2).

Each cluster displays a portion of the image on the virtual screen. Adjacent clusters display portions of the image with a certain shift that coincides in the neighboring regions. In order to explain why this is necessary, a two-dimensional schematic drawing has been added on top of the figure. It shows the relevant rays to define the edges of the mapping between opixels and ipixels. In this drawing, the virtual screen with the ipixels is placed at infinity, so the direction of rays 300$a$, 301$a$, 302$a$ and 303$a$ indicates the ipixel positions on the virtual screen. The drawing is two-dimensional for simplicity, but the actual device that projects the image on the bottom left in FIG. 3 is three-dimensional and contains four lenslets, two above and two below, and not only the two shown as 304 and 305 in the schematic drawing on the top of FIG. 3. The two-dimensional scheme is used to explain the horizontal coordinates of the mapping between opixels and ipixels, and an analogous reasoning applies to the vertical coordinates.

The horizontal extent of the virtual screen extends from 300$a$ to 303$a$. The portion of the image represented in the left clusters 304$t$ and 304$b$ is given by the edge rays 300$a$ and 302$a$ reaching the edges of the pupil range 306, which define the vertical lines 300$a$ and 302$a$ on the virtual screen 308. Analogously, the portion of the image of represented in the right clusters 305$t$ and 305$b$ is given by the edge rays 301$a$ and 303$a$, which define two vertical lines on the virtual screen 308. Therefore, the portion of the virtual screen 308 between 301$a$ and 302$a$ will be displayed in both left clusters and right clusters. Specifically, lenslet 304 maps edge rays 300$a$ and 302$a$ of the virtual screen onto 300$b$ and 302$b$ on the digital display 307. Analogously, lenslet 305 maps edge rays 301$a$ and 303$a$ onto 301$b$ and 303$b$ on the digital display 307. The optical design aims to guarantee that the clusters do not overlap (design rule R2), which is achieved with maximum use of the digital display when 301$b$ and 302$b$ coincide. The analogous alignment of top clusters 304$t$, 305$t$ with bottom clusters 304$b$, 305$b$, is apparent from FIG. 3.

Because of the partial coincidence of the information on the clusters, ipixel ip1 is formed by the projection of four opixels, op11, op12, op13 and op14. This set of opixels is referred to as the "web" of ipixel ip1. Webs of ipixels located in the center of the virtual screen, such as ip1, contain four opixels each. However, webs of ipixels close to the boundaries of the virtual screen may have fewer opixels. For instance, the web of ipixel ip2 contains only two opixels, op21 and op22, and the web of ip3 contains only op31.

An important part of the present disclosure is the design of the webs, that is, defining which opixels are lit to create a certain ipixel. That will be defined as a surjective mapping between opixels and ipixels, disclosed in Section 6.8.

Another important part of the present disclosure is the design of the clusters, i.e., defining the opixels that will contribute to illuminate the pupil range through a given lenslet, disclosed in Section 6.3. FIG. 3 is not representative of an actual cluster design, since such design includes the definition of the inactive opixels (which would appear as dark areas in the corners of the clusters in FIG. 3) to minimize, or at least reduce, the information to be managed and the power consumption.

The specific optical design should, as far as practical, guarantee that the quality of vision of the display is acceptable within the pupil range, which implies that the fraction of stray light (that is, light which is not contributing to the image) is below a design threshold. For clarity, descriptions below will refer first to monochrome digital displays, and the disclosure of color digital displays will be detailed later in Section 6.10.

The embodiments in this application can be classified into three groups according to the geometry of the digital display: flat, cylindrical and spherical. A flat digital display is the easiest to manufacture, but the optical system is more complex to design and manufacture. The cylindrical digital display is intermediate, since it can be manufactured flat on a flexible substrate and bent afterwards. Its optical design and manufacturing has an intermediate difficulty. Finally, the spherical digital display is much more difficult to manufacture than flat or cylindrical ones, although there is already some experience as in Dumas, but its optical system is the simplest to design and perhaps also the simplest to manufacture. Therefore, the optics of the spherical case is very adequate to introduce the design concepts that will be further developed in the cylindrical and flat cases.

Webs

Figure 4:
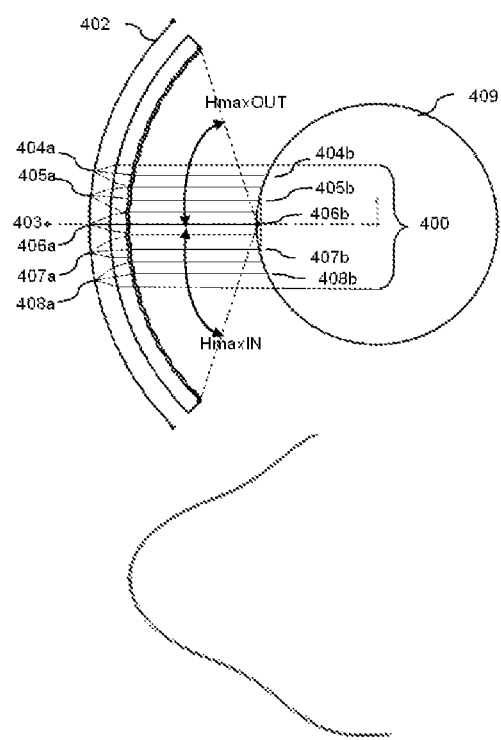
FIG. 4 is a top view schematic of the optical configuration for a cylindrical or spherical embodiment of the present disclosure.

FIG. 4 shows the top view of the horizontal cross section through the eye center when the head is facing frontwards of the spherical digital display that illuminates the left eye 409. This will be used to illustrate some of the basic working principles. The surfaces of all the individual lenslets are generated by rotational symmetry of the cross-sectional profile around an axis passing through the center of the eye (or a point close to it), so all the surfaces are substantially identical (although not their contours, as disclosed in Section 6.3) differing only in a rigid rotation around the eye center.

To be precise, the axes of rotational symmetry should preferably be coincident with the gaze vectors, i.e., with the straight lines linking the center of the eye pupil and the fovea. These straight-lines pass near the center of rotation of the eye, but not exactly through it. The angle formed between the gaze vector and the pupillary axis (line perpendicular to the cornea that intersects the center of the entrance pupil) is called angle kappa. "In average, angle kappa is around 4 degrees horizontally in the temporal direction. However, some eyes are nearly on axis, and even with the kappa angle negative (towards the nasal direction), and in others it can be as large as 8 degrees in the temporal direction. The same variability appears in the vertical direction, ranging from 4 degrees superior to inferior, although in average eyes are vertically centered (kappa angle zero vertically)," Artal. Besides that, there is no true center of eye rotation, because the vertical and horizontal movements have different centers of rotation, 12 mm and 15 mm posterior to the cornea, respectively. This can be approximated to a point at approximately 13 mm posterior to the cornea, in a direction tilted by the kappa angle with respect the papillary axis. We call this point center of the eye sphere. The skilled reader will understand from the descriptions herein how to refine the design to take into account that these straight-lines do not meet exactly at one point.

The angles $H_{maxIN}$ and $H_{maxOUT}$ define the horizontal field of view (FOV) of the eye when the gaze vector points frontwards. In our preferred embodiments $H_{maxIN}$ (towards the nose) is smaller than $H_{maxOUT}$ so the combined left and right eye fields of view cover a total arc of 2 $H_{maxOUT}$, and overlap in the central region in an angular range of $2H_{maxIN}$ for binocular viewing, as naturally occurs in human vision. $H_{maxIN}$ is in the 40-60 deg range while $H_{maxOUT}$ is in the 60-90 deg range to provide a highly immersive experience. Similar angles $V_{maxDOWN}$ and $V_{maxUP}$ define the vertical FOV (not shown in FIG. 4), and are preferably in the ranges $V_{maxUP}$=30-50 degs and $V_{maxDOWN}$=35-55 degs. Therefore, the full FOV would be $2H_{maxOUT} \times (V_{maxUP}+V_{maxDOWN})$, which is 120-180 degs horizontal, 65-105 degs vertical.

By design, the eye pupil is allowed to move within the pupil range 400, and it will be accommodated to focus an image located on the surface of a sphere, which will be referred to as virtual screen. The pixel elements of that virtual image are referred to as "ipixels." The radius of the virtual screen is selected as a design parameter, typically from 2 meters up to infinity (or equivalently, beyond the hyperfocal distance of the eye). As an example, in FIG. 4 that radius is set as infinite, so each ipixel will send parallel rays towards the eye. For instance, ipixel 403 (which, in FIG. 4 is represented by a straight line in the direction of the ipixel), which is located in the frontward direction, sends parallel rays towards the pupil range 400.

In a first embodiment, ipixels such as 403 are created by the superposition of the images of multiple opixels such as 404a, 405a, 406a, 407a and 408a, which belong to different clusters. Each lenslet projects parallel rays parallel to the direction 403 to fill the pupil range 400. Since the pupil range is a surface in three-dimensional space, there are other opixels different from 404a to 408a (outside the cross sectional view in FIG. 4) also contributing to the formation of the ipixel through their corresponding lenslets by filling the pupil range 400 in the three dimensional space. The web associated to the ipixel 403 is the set of opixels, including 404a, 405a, 406a, 407a, and 408a, that jointly project the image of that ipixel. Therefore, every opixel belongs to a single web (design rule R4). The intersection of any two webs is the empty set and the union of all webs is the whole digital display (design rule R3). There are also opixels belonging to the digital display that are inactive and thus not associated with any web, but they are not yet shown in FIG. 4 for simplicity.

If the eye pupil diameter is larger than the lenslet size, the ipixel-to-pupil print will always intersect at least two lenslets, for any eye pupil position within the pupil range 400. Then, the ipixel 403 in FIG. 4, as seen by the eye at any time, will be formed by the superposition of the projected images of at least two opixels of the web. Only if the eye pupil diameter is smaller than the lenslet size, and when the eye pupil is located within the pupil range 400 in positions 404b to 408b, close to the center of the pencil of rays from one lenslet, the ipixel 403 is seen as the projected image of a single one of the opixels 404a to 408a, respectively, through the relevant lenslet. However, even if the eye pupil is smaller than a lenslet, in intermediate positions, the ipixel 403 will still be formed by the superposition on the projected images of at least two opixels of the web.

Figure 5A:
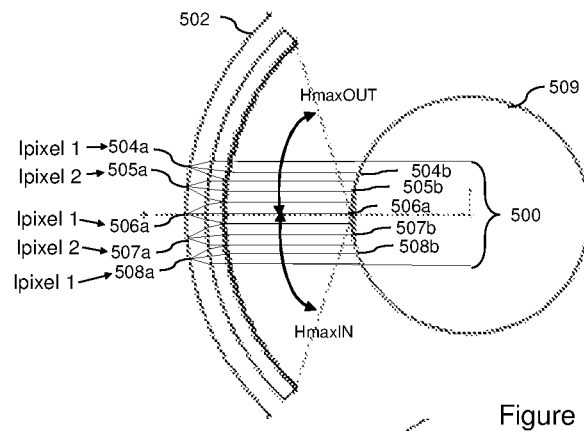
FIG. 5a is a top view schematic of the present disclosure with interlaced opixels.
Figure 5B:
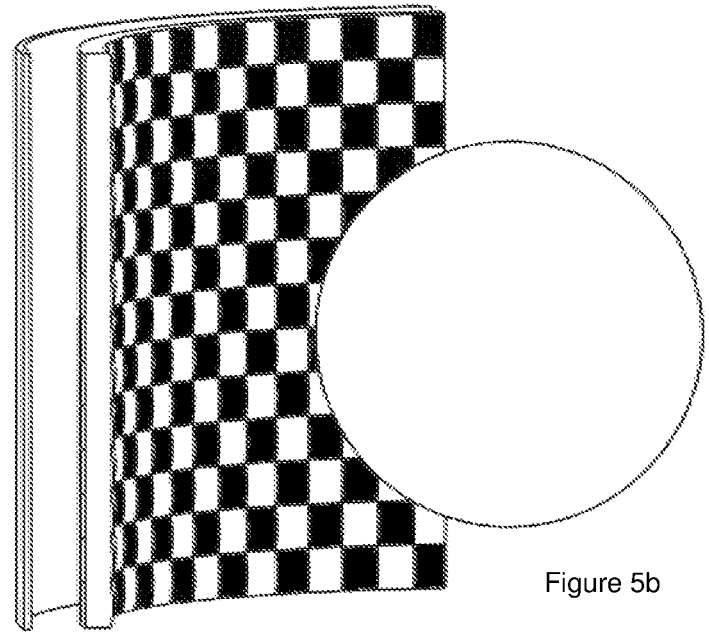
FIG. 5b is an isometric view schematic of the present disclosure with interlaced opixels.

In a second embodiment the resolution is improved, provided that the lenslet size d is smaller the minimum eye pupil diameter D. This second embodiment will be referred to as "interlaced ipixels". Unlike conventional interlaced video the interlaced images here could be more than 2 and not only lines but any ipixel can be interlaced. This ipixel interlacing is similar but light-reversed to Brückner's "increased sampling". However, unlike Brückner's "increased sampling," the interlaced images in the present embodiment are each formed by ipixels some of which contain more than one opixel in their webs. The opixel to ipixel mapping defining the webs is different to the one just described in FIG. 4. While in the first embodiment the lenslets used by the opixels of a given web are adjacent one to another, as the five shown to create ipixel 403 in FIG. 4, in this second embodiment, adjacent lenslets belong in general to different interlaced images and consequently to different webs, each one associated to ipixels adjacent in the virtual screen as ipixel1 and ipixel2 in FIG. 5a. Therefore, while the pitch between lenslets belonging to the same web coincides with the lenslets size d in the first embodiment, in this second embodiment it is greater than d. If the pitch between lenslets belonging to the same interlaced image is kd, then the ipixel angular pitch is divided by the same factor k. FIGS. 5a and 5b show an example of a cylindrical display configuration in which the pitch in 3D between lenslets belonging to the same interlaced image is $2^{1/2}$d, so k=$2^{1/2}$. Then, 504a, 506a and 508a belong to the web of ipixel1, while 505a and 507a belong to the web of ipixel2. Ipixel1 and ipixel2 belong to different interlaced images.

This makes possible an opixel resolution finer than the physical spacing between pixels on the digital display 502.

An important aspect of the design is that the ipixels (pixels on the virtual screen) are visible wherever the eye pupil is positioned within the pupil range. This introduces a constraint on the lenslet size d relative to the pupil diameter D. When the lenslets are uniformly spaced then $k^2$ equals the number of interlaced images and consequently $1/(k^2-1)$ is the ratio the lenslet area of a given interlaced image over the lenslet area of the remaining interlaced images. Then, the pupil diameter D must be substantially greater than $d(k^2-1)^{1/2}$ to ensure that wherever the eye pupil is positioned within the pupil range it may receive illumination of every interlaced image ipixel. The inequality $D>d(k^2-1)^{1/4}$ just states that the circular ipixel-to-pupil print must at least intersect one lenslet of every web. Black and white lenslets in the checkerboard arrangement of FIG. 5b represent the lenslets of two different interlaced images. In this case k equals $2^{1/2}$.

A more detailed calculation on the upper bound of d/D can be done when the particular lenslet arrangement is known. For instance, when the webs with square lenslet arrays are in Cartesian-like configuration, the array pitch is measured in horizontal or vertical direction and k equals an integer greater than two, the constrain is approximately given by:

$$\frac{d}{D} < \frac{1}{\sqrt{2}(k-1)}$$

The previous equation just states that the circular ipixel-to-pupil print must at least intersect one lenslet of every web, and it is obtained when the circular pupil D is touching the corners of 4 lenslets of the same web which are separated a pitch kd. Similar calculations are within the ordinary skill in the art for other tessellations, as hexagonal or polar arrays.

Interlacing of ipixels can also be done between the right and left eye images (with their associated $k=2^{1/2}$), so the perceived resolution is increased and they eye strain is small due to the similarity of both images. In prior art as U.S. Pat. No. 7,667,783 and WO 2012/055824 there is no reference to webs, and in particular to the possibility of interlacing ipixels to increase resolution.

Clusters

Figure 6A:
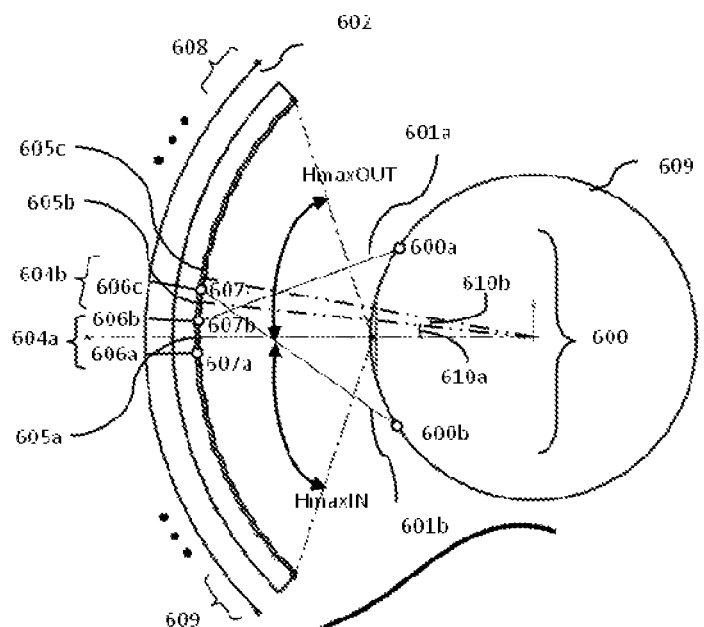
FIG. 6a is a top view schematic of the present disclosure.
Figure 6B:
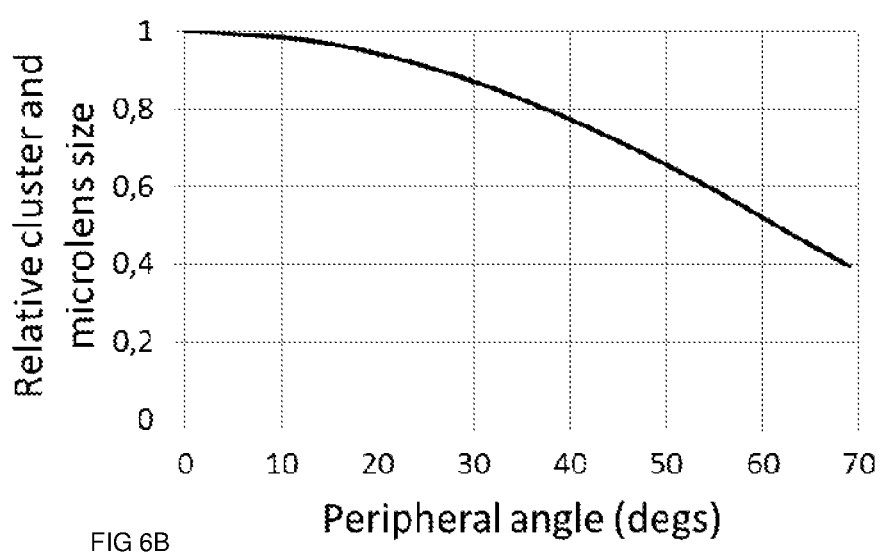
FIG. 6b is a graph showing the relative cluster and lenslet size dependence on the peripheral angle.

The lenslets of the array in FIG. 6A are generated by angular shifts around the center of the eye from an initial lenslet. The optimum angular shift is not constant, and is not identical for surfaces S1 and S2. There is no reference to such optimum design in any of the prior art documents. The optimum angular shift is defined as the one that maximizes the pupil range 600, which is achieved when the boundary of the clusters is mapped on to the fixed edges 600a and 600b of that maximal pupil range. FIG. 6A shows how example edge rays 601a and 601b coming from the 604b cluster's edges are sent (by means of lenslet 605b) towards the edges 600a and 600b of the pupil range 600. Since the solid angles subtended by the pupil range from a point at the lenslet array surface S2 gradually decrease from the center of the array to the rim, the cluster sizes also decrease accordingly from cluster 604a in the center to cluster 608 at the edge, as shown in FIG. 6B. After fixing the distance from lenslets to the eye, the pupil range and virtual screen position, the steps to define the cluster boundaries are:

a) Choose the size of the central cluster 604a associated to lenslet 605a, bounded by points 606a and 606b, and the angular size $\Delta_1$ subtended by the central lenslet 605a, which is bounded by points 607a and 607b, from the center of the eye.

b) Calculate the focal length of the lenslet that provides that pupil range (as described in section 6.4) and consider that the focal length will be equal for the remaining lenslets.

c) Calculate the distance from the digital display to the lenslet that images the digital display on the screen (as described in section 6.4).

d) Find angle 610a to position the axis of lenslet 605b (which passes through the center of the eye) whose focal length is already known, with the condition that ray 601a emitted from 606b (this is the edge of cluster 604b) deflected by lenslet 605b at point 607b is projected towards the edge of pupil range 600a. This assignment will make sure that there is no inactive gap in between clusters 604a and 604b, which is interesting to maximize the opixel utilization. When a certain guard between clusters is preferred, just consider the edge of cluster 604b separated by the guard width from the edge of cluster 604a.

e) Set the lenslet angular size $\Delta_2$ to two times angle 610a minus $\Delta_1$ to define the other edge of lenslet 605b and then compute the edge point 607c on lenslet 605b profile.

f) From the other edge of pupil range 600b, trace backwards the ray 601b on lenslet 605b passing through point 607c to intersect the digital display and thus find point 606c that defines the extent of cluster 604b.

g) Repeat the process from d) to f) to calculate successively outwards the variable angular pitch (610b, etc.) of the lenslet optical axes, the corresponding lenslet sizes $\Delta_i$ and the positions of the cluster edges up to the outermost cluster 608.

h) Repeat analogously the process from d) to f) inwards up to the innermost cluster 609.

Notice that the pupil range has remained unaltered across the whole procedure explained above in order to define the clusters on the digital display. This means that the positions of the upper and lower bounds 600a and 600b of the pupil range in FIG. 6A have not changed. Alternatively, edges 600a and 600b can be chosen to be different for some or all of the lenslets. In particular, the lower edge 600b can be at higher positions (i.e., closer to 600a) for the upper lenslets. One choice is to select the variable point 600b so that the ray linking the eye and lenslet centers bisects the angle subtended by the pupil range at the center of the eye. This alternative embodiment with variable edge points 600a and 600b makes it possible, for a given field of view, to increase the pupil range for the central lenslets. Optical cross-talk will appear at high peripheral angles, beyond the angle fixed as constant in the example. However, that is not so critical. When the eye is turned downwards, there will be cross talk at the upper edge of the field of view, but when the eye is turned downwards, the viewer is likely to be paying little attention to the upper edge of the field of view. Therefore, the effective pupil range is augmented with little deterioration in image quality.

In the preceding description it has been assumed that all the lenslets have the same focal length, which is interesting to simplify design and manufacturing. However, in an alternative embodiment, a function describing the lenslet's focal length as a function of its index position is given, and the corresponding similar procedure for the cluster definition applies. Preferably, the function is selected so the central lenslets have a focal length greater than that of the periphery. That is of interest to increase the resolution of the ipixels at the center of the virtual screen, because the gaze vector aims at the center most of the time. The procedure with steps a) to g) is applied analogously, but considering the focal length as a function of the lenslet index position in step d).

Figure 6C:
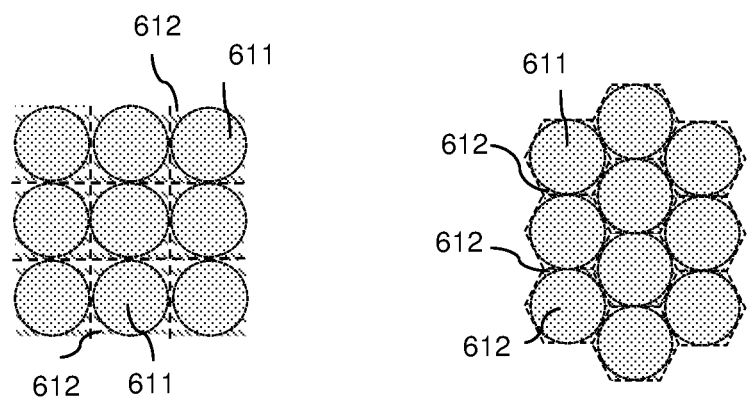
FIG. 6c is a tessellation of squared and hexagonal clusters.

The representation in FIG. 6A is purely two dimensional for clarity, but the clusters tessellate the digital display in three dimensions, as shown in FIG. 6C. Multiple three dimensional tessellations of the lenslets are possible (for instance, Cartesian, hexagonal, polar), not necessarily regular, which are accompanied by a similar tessellation of the digital display, in which each tile has a polygonal boundary, in general irregular and with curved segments. Since the pupil range is preferably elliptical, with a circular pupil range being a relevant special case, the edge rays traced backwards from the pupil range contour through each lenslet define circular clusters as the regions 611 shown in FIG. 6C. The remaining regions 612 of the digital display, not belonging to any cluster are always unlit, that is, their opixels are set as inactive. Therefore, different tessellations have a different ratio of active to inactive opixels. When the lenslets are small relative to the eye pupil size, this ratio can be approximated by the ratio area of the inscribed circle to the tile polygon. In Cartesian square tiles this ratio is $\pi/4 = 79\%$, while in hexagonal tiles is $(\pi * 3^{1/2})/6 = 91\%$. Therefore, the hexagonal tessellation utilizes the digital display area more efficiently, and provides a higher pupil range for the same lenslet pitch.

Axisymmetric Optical Designs

Figure 7:
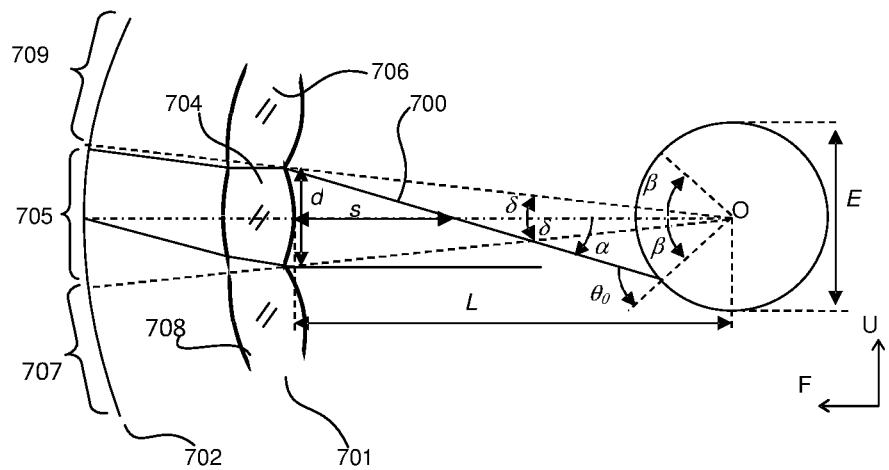
FIG. 7 is a top view schematic for a spherical embodiment of the present disclosure.

FIG. 7 shows a portion of the 2D cross-section of a lenslet array 701 for the spherical digital display 702. Consider first the central lenslet 704, whose surface S2 occupies an angular sector 2δ. The portion 705 of the digital display is the cluster associated to this lenslet, which in this example occupies the same angular sector 2δ from the center of the eye (alternatively, cluster 705 can be selected to occupy a sector smaller than 2δ to allow a guard between clusters). Said lenslet 704 will project towards the eye a virtual image of the cluster 705, so that the lenslet 704 together with the eye's optics will form a real image the cluster on the retina. Adjacent lenslets 706 and 708 are obtained just by a rigid rotation of lenslet 704 with respect to the center of the eye O. Their respective associated clusters are 707 and 709, which are adjacent to cluster 705.

The angle 2β in FIG. 7 defines the pupil range. Within that angle, lenslet 704 should not contribute to stray light, that is, any light ray hitting pupil range from the exit surface S2 of the lenslet 704 is emitted by one of the opixels in cluster 705. Angle β can be set as a design parameter. It determines the maximum peripheral angle $\theta_0 = \alpha + \beta$ illuminated by that lenslet. This maximum peripheral angle is shown in FIG. 7, as well as the tilt angle α of the extreme ray 700 relative to the main chief ray of lenslet 704, i.e., the ray linking the eye center and the center of the exit surface S2 of that lenslet.

Paraxial equations can give a first estimate of the relationships among the different parameters in FIG. 7. E is the eye diameter, typically about 26 mm. Parameter L is preferably set in the range of 18 mm to 35 mm depending on the desired eye relief (given by L−E/2) and the size of the display 702 (the greater L, the larger the display and thus its cost). The lenslet size d is preferably set in the 0.5 to 20 mm range, since the diffraction will be too high for smaller sizes (this contrasts, for instance, with the preferred lenslet size of 0.19 mm of prior art WO 2012/055824, page 24, line 15) and larger sizes will lead to an uncompact system. The angle β can be set to its minimum value $\beta = \theta_0 - \alpha$. Thus, considering the eye diameter E is known, and assuming L, d and β are given by the designer preferences, the two unknowns α and s are found by solving the following system of two equations (s is also shown in FIG. 7).

$$\frac{1}{2\tan\alpha} = \frac{s}{d} \quad (1)$$

$$\frac{E}{2\sin\alpha} = \frac{L-s}{\sin\theta_0}$$

Then, the focal length f of lenslet 704 is calculated from $$\frac{1}{f} = \frac{1}{s} - \frac{1}{L} \quad (2)$$

Combining the previous equations, we can find the f-number of the lens given f/d. In the approximation that sin α≈tan α, the resulting expression for the f-number simplifies to:

$$f\text{-number} = \frac{f}{d} \approx \frac{L}{E\sin\theta_0} \quad (3)$$

In order to allow for a comfortable pupil range, the lenslets in this apparatus results to be fast (i.e., its f-number rather low) when compared to the prior art. As a numerical example, consider E=26 mm, L=29 mm (so the eye relieve is L−E/2=16 mm), d=2 mm, and a pupil range of β=15.1 degs. Then, the f-number is 2.4 (and the remaining parameters are f=4.65 mm, s=3.75 mm, α=14.9 degs, $\theta_0$=30 degs). This contrasts, for instance, with the preferred f-number of 15.0 in prior art WO 2012/055824 (page 24, line 15).

Beyond the paraxial calculations, the actual optical design of the lenslets for the spherical display preferably consists on a two-sided aspheric lens for maximum imaging quality. Color correction will be desirable for highest resolution. Doublets and hybrid refractive-diffractive designs can be done for this purpose. In both cases, the design as disclosed here takes advantage that the human angular resolution is highly dependent on the peripheral angle, being only very high for the part the image formed on the fovea, see Kerr. The foveal region subtends about 5 degs full angle in the object space. Consequently, in FIG. 4 the image quality of the projection of opixel 404a does need to be as good as the image quality of opixel 406a, because the peripheral angle at eye pupil position of 404b is much larger than the peripheral angle at position 406b (which is nearly zero).

An example of an adequate design approach providing good on-axis imaging-quality with relatively low f-numbers (as required here) is a full-aplanatic lens as described in Wasserman. Alternatively, the SMS 2D design method can be used (U.S. Pat. No. 6,639,733). The vertex positions of the lens need to be selected adequately to provide also sufficient off-axis resolution, particularly about 20 arcmin resolution at 20 degs peripheral angle, see Kerr. Our preferred design fulfills the following inequalities with respect to the vertex positions $V_1$ and $V_2$ (measured from surfaces S1 and S2 to the digital display, respectively)

(0.3<V1<0.5 AND 1.5<V2) OR (16f<9V2+4V1<20f AND 0.3f<V1<0.9f)

Figure 8:
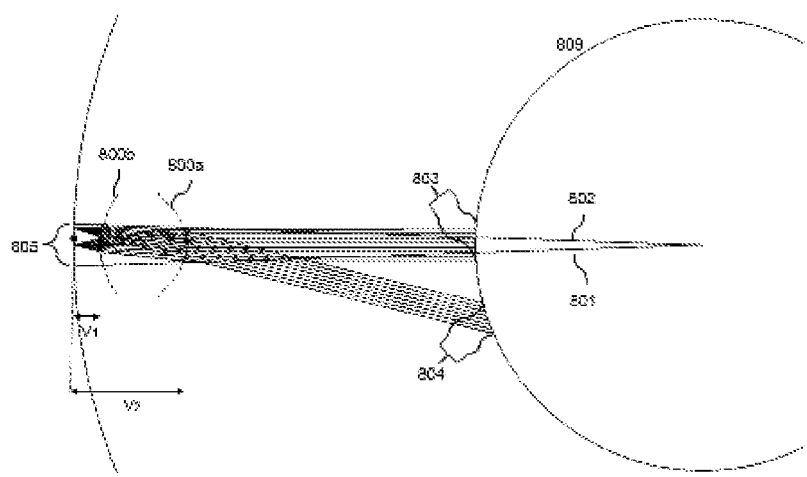
FIG. 8 is a ray trace across a single lens of the lenslet array on a spherical or cylindrical embodiment of the present disclosure.

FIG. 8 shows the cross sectional profiles of exit surface S2 800a and of entry surface S1 800b of an aplanatic design example with f=4 mm, $V_1$=1.5 mm and $V_2$=6.5 mm. Lines 801 and 802 indicate the angular sector covered by the lenslet. Rays 803 are traced from the on-axis opixel, where the required image quality is maximum, and rays 804 are traced from an off-axis opixel close to the edge of the cluster, where the required image quality is minimum. In order to minimize stray light inside the pupil range, it is preferable that the aperture stop of the lenslet coincides with the edges of surface S2 800a, so S2 must be convex enough to prevent any vignetting from the rim of surface S1 800b within the pupil range. Since the rim of surface S1 800b is therefore inactive, and the rim of the clusters with a conveniently designed guard is also inactive, there is space for a mechanical support structure extending from the digital display to the lenslet array, contacting both rims to give mechanical support and additional stray light blockage.

The solid curve in FIG. 9A shows the image quality of a design with $V_1$=0.5f, $V_2$=1.75f, d=2 mm, and f=4.65 mm for point sources on the digital display with white color (CIE coordinates x=0.437, y=0.404, using typical RGB spectrums of OLED displays) as a function of the peripheral angle of the chief ray when it hits the eye sphere. Such quality is calculated as the smallest of the tangential and sagittal angular frequencies on the virtual screen (in cycles per degree or cpd) at which the Modulation Transfer Function (MTF) drop to 20% from the maximum value. For comparison the dashed line of FIG. 9A shows the human angular resolution (calculated as 1/(2p), where p is angular resolution given in Kerr for peripheral angles greater than 3 degs) truncated for peripheral angles smaller than the Nyquist frequency of the digital display as projected to the virtual screen. In this example, an opixel pitch of 4 microns and no interlaced ipixels have been considered, so the projected ipixel pitch is $\tan^{-1}(0.04/4.65)=3$ arcmin; thus the Nyquist frequency shown in FIG. 9A is $60/(2\times3)=10$ cpd.

It is possible to improve the resolution at small peripheral angles by selecting the lens vertices although, in general, this causes degradation of the resolution at high peripheral angles. FIG. 9B shows the performance of another design with $V_1=0.45f$ and $V_2=1.8f$, which is adequate to operate with displays with Nyquist frequency of 15 cpd, i.e., reaching 2 arcmin ipixel pitch resolution without interlaced ipixels, and 1 arcmin interlacing them with k=2.

Designs referred to in FIGS. 8 and 9 perform with sufficient quality up to +55 degs peripheral angle, that is, 110 degs full angle. However, the design can be further relaxed if better adapted to the pupil range, since the range of the maximum peripheral angles illuminated by each lenslet obtained in the cluster construction in FIG. 6, is much smaller than ±55 degs. For instance, in FIG. 7, the peripheral angle range of the central lenslet under analysis is +θ$_0$, which is ±30 degs in the numerical example giving there, and according to the cluster construction, the further the lenslet is from the center, the smaller the full range of peripheral angle that the lenslet illuminates. Furthermore, not all the lenslets will be intersected by the gaze vectors and thus some of them will not be working at small peripheral angles.

Figure 10:
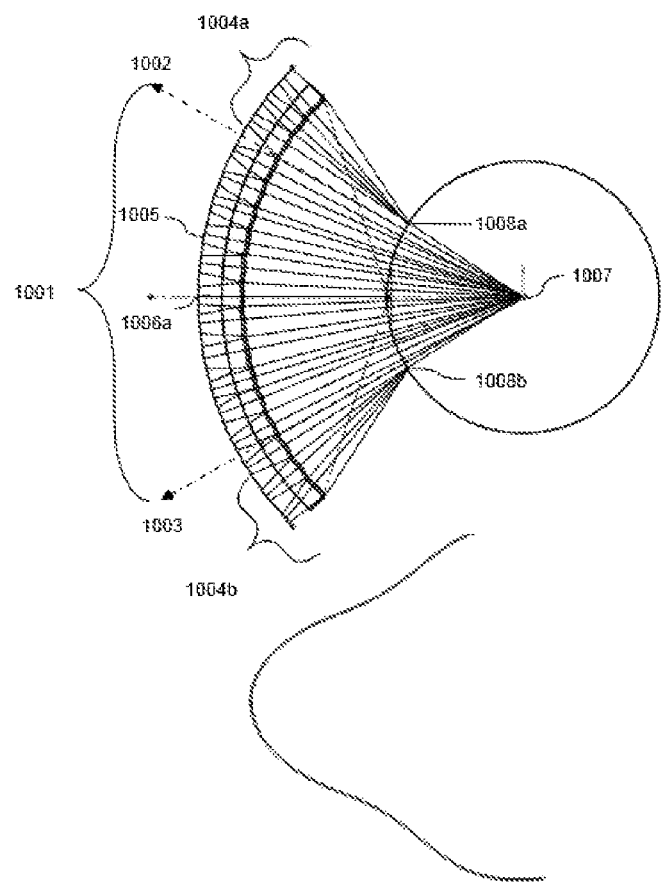
FIG. 10 is a top view schematic of a spherical embodiment of the present disclosure, where the gazed region of virtual screen and the outer region of virtual screen are highlighted.

FIG. 10 shows the lenslets in angular range 1001 that will be directly gazed by the eye, and the lenslets in angular ranges 1004a and 1004b that will not. All rays converging towards the center of the eye 1007 that come from the gazed region of the virtual screen, are the rays that can be aligned with the gaze vector (so the peripheral angle is zero) and the eye will focus them on the center of the fovea. On the other hand, rays converging towards the edges of the pupil range 1008a and 1008b, which come from the outer region of virtual screen, have non-zero peripheral angle.

The opixels such as 1005 that emit rays sent to the center of the eye 1007 are the ones for which the image quality must be the best, but just good enough for the Nyquist frequency of the projected digital display or good enough for the human angular resolution at their respective peripheral angle values (dashed curves in FIG. 9). Those opixels will be referred to as "preferential opixels", or popixels. The popixels are found by tracing backwards the ray passing from the center of the eye pupil and the center of the ipixel when the eye pupil is located so the angle between the gaze vector and that ray is minimum among all possible positions within the pupil range of that lenslet. When the ipixel belongs to the gazed region of virtual screen this angle is zero and thus the ipixel is being gazed; when the ipixel belongs to the outer region of virtual screen the eye pupil will be located at the edge of some pupil range. Since there is a one-to-one mapping between popixels and ipixels, popixels can be taken as a representative of the web associated to the ipixels, which will be useful in Section 6.6 describing the opixels to ipixels mapping. One ray is highlighted for each lenslet. This is the ray passing through the center of the lenslet exit aperture towards the center of the eye pupil when the eye pupil is positioned so the angle between the gaze vector and that ray is a minimum among all possible positions within the pupil range of that lenslet. This ray is referred to as the "main chief ray" of the lenslet herein.

The optical design of the lenslets 1004a and 1004b of the outer region of virtual screen implies a modification of step e) in Section 6.3 for the cluster and lenslet edge definition steps of FIG. 6 for the outer lenslets 1004a and 1004b in FIG. 10, since the center of rotation of the lenslets should preferably be point 1008, the nearest point on the pupil range, instead of 1007, the center of the eye. This rotation would affect the lenslets positions, and the digital display could even have a different center of curvature in the periphery. However, for practical purposes it is easier that the digital display has a constant curvature, particularly in the cylindrical case. In this case, the outer lenslets 1004a and 1004b should be designed differently from the inner lenslets 1001 to perform such a correction. However, since lenslets 1004a and 1004b are designed to be never gazed, the requirement of image quality for them is lower, and thus a constant curvature digital display is acceptable in most cases.

The profiles of the axisymmetric aspheric surfaces of the lenses can be fitted well with the following standard equation:

$$z(\rho) = a_0 + \frac{\delta\rho^2}{1+\sqrt{1-(1+k)\delta^2\rho^2}} + \left(\frac{\rho}{\rho_{max}}\right)^4 + \sum_{i=0}^{13} g_{2i+4} Q_i^{con}\left(\frac{\rho}{\rho_{max}}\right)^2$$

wherein $a_0$ is the vertex position along the optical axis (measured from the digital display), k is the conic constant, $\delta=1/R$, R the radius at the apex, $g_{2\ i+4}$ are the coefficients of Forbes Q-con polynomials $Q_i^{con}$ (Forbes, Shape specification for axially symmetric optical surfaces, Optics Express, Vol. 15, Issue 8, pp. 5218-5226 (2007)). For instance, the specific values of this fitting parameter for the lens in FIG. 8, all in mm except k adimensional and $\delta$ in mm$^{-1}$, are given in the next Table 1.

TABLE 1

| Lens parameter | surface S1 | surface S2 |
|---|---|---|
| $a_0$ | 34.5 | 29.5 |
| k | −11.2344418 | −0.61245786 |
| $\delta$ | −0.37203388 | −0.37203388 |
| $\rho_{max}$ | 2.91941602 | 2.95310105 |
| $g_4$ | −0.35498562 | −0.1383688 |
| $g_6$ | −0.02225184 | −0.07365331 |
| $g_8$ | 0.00644008 | −0.02314117 |
| $g_{10}$ | −0.00290758 | −0.00902277 |
| $g_{12}$ | 0.00071615 | −0.00278412 |
| $g_{14}$ | −0.00020547 | −0.00175263 |
| $g_{16}$ | 4.5228E−05 | −0.00065691 |
| $g_{18}$ | 0 | −0.00064966 |
| $g_{20}$ | 0 | −0.00025743 |
| $g_{22}$ | 0 | −0.00031516 |
| $g_{24}$ | 0 | −0.00012778 |
| $g_{26}$ | 0 | −0.00017355 |
| $g_{28}$ | 0 | −8.8961E−05 |
| $g_{30}$ | 0 | −0.00019719 |

Freeform Optical Designs

In other preferred embodiments, the digital display is cylindrical or flat instead of spherical, so the manufacturability is improved. When the digital display is flat, the lenslets corresponding to the clusters far from the center of the digital display have very hard design conditions to fulfill due to the lack of parallelism between the plane of the digital display and the tangent planes to the virtual screen along the main chief ray. A similar situation is found in the case of cylindrical digital display for the lenslets in the axial end regions (upper and lower regions if the axis of the cylinder is vertical). Consequently if the lenslets are just made axisymmetric with optical axis perpendicular to the digital display, their image quality will be poor out of the center, mainly affected by a severe astigmatism and the lack of coincidence between the Plane of Focus (PoF) of the lens and the tangent plane to the virtual screen. Toroidal lenslets on surface S2 and a flat on S1 for correcting the astigmatism have also been proposed in Duparré, but they do not correct the lack of coincidence between the PoF and the tangent plane to the virtual screen. We disclose next the design of freeform lenslets (that is, with no rotational symmetry), which correct for both aberrations.

The cylindrical digital display can be manufactured by bending a flat flexible display, something that is available now in the market for some types of OLED displays and CMOS backplanes, see Tu. In order to ergonomically fit the user's face shape, the cylinder direction will be approximately oriented vertically when the head is facing frontwards, and the cylinder axis will approximately pass though the center of the eye sphere. The optics shapes needed for a cylindrical display in which the axis of symmetry crosses the center of eye rotation are identical for lenslets having the same location along the axis of the cylinder.

Figure 11:
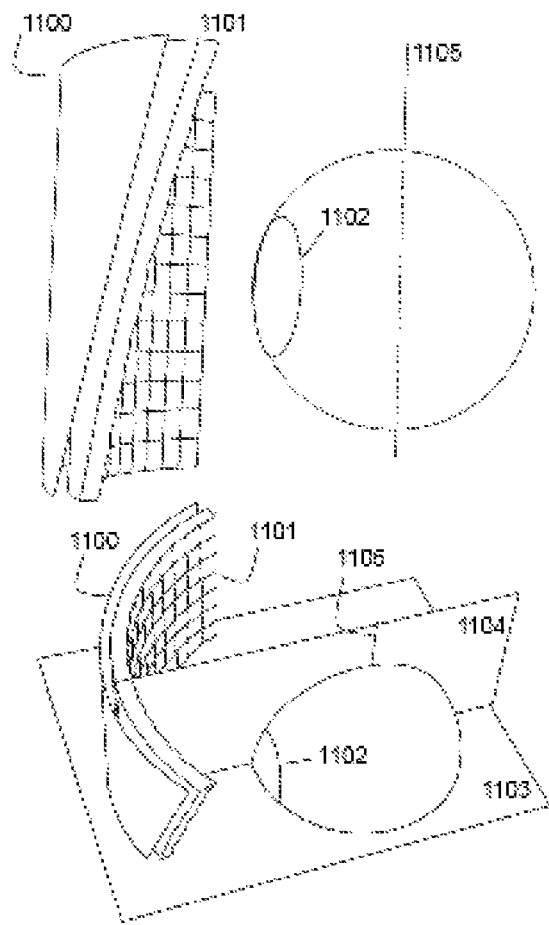
FIG. 11 is a perspective view of a cutaway freeform lenslet array for a cylindrical display.

FIG. 11 shows a cutaway view of a freeform lenslet array 1101 for the cylindrical digital display 1100 that illuminates the pupil range 1102. Considering this cylindrical configuration, the angles $V_{maxDOWN}$ and $V_{maxUP}$ defining the vertical FOV of the eye when the gaze vector points frontwards are set equal to 45 degs in this example. The optical design is done only for a vertical column of lenses, and the rest is generated by rotation around cylinder axis 1105. This means that any of these lenslets is the same but shifted along $\theta$ and consequently the equation of a surface of these lenslets can be written as $\rho=f(\theta-m\Delta\theta_m, z)$ where $\rho$ (radius), $\theta$ (azimuth), and z (axial position) are the cylindrical coordinates, $\Delta\theta_m$ is the lenslet pitch along the $\theta$ coordinate, and m is an integer. Therefore, the horizontal cross section with plane 1103 in FIG. 4 essentially coincides with that in FIG. 4 for the spherical display, and the procedure for the clusters definition in the horizontal dimension is done analogously, as in section 6.3 and FIG. 6.

In order to determine the optimum extension of clusters in the vertical dimension, a similar procedure as the one disclosed for the horizontal dimension and for the spherical display is used. The only relevant difference is that now a family of freeform lenslet designs as a function of the distance to plane 1103 in FIG. 11 must be calculated prior to applying the procedure in section 6.3. Then, the procedure with steps a) to g) is applied analogously, but considering each of the family of designs separately in step d).

Figure 12A:
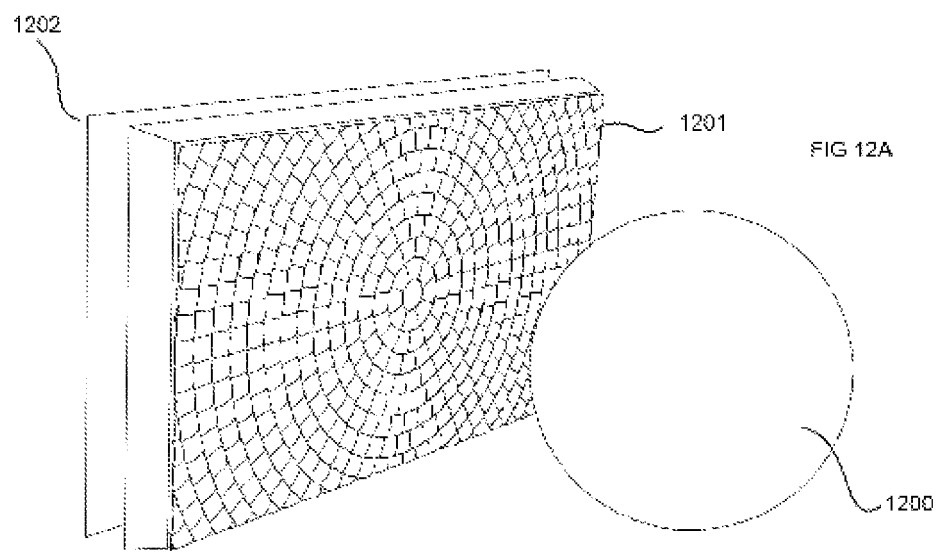
FIGS. 12a, 12b and 12c are perspective view of flat display with freeform lenslet array on a polar, rectangular and hexagonal configuration, respectively.
Figure 12B:
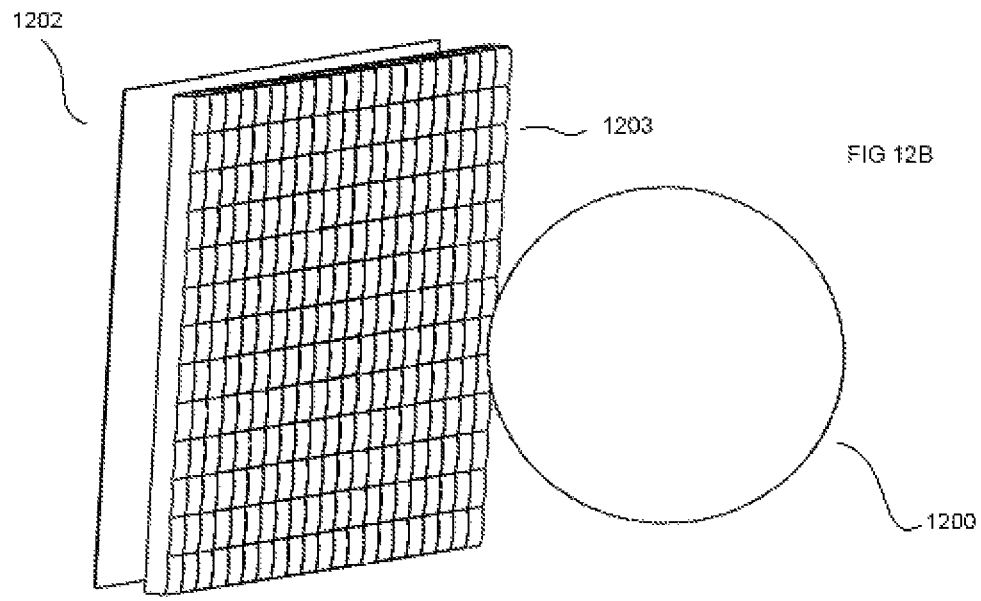
Figure 12C:
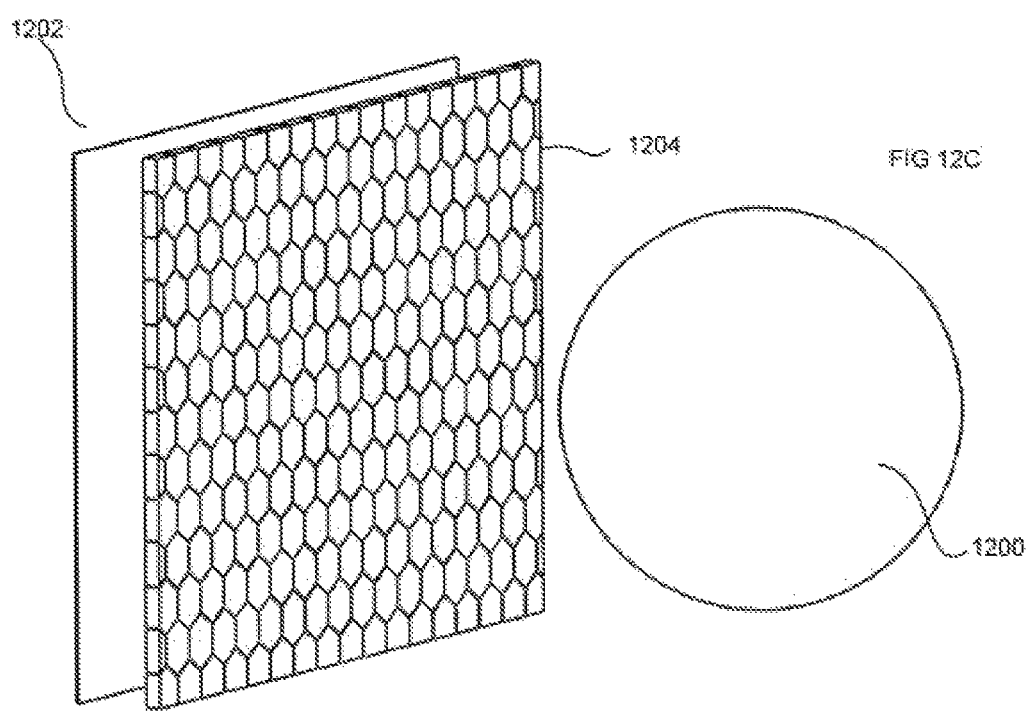

FIG. 12A shows the perspective view of a freeform lenslet array 1201 for the flat digital display 1202 that illuminates the pupil range on the eye sphere 1200, in which the lenslets are arranged in a polar array configuration. In order to ergonomically fit the user's face, it may be of interest that the digital display is tilted so its normal vector is not parallel to the gaze vector when the eye is looking frontwards, and thus the central lenslet will not be intersected by the gaze vector at that position. FIGS. 12B and 12C show perspective views of similar designs in which the lenslets are arranged in rectangular 1203 and hexagonal 1204 arrays. The polar configuration has the manufacturing and testing advantage over the others that the lenslets in each ring are identical one to another. In the hexagonal configuration, the slope at the edges of the lenslets is minimum, which can reduce tolerances and aberrations. The rectangular array 1203 is simpler for the electronic addressing of the digital display. However, for the three configurations, the design of the lenslet surfaces does not differ from that of FIG. 11 for the cylindrical digital display. Only the definition of the lenslets and clusters tessellation differs.

An alternative embodiment includes the possibility of using an essentially square array in such a way that the diagonal of the squares is vertically aligned (that is, 45 degs rotated with respect to the one shown in FIG. 12B), so the pupil range can be design to be rhomboidal, which is adapted to allow for the maximum movements of the eye in the left-right and up-down rotations, which are the most common in practice.

Figure 13:
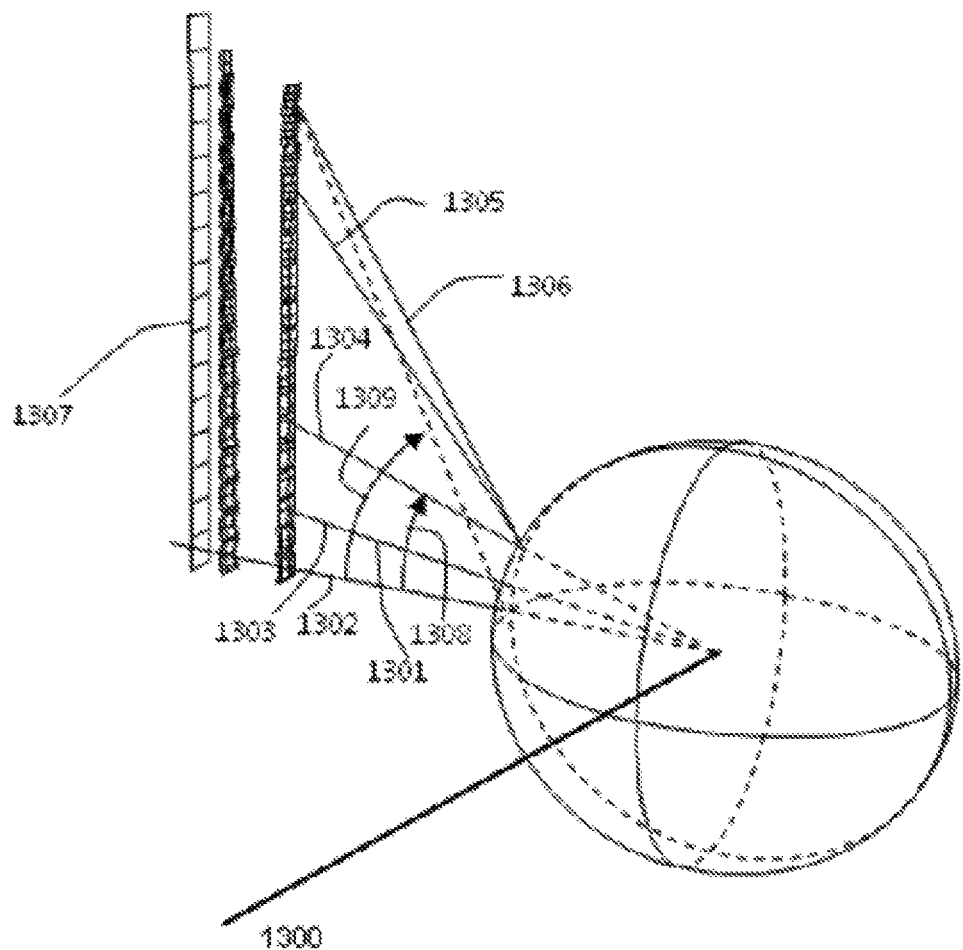
FIG. 13 is a perspective view of a single row of freeform lens.

FIG. 13 shows the 3D view of half a single row of freeform lenses, which can be, for example, those from the center to the diagonal corner in the polar array in FIG. 12A, or those intersected by plane 1104 in the cylindrical configuration of FIG. 11. The angle 1309, which is 65 degs in this example, is selected to match the desired field of view along the diagonal of a flat digital display, which is the greatest. The approximate rectangles 1307 enclose the corresponding clusters, but active and inactive opixels are not identified, for clarity of the drawing. Angle 1308 indicates the pupil range half angle, which is 20 degs in this example. The main chief rays for several lenslets 1301, 1302, 1304, 1305, 1306 are also shown. The lenslets have to perform the task of imaging a fraction of the virtual screen (which, as said before, is preferably a sphere centered on the eye center), on the surface of the cylindrical or flat digital display.

The imaging quality for the popixels of the gazed region of the virtual screen and their neighbor opixels must be sufficiently high. High quality is required, firstly for rays in the neighborhoods of the main chief rays like 1302 to 1304 that are directly gazed by the eye, and secondly for the main chief rays like 1305 and 1306 that are peripherally viewed, as was described before in FIG. 10. For the remaining opixels of a cluster, the imaging quality can be relaxed. The lenslet whose main chief ray is 1304 can be axisymmetric, but the further from 90 degrees is the angle between the digital display and the straight line linking eye and lenslet centers, the higher the need for non-rotational symmetric optical surfaces. For instance, in the case of a cylindrical digital display, this need arises when the lenslet is far from plane 1103 in FIG. 11. This freeform design can be done by finding an initial design first, fitting it with freeform polynomials and further optimizing them using, for instance, Damped-Least-Square (DLS) algorithm.

One method for finding a good initial design consists in calculating two axisymmetric surfaces producing stigmatic focus with constant first order magnification in both the symmetry plane and in the orthogonal one at the exit. This calculation can be done with the generalized Abbe sine condition. This method is disclosed in section 6.14.1 Annex A. That is done starting with the calculation of the two curves on each surface, both curves intersecting orthogonally on a point, as described in said Annex. Then, for each surface, one of the curves approximated with its best-fit circumference and the axisymmetric surface is generated by rotating the other curve along said best-fit circumference. In a further simplification, both profiles can be approximated with circumferences and thus a toroidal approximation is taken. These designs are particularly interesting even to be used without further optimization, because they have rotational symmetry around one axis, and thus are easier to manufacture and test than full freeform designs. As an alternative to the method shown in 6.14.1 Annex A, the SMS 3D design method disclosed in U.S. Pat. No. 7,460,985 can be used to find a good initial design.

Figure 14:
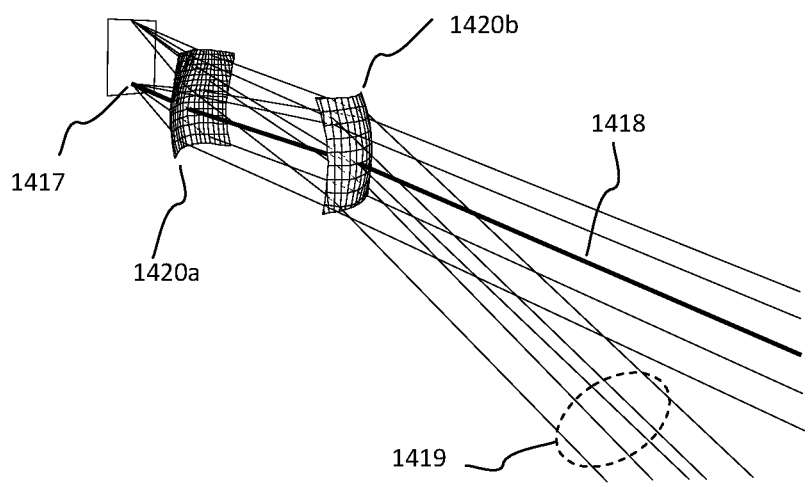
FIG. 14 is a perspective and side view of an example freeform lens design located close to the edge of the gazed region of virtual screen.

FIG. 14 shows the perspective view and side view of a design for a freeform lens that is located at 16.8 degrees above the horizontal plane (1103 of FIG. 11) and thus is close at the edge of the gazed region of the virtual screen. Ray 1418 is the main chief ray of this lenslet, which is generated at the opixel at point 1417. The image quality must be the best for the opixels close to 1417, and can be relaxed moving away from that point. For instance, the required image quality for the rays 1419 coming from an off-axis opixel close to the top edge of the cluster is much lower. Additionally, to avoid optical cross-talk in between the two lens surfaces within the pupil range, the surface S2 is convex enough that the aperture stop of the lenslet coincides with the edges of surface S2 1420b, that is, preventing any vignetting from the rim of surface S1 1420a within the pupil range. Since the rim of surface S1 1420a is therefore inactive, and so it is the rim of the clusters with a conveniently designed guard, it allows allocating a mechanical support structure from the digital display to the lenslet array contacting both rims to give mechanical support and stray light blockage.

Figure 15:
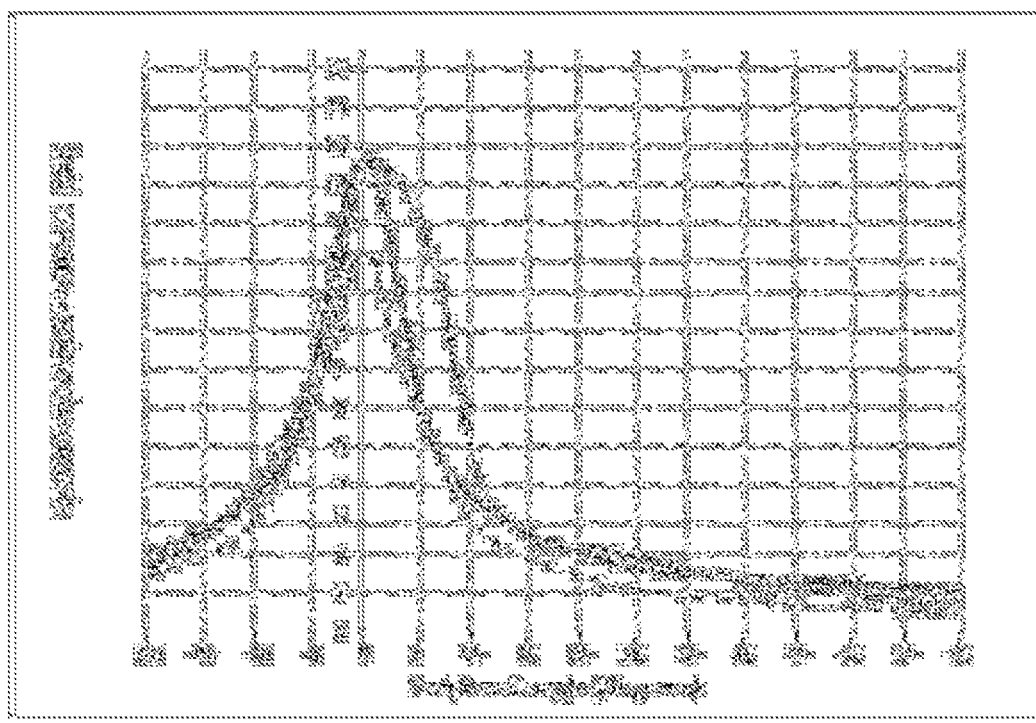
FIG. 15 is a graph of the MTF's cut-off frequencies vs. the peripheral angle curve for the design lens of FIG. 14.

FIG. 15 shows the peripheral angle of a direction vs. the angular frequencies at with the modulus of the MTF of the design reaches the 20% of the maximum for the freeform lens in FIG. 14. The continuous line corresponds to the peripheral angle when the eye sphere rotates around axis 1300 in FIG. 13, while the continuous double line corresponds to the rotation around the axis perpendicular to 1300 and to 1302 in FIG. 13. The peripheral angle in the abscissa of FIG. 15 is zero when the eye pupil is facing the lenslet being analyzed, and it is positive when the direction analyzed is upwards or leftwards the gaze vector for the continuous and the continuous double lines, respectively. For the continuous line, since this lenslet is at the upper edge of the gazed region of virtual screen, then most important directions in this graph are the positive ones, since negative ones corresponds to eye pupil positions outside the pupil range. For the continuous double line, the curve has even symmetry (so the values for θ' and −θ are equal) due to the plane symmetry of the lens. The dashed line showed the eye resolution truncated to the digital display Nyquist frequency, as was already shown in FIG. 9.

Any freeform surfaces in three dimensions can be well fitted with the standard equation:

$$z(\rho, \theta) = a_0 + \frac{c\rho^2}{1 + \sqrt{1-c^2\rho^2}} + \frac{1}{\sqrt{1-c^2\rho^2}} \left\{ u^2(1-u^2)\sum_{n=0}^{N} a_n^0 Q_n^0(u^2) + \sum_{m=1}^{M} u^m \sum_{n=0}^{N} [a_n^m \cos m\theta + b_n^m \sin m\theta] Q_n^m(u^2) \right\}$$

where ρ, θ and z are cylindrical coordinates; u is defined by $u = \rho/\rho_{max}$, so $0 \leq u \leq 1$; $c = 1/R$, R being a curvature radius; and $Q_n^m(v)$ is the Forbes Q-polynomials of order n in v (Forbes 2012).

All the freeform lenses in this embodiment have, at least, one plane of symmetry, defined by the main chief ray from the lenslet to the eye and the normal to the digital display.

Without loss of generality we can consider that this symmetry plane corresponds to θ=0 deg. Then, coefficients $b_n^m = 0$ for all n and m. As an example, the non-null coefficients of lens (all in mm, except c in mm$^{-1}$), in FIG. 13 are given in the next Table 2:

TABLE 2

| Parameter | surface S1 | surface S2 |
|---|---|---|
| $a_0$ | 33.5 | 29.2 |
| c | −3.152001116 | 6.50110322 |
| $\rho_{max}$ | 2.557004044 | 2.41537442 |
| $a_0^0$ | 0.740222575 | −0.86317415 |
| $a_1^0$ | −0.471750001 | 0.72661976 |
| $a_2^0$ | 0.255614273 | −0.44475353 |
| $a_3^0$ | −0.09241165 | 0.15733833 |
| $a_4^0$ | 0.018976205 | −0.02647498 |
| $a_0^1$ | −0.165744278 | 0.51199459 |
| $a_0^3$ | −0.099051222 | 0.52476836 |
| $a_0^4$ | −0.483158293 | 0.53737419 |
| $a_0^3$ | −0.007359904 | −0.00170137 |
| $a_1^1$ | 0.069256126 | −0.72814396 |
| $a_1^2$ | −0.08831711 | 0.14038817 |
| $a_1^3$ | 0.132088675 | −0.50950189* |
| $a_1^4$ | 0.467461311 | −0.6345298 |
| $a_1^5$ | −0.100156894 | 0.0104909 |
| $a_2^1$ | 0.032553018 | 0.24316105 |
| $a_2^2$ | 0.048593414 | −0.06517084 |
| $a_2^3$ | −0.079895472 | 0.21225659 |
| $a_2^4$ | −0.22387817 | 0.32560399 |
| $a_2^5$ | 0.040714883 | −0.01238367 |
| $a_3^1$ | 0.041298218 | −0.0539128 |
| $a_3^2$ | −0.010734407 | 0.02304736 |
| $a_3^3$ | 0.030660465 | −0.06165609 |
| $a_3^4$ | 0.085308353 | −0.11360515 |
| $a_3^5$ | −0.013376338 | 0.00571164 |
| $a_4^1$ | −0.01599568 | 0.00743119 |
| $a_4^2$ | 0.009922653 | −0.0041359 |
| $a_4^3$ | 0.00056851 | 0.00874059 |
| $a_4^4$ | −0.018456577 | 0.01881898 |
| $a_4^5$ | 0.005614278 | −0.00090786 |

Alternative Freeform Designs

The previous sections have shown optical designs based on lenslet arrays where the macroprofiles of surfaces S1 and S2 follow the digital display geometry. If the digital display is spherical, the macroprofile of the lenslet array is spherical (FIG. 4); if the digital display is cylindrical, then the macroprofile is cylindrical (FIG. 5); and if the digital display is flat, the macroprofile is flat (FIG. 12). That constraint can be released to maximize the pupil range and field of view. The two alternative optical designs presented in this section propose solutions in which the lenslet array is not constrained to follow the digital display geometry. For these particular designs, surfaces S1 and S2 of the different lenslets are freeform, as in the designs presented in Section 6.5, and the digital display is flat.

Designs with Large Lenslets

In this first family of alternative freeform designs, the whole lens is again divided into lenslets. The main difference with the designs previously shown is that the number of lenslets is significantly smaller, while their size is significantly larger. This will imply that the focal length will be larger than that of the smaller lenslets, so the device will be less compact. In this section five particular designs will be described: 2-fold design (i.e. composed of 2 large lenslets), 3-fold design (3 large lenslets), 4-fold design (4 large lenslets), 7-fold design (7 large lenslets) and 9-fold design (9 large lenslets).

Figure 16:
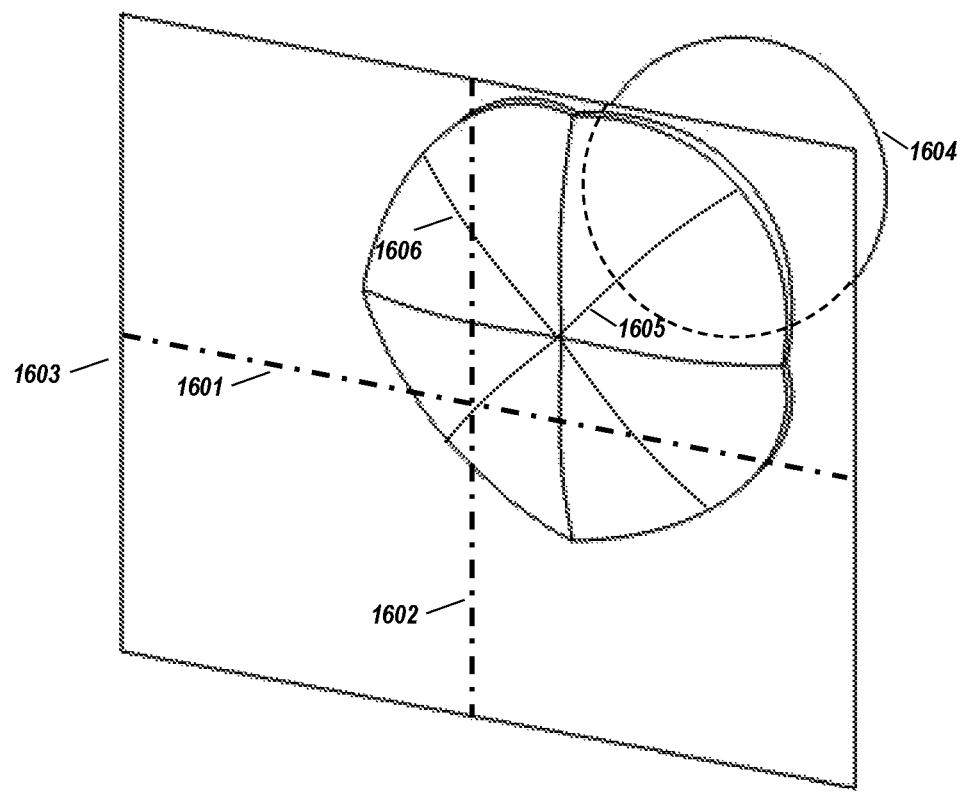
FIG. 16 shows a 3D view of the 4-fold configuration of the alternative freeform designs based on large lenslets.

In order to illustrate this alternative family of designs, FIG. 16 shows one of the four possibilities: 4-fold design. In this particular design, surfaces S1 and S2 are each divided into four identical sectors, resulting in a lens composed of four lenslets. Accordingly, the digital display is divided into four clusters, whose edges are represented by the broken lines 1601 and 1602 on the digital display 1603. In FIG. 16 only surface S1 of the lens is fully shown because surface S2 is facing towards the eye sphere 1604, so it is hidden in the back part of the lens in this view. Each one of these sectors occupies one quarter of the three-dimensional space. In the back part of the figure, the eye sphere 1604 is shown.

Even though the example in FIG. 16 shows 4 superposable lenslets placed symmetrically around the system central axis, they can be designed so each one presents different (non-superposable) designs and they can be placed in non-symmetrical positions. This is an interesting option if we are looking for solutions where values of $H_{maxIN}$, $H_{maxOUT}$, $V_{maxDOWN}$ and $V_{maxUP}$ (as they were defined in Section 6.2) are not symmetrical (i.e. $H_{maxIN} \neq H_{maxOUT}$ and/or $V_{maxDOWN} \neq V_{maxUP}$). "Superposable" here means that a rigid motion (rotation and/or translation) of a lenslet can make it identical to another lenslet. For example, in the case of FIG. 16, a 90 degrees rigid rotation around the axis containing the two planes of symmetry can superpose one lenslet in another one.

This 4-fold configuration can also be implemented by rotating the whole lens π/4 radians around the axis containing the two planes of symmetry, so the intersections between neighboring lenslets do not follow horizontal and vertical directions anymore, but diagonal lines. This is graphically shown in FIG. 17 where the digital display is divided into four clusters separated by lines 1701 and 1702, following the configuration of the lenslet separation geometry of the lens. This alternative configuration for the 4-fold device could offer an advantage if compared with the device shown in FIG. 16. Eye movements often follow horizontal or vertical directions (and seldom follow diagonal direction), so it may be preferable that the parts of the lens horizontal or vertical from the center correspond to the central parts of the different lenslets (indicated by lines 1605 and 1606 in FIG. 16), due to the symmetry those areas present.

Figure 17:
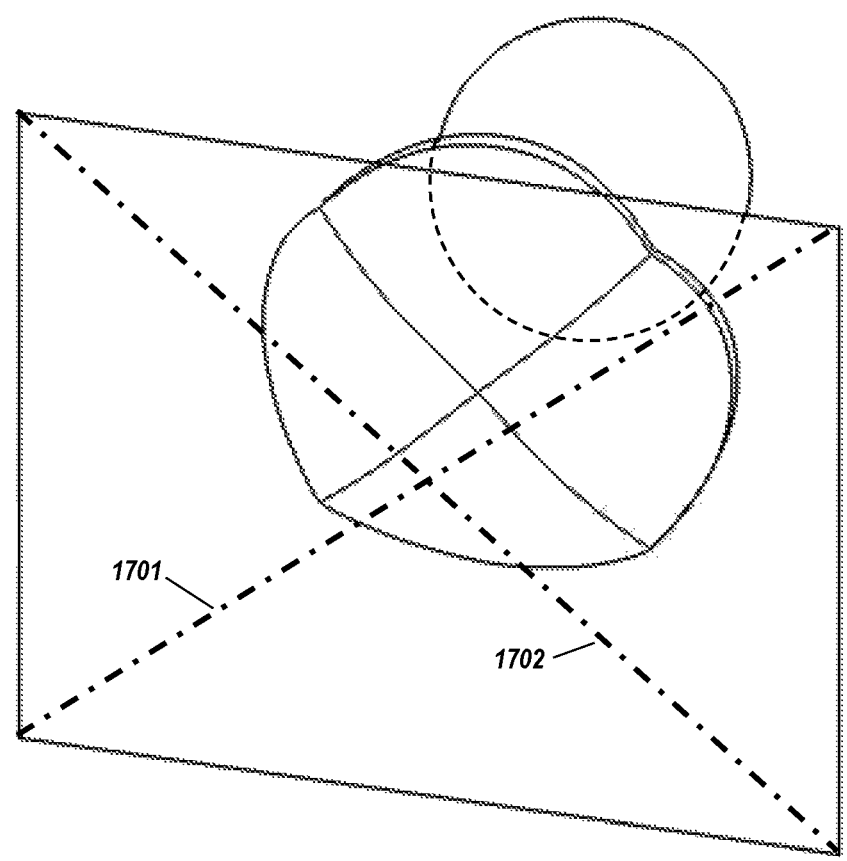
FIG. 17 is an alternative for the 4-fold configuration in FIG. 16, but rotated π/4 around the optical axis.
Figure 20:
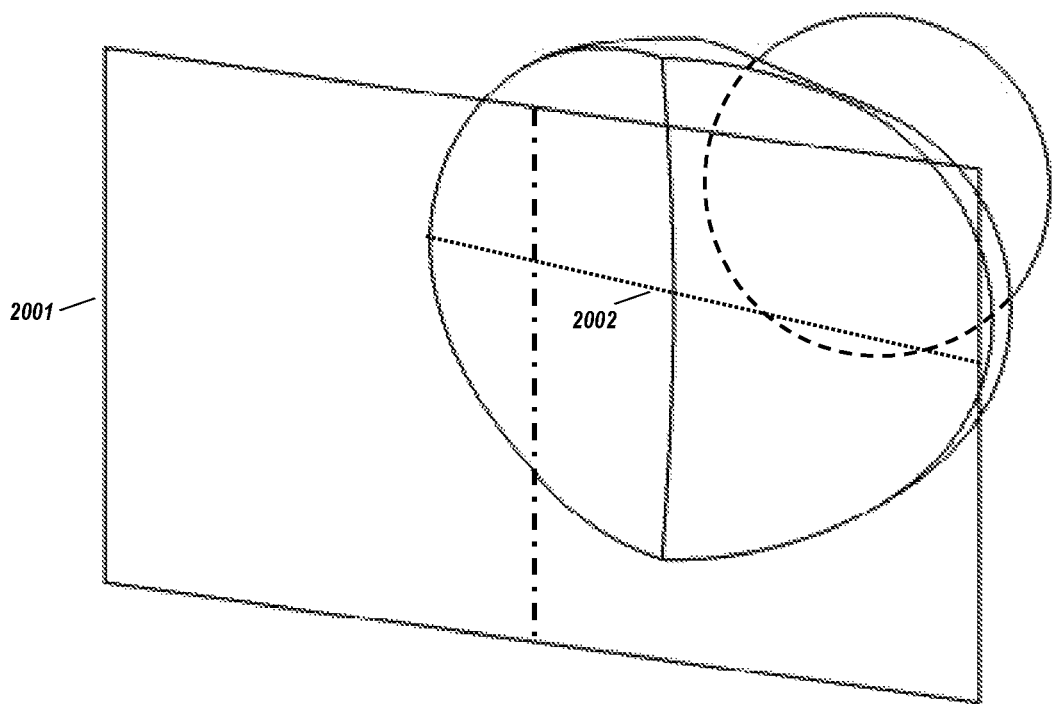
FIG. 20 is a 3D view of the 2-fold configuration of the alternative freeform designs based on large lenslets.

Preferred 4-fold configurations in FIG. 16 and FIG. 17 are suitable for digital displays with aspect ratios close to 1:1. For digital displays with aspect ratios closer to 2:1 (as for example 16:9), FIG. 20 shows another proposed configuration: the 2-fold design. While the 4-fold with a 1:1 display can produce equal horizontal and vertical field of views for both eyes, if desired, the 2-fold can produce a field of view that is typically 25 to 30% larger in the horizontal dimension than in the vertical one.

In the 2-fold design of FIG. 20, surfaces S1 and S2 are each divided into two identical sectors, resulting in a lens composed of two lenslets. The digital display 2001 is divided into two clusters as well, as shown in the figure by the chain dotted line. Each one of the two parts occupies one half of the three-dimensional space. The two sectors can alternatively be designed to be non-identical, to for instance provide different angles $H_{maxIN} \neq H_{maxOUT}$.

Figure 18:
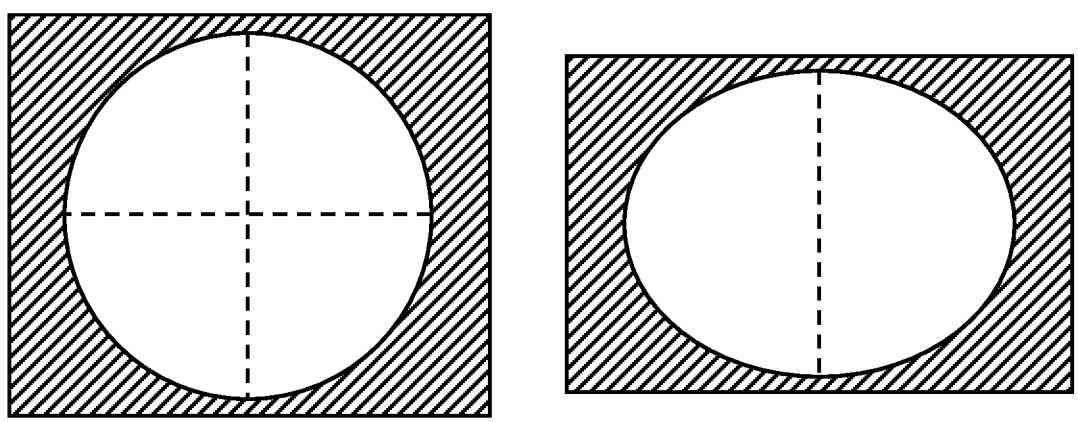
FIG. 18 compares 4 and 2-fold configurations and shows their adequateness for different aspect ratios of the digital display.

FIG. 18 shows views of the four fold and two fold lens and digital display from the front side. The lens is in the front of the image and the digital display is in the background, highlighted with black and white stripes. The figure on the left shows a 4-fold configuration, while the figure on the right shows a 2-fold configuration. The dashed lines indicate the separation between the different lenslets.

Figure 19:
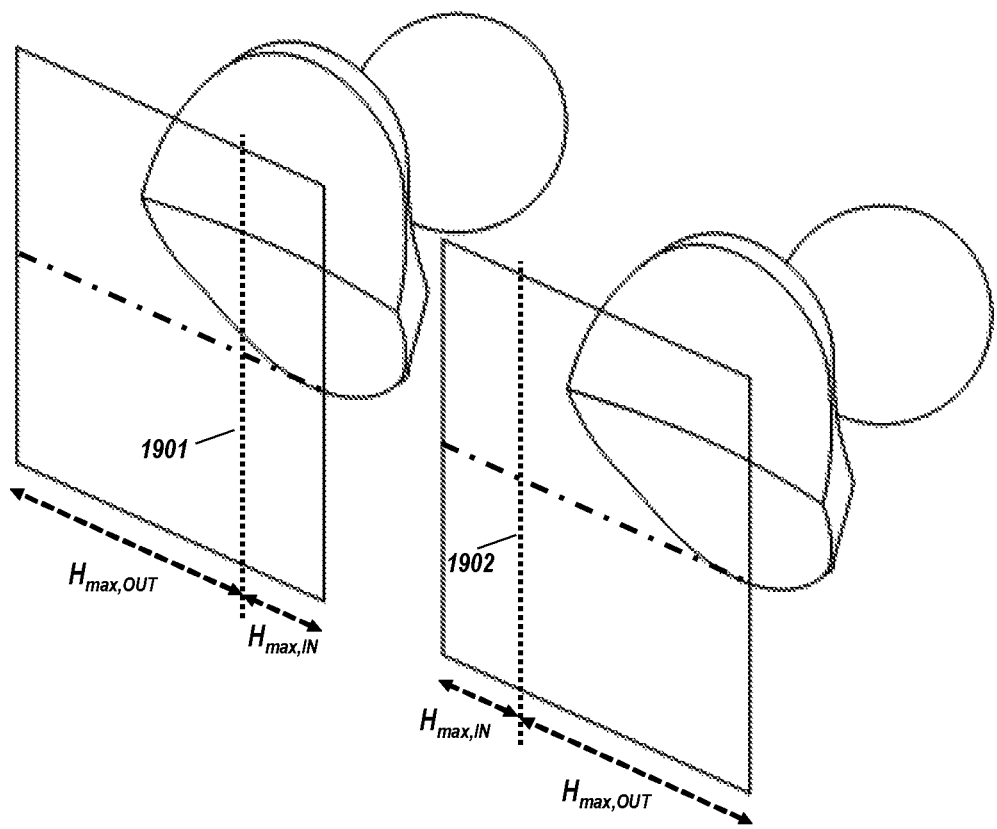
FIG. 19 shows how the 2-fold design can be used to enlarge the horizontal field of view.

It is possible to use a 2-fold configuration to provide similar horizontal and vertical field of view by using them as presented in the example of FIG. 19, where both digital displays (one for each eye) and both lenses are placed with the long side along the vertical direction. In this design, we make use of unpaired monocular designs, in which an asymmetrical field of view in the horizontal direction is used (i.e. $H_{maxIN} \neq H_{maxOUT}$) with a central region for binocular overlap. In FIG. 19 a divergent case is considered, and the vertical dotted lines 1901 and 1902 separate, for each digital display, the areas designed to be projected as the outbound part of the field of view (from 0 to $H_{maxOUT}$) and the inbound part ($0<FoV<H_{maxIN}$). In this way, we can increase $H_{maxOUT}$ value, relative to the symmetrical case, by reducing $H_{maxIN}$ and hence the overlapped area of the digital displays. We can adjust a horizontal field of view of $2H_{maxOUT}$ to be equal to the vertical field of view $V_{maxUP}+V_{maxDOWN}$.

Figure 21:
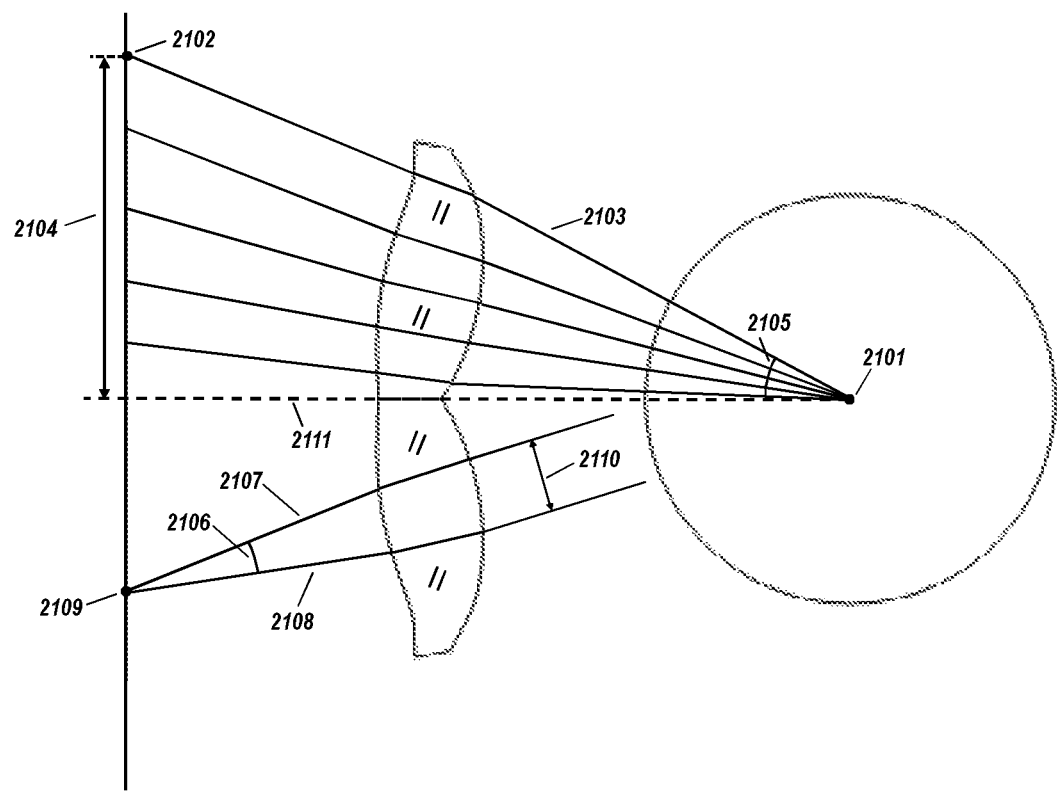
FIG. 21 explains the design procedure in the 2D cross-section for 2 and 4-fold designs.

In order to explain the procedure of these two particular designs (2 and 4-fold), a first description in 2D is provided. FIG. 21 shows a 2D cross-section view (which is the same for both designs), where the cross-section is taken on the plane of symmetry of the lenslets indicated by the dotted lines 1605 and 1606 in FIGS. 16 and 2002 in FIG. 20. FIG. 21 is then applicable to both devices since the optical design of a single lenslet is identical in both cases. The difference between them is the replication of the lenslets in the 3D space, leading to a 4-fold or a 2-fold configuration.

As the upper half of FIG. 21 shows, for any given direction of the rays following the gaze vector (i.e. rays traced back from the center of the eye sphere 2101), the lens focuses the rays from a particular opixel 2102 on the digital display, following a particular mapping between opixels in the digital display and ipixels in the virtual screen. When the virtual screen is at infinity, the inverse of that mapping takes the form $x=F(\theta)$ where x denotes the opixel coordinate in this 2D-cross section and θ the ipixel angle with respect to the z axis 2111. It is particularly interesting to select the function $x=F(\theta)$ so its slope $F'(\theta)$ for small θ values (i.e., in the gazed region on the virtual screen) is larger than its slope at large theta values (i.e., in the outer region of the virtual screen), since that slope is proportional to the size of the ipixels and they are preferably smaller where the eye usually gazes.

For the particular case of ray 2103 in FIG. 21, this mapping is defined by distance 2104 of the opixel to the z axis and angle 2105 of the exit ray arriving to the eye. Hence, each single point of surfaces S1 and S2 is designed for the ray following the gaze vector passing through the respective point. Additionally to this, the anastigmatic condition is imposed as well. This second condition implies that, at the limit in which angle 2106 tends to zero, such angular extension 2106 of the ray beam defined by extreme rays 2107 and 2108 coming from a certain opixel 2109 is proportional to the width 2110 of the output parallel bundle, and that proportionality constant being $F'(\theta)$. By applying these two conditions to both surfaces S1 and S2, the lens is built for the whole field of view of the device, as detailed in Section 6.14.2 Annex B. The design of FIG. 21 has, for a display with 48.4 mm full length in the cross section shown in FIG. 21, FOV of 104 deg measured as the angle subtended by the lens surface S2 from the point of intersection of z axis 2111 and the eye sphere.

Figure 22:
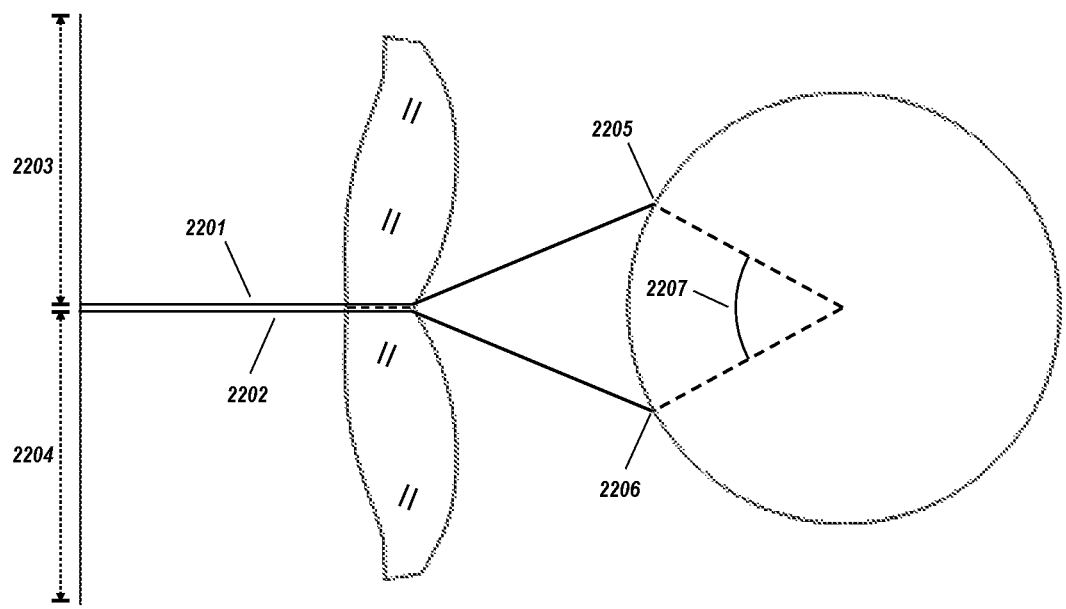
FIG. 22 analyzes the optical cross-talk issue for 2 and 4-fold designs.

When designing one of these lenses, for the best results it must also be guaranteed that no optical cross-talk between the lenslets occurs. FIG. 22 shows the same 2D cross-section as FIG. 23, which is valid for explaining both 4-fold and 2-fold designs. Rays 2201 and 2202 coming from the edges of clusters 2203 and 2204 respectively impinge on the borders of surfaces S1 and S2 and after that, impinge on the edges (2205 and 2206) of the pupil range, which is defined by angle 2207. This design condition ensures that every ray coming from any point inside the pupil range region will not experience optical cross-talk. Consequently, our design fulfills the condition of no optical cross-talk.

Figure 23:
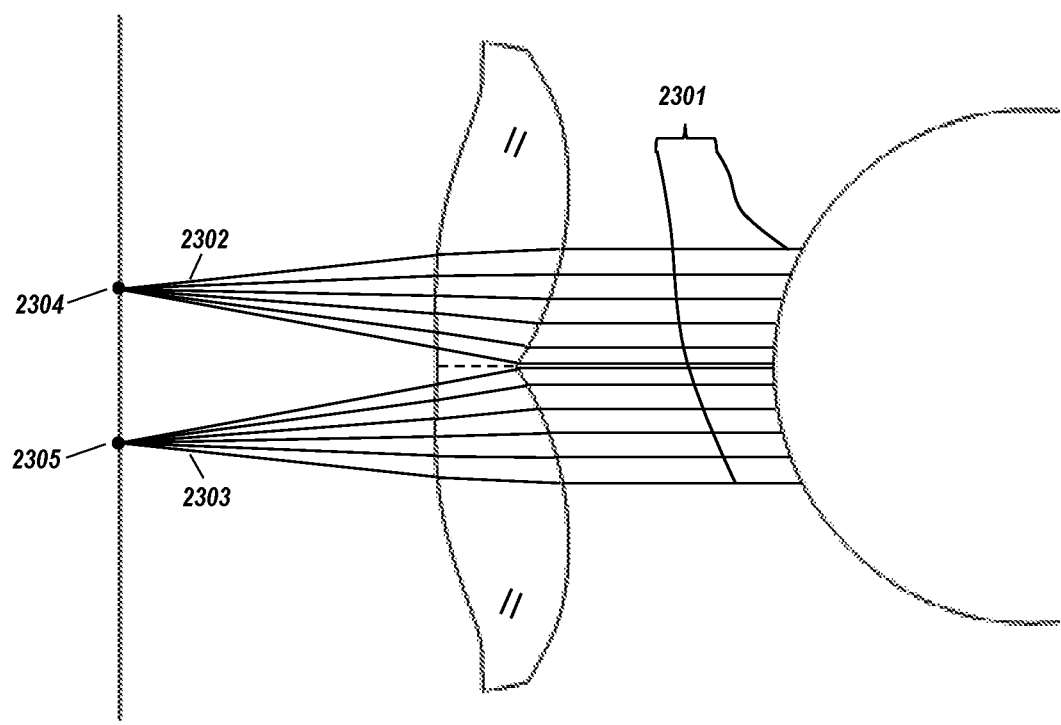
FIG. 23 shows how for a certain direction the eye is looking at, the light comes from different points of the digital display. These points belong to different clusters, but to the same web.

When the eye is looking towards the central part of the lens (i.e. region of separation of the lenslets), it receives light from all the clusters. In this sense, FIG. 23 plots the particular situation where the gaze vector is parallel to the axis containing two planes of symmetry of the whole system. The ray bundle 2301 associated with the ipixel in the front direction and arriving at the eye pupil is the result of the addition of the two different ray bundles coming from the two clusters in the 2-fold configuration or the four different ray bundles coming from the four clusters in the 4-fold configuration (of which two bundles 2302 and 2303 are represented in this two-dimensional cross section). Each one of these bundles 2302 and 2303 contains the information of a different opixel (2304 and 2305 respectively), but all the opixels belong to the same web as explained in Sections 6.2 and 6.3.

Figure 24A:
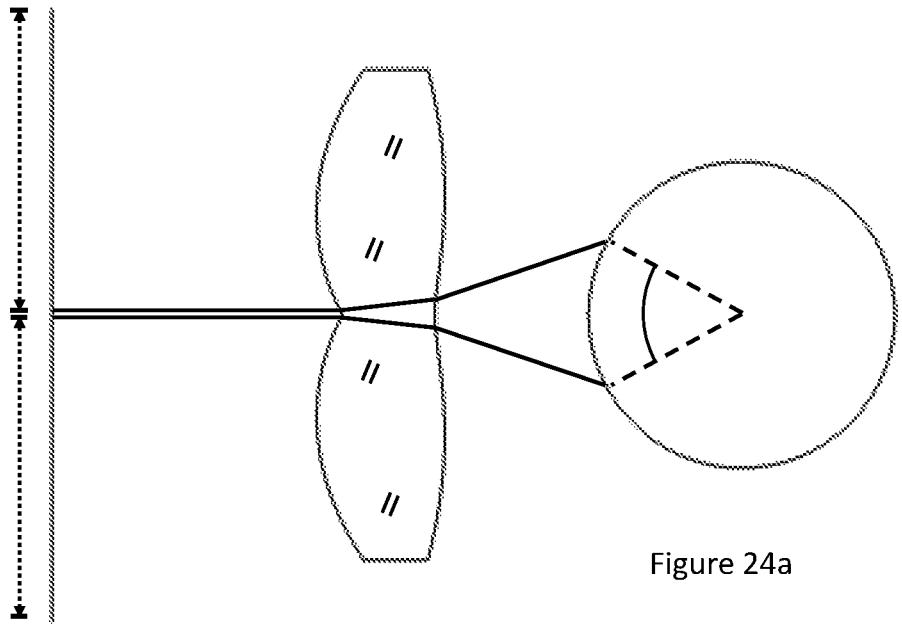
FIGS. 24a and 24b, collectively
Figure 24B:
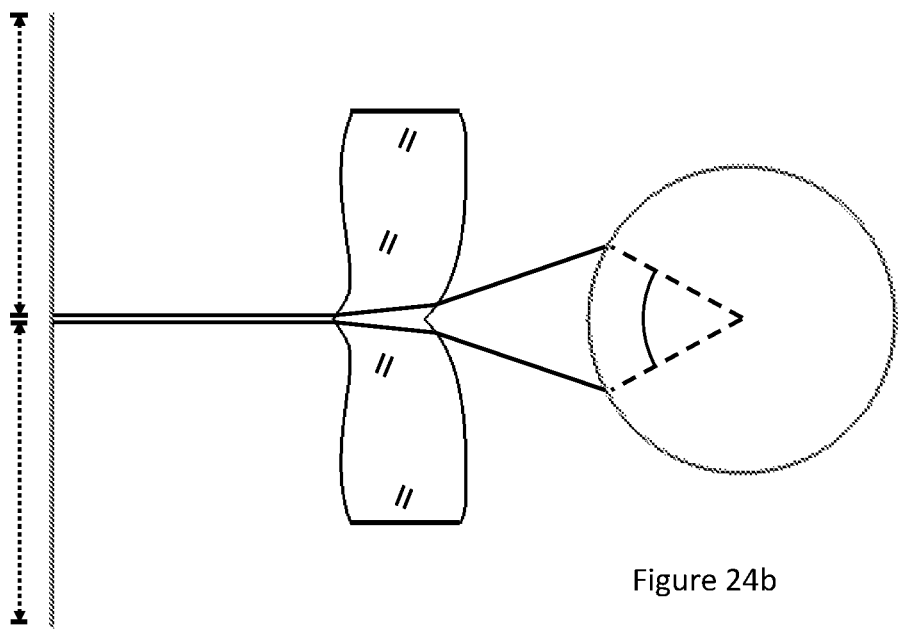

In the device presented in FIG. 22, surface S2 is designed to present the smallest kink possible while keeping surface S1 being continuous and differentiable in 2D (although that differentiability does not need to be kept in 3D). This continuity and differentiability condition helps to reduce the chromatic aberration, but it is not essential and in some cases it can be dropped, for instance, to obtain a system with a longer focal distance (for the same compactness). As shown in FIG. 24a, these roles can be exchanged and an alternative design can be developed in which surface S1 has a kink at the intersection between the two lenslets, while surface S2 remains continuous and differentiable. In the same way, both surfaces may be non-differentiable at the same time, giving place to alternative designs, such as that presented in FIG. 24b.

Up to this point, only the design in the 2D cross-section has been detailed. In order to obtain the whole 3D device, as shown in FIGS. 16, 17, and 20, the design is also developed in the perpendicular direction. For this purpose, we start with a second order approximation in y computed as described in Annex B:

$$z(x,y) = c_0(x) + c_1(x)y^2 \quad (4)$$

Figure 25:
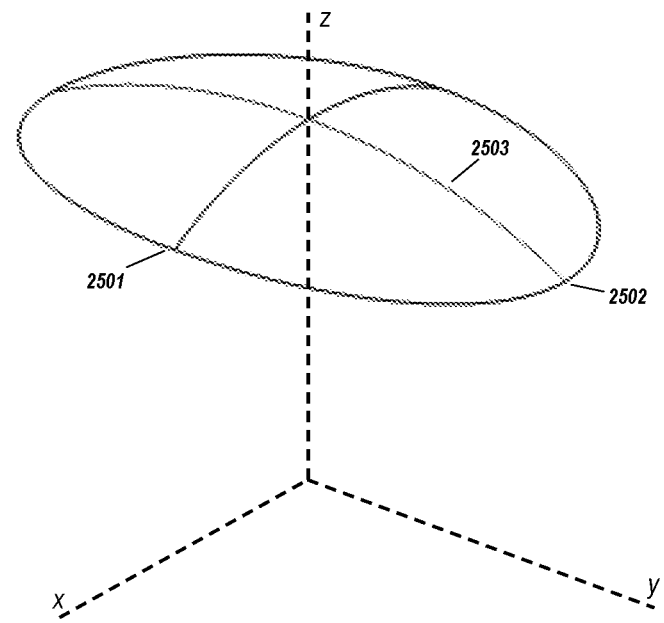
FIG. 25 shows how the development of one of the surfaces of the lenslets is carried out.

In order to obtain the whole freeform device, as shown in FIGS. 16, 17, and 20, higher order polynomials are used to describe surfaces S1 and S2 of the device in particular described with the following expression, represented in FIG. 25:

$$z(x, y) = \sum_{i=0}^{N/2} \sum_{j=0}^{N-2i} c_{ij} \left(\frac{x}{x_{max}}\right)^j \left(\frac{y}{y_{max}}\right)^{2i}. \quad (5)$$

In order to obtain bounded values for coefficients $c_{ij}$, the normalization terms $x_{max}$ and $y_{max}$ have been included inside the powers, where $x_{max}$ indicates the maximum expected x value for the whole surface, defined by coordinate x of point 2501 on the periphery at y=0, while $y_{max}$ indicates the maximum y value, defined by coordinate y of peripheral point 2502. Notice that because the surfaces are symmetrical with respect to plane y=0, only even powers of y take non-zero values. N indicates the maximum order of the polynomial. By taking this polynomial basis to describe our surfaces, we can identify coefficients $c_{0,j}$ for j=0, . . . , N as those coefficients that will define the 2D cross-section line in the x-z plane.

Figure 26:
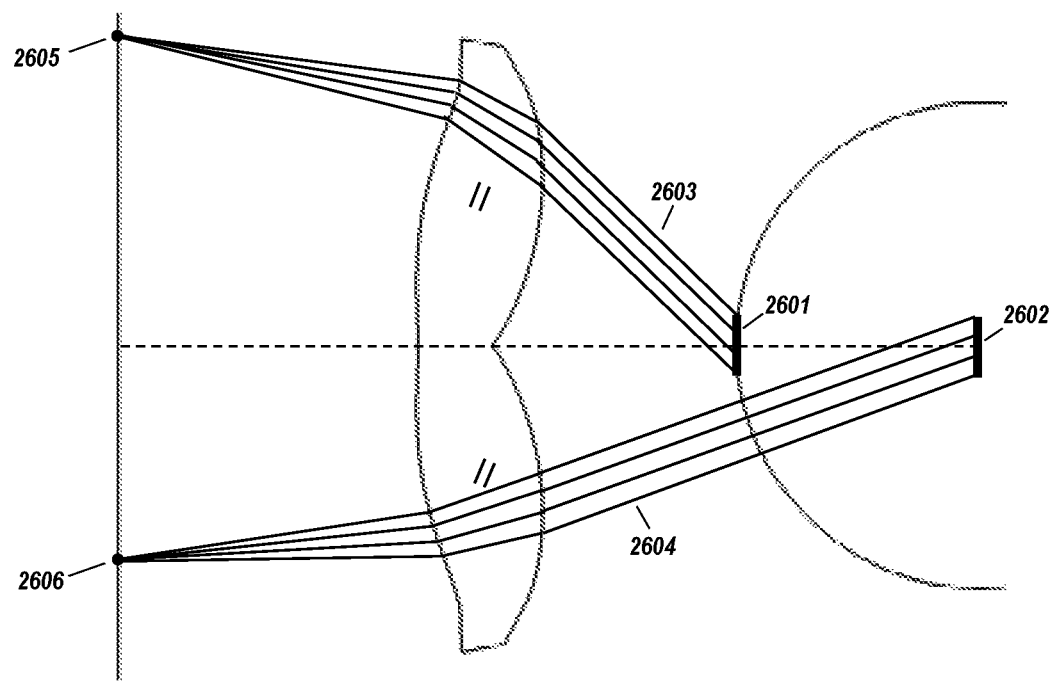
FIG. 26 explains the optimization process of the surfaces, by using two eye pupils simultaneously.

Using as a starting point the coefficients $c_{0,j}$ for j=0, . . . , N calculated as described in Annex B, and zero for the rest of coefficients, an optimization process to find better coefficients surfaces S1 and S2 in Equation (5) is carried out. This optimization may be done with raytrace software for instance using standard Damped Least-Squares DLS algorithm and the merit function is built using two different eye pupils (see FIG. 26): pupil 2601 is fixed in the front position of the eye sphere, while pupil 2602 is placed in the center of the eye sphere. Both eye pupils are considered since both positions are important to ensure good enough image quality formation for the whole pupil range and for a wide range of peripheral angles. Reversed raytraces (2603 and 2604 as examples in FIG. 26) are carried out from both pupils towards the digital display. As merit functions, this optimization process uses a RMS weighted addition of the spot sizes (2605 and 2606 for the two different ray fans represented) generated on the digital display by the reversed rays coming from both pupils. The weight employed for the merit function is the value of the eye resolution for the corresponding peripheral angle, shown in FIG. 15. The optimization is done from the surface center increasing the number of fields and the polynomial orders (i.e. N) gradually.

In this way, only one of the lenslets has been designed, while the remaining ones are generated by rotating it π/2, π and 3π/2 around the axis, respectively, for the 4-fold design, and π around the optical axis for the 2-fold design.

An alternative representation of the surfaces of the lenslets to that given by Equation (5) can be employed: freeform Q-polynomials proposed by Forbes can be used, as have been described in Section 6.5. The following Table 3 shows the Forbes coefficients that describe an example of a particular lenslet design with f=22 mm, FOV=105 degs (all parameters in mm, except c in mm$^{-1}$). These coefficients have already been optimized. Notice that coefficients $b_n^m$ are null due to the symmetry presented by the lenslet (θ=0 corresponds to the x axis in Equation (5)).

TABLE 3

| Parameter | surface 1 | surface 2 |
|---|---|---|
| c | −0.04624 | 0.0370646 |
| $\rho_{max}$ | 11.38539 | 9.5633283 |
| $a_0^0$ | 21.4216 | −1.25981 |
| $a_1^0$ | −17.0855 | 1.026467 |
| $a_2^0$ | 17.58572 | −0.90851 |
| $a_3^0$ | −15.2972 | 0.799384 |
| $a_4^0$ | 11.61614 | −0.68892 |
| $a_5^0$ | −7.32616 | 0.565563 |
| $a_6^0$ | 3.741265 | −0.44083 |
| $a_7^0$ | −1.44019 | 0.322648 |
| $a_8^0$ | 0.357253 | −0.21538 |
| $a_9^0$ | −0.02484 | 0.122751 |
| $a_{10}^0$ | −0.01264 | −0.05409 |
| $a_0^1$ | −142.362 | −0.37253 |
| $a_0^2$ | 849.992 | −0.44311 |
| $a_0^3$ | −2115.81 | −0.04945 |
| $a_0^4$ | 3498.188 | 0.134498 |
| $a_0^5$ | −4118.68 | −0.07579 |
| $a_0^6$ | 3356.918 | −0.15419 |
| $a_0^7$ | −1717.39 | −0.06376 |
| $a_0^8$ | 414.7723 | −0.0484 |
| $a_0^9$ | 26.77613 | −0.11026 |
| $a_0^{10}$ | −26.515 | −0.29705 |
| $a_1^1$ | 283.1348 | −0.20878 |
| $a_1^2$ | −1215.55 | −0.45253 |
| $a_1^3$ | 2647.507 | −0.06376 |
| $a_1^4$ | −4008.36 | −0.07841 |
| $a_1^5$ | 4387.294 | 0.052356 |
| $a_1^6$ | −3317.73 | 0.060521 |
| $a_1^7$ | 1526.503 | 0.026358 |

TABLE 3-continued

| Parameter | surface 1 | surface 2 |
|---|---|---|
| $a_1^8$ | −270.828 | 0.056168 |
| $a_1^9$ | −74.551 | 0.169532 |
| $a_1^{10}$ | 31.91799 | 0.437617 |
| $a_2^1$ | −227.657 | 0.904041 |
| $a_2^2$ | 904.699 | 0.433326 |
| $a_2^3$ | −1828.52 | 0.042632 |
| $a_2^4$ | 2591.777 | 0.016862 |
| $a_2^5$ | −2659.99 | −0.09335 |
| $a_2^6$ | 1864.062 | −0.13607 |
| $a_2^7$ | −754.071 | 0.08181 |
| $a_2^8$ | 69.4308 | −0.0748 |
| $a_2^9$ | 68.48816 | −0.11869 |
| $a_2^{10}$ | −20.4576 | −0.28061 |
| $a_3^1$ | 166.8757 | −0.7623 |
| $a_3^2$ | −646.429 | −0.36776 |
| $a_3^3$ | 1244.473 | −0.05586 |
| $a_3^4$ | −1676.35 | −0.04178 |
| $a_3^5$ | 1624.954 | 0.049856 |
| $a_3^6$ | −1051.91 | 0.085304 |
| $a_3^7$ | 358.762 | 0.04915 |
| $a_3^8$ | 13.35907 | 0.051748 |
| $a_3^9$ | −54.663 | 0.082372 |
| $a_3^{10}$ | 12.60393 | 0.21584 |
| $a_4^1$ | −108.174 | 0.646347 |
| $a_4^2$ | 415.6275 | 0.328155 |
| $a_4^3$ | −767.388 | 0.046537 |
| $a_4^4$ | 986.3885 | 0.033875 |
| $a_4^5$ | −902.997 | −0.0438 |
| $a_4^6$ | 533.6401 | −0.0691 |
| $a_4^7$ | −140.283 | −0.03562 |
| $a_4^8$ | −38.4965 | −0.03793 |
| $a_4^9$ | 36.47455 | −0.05612 |
| $a_4^{10}$ | −6.68072 | −0.15977 |
| $a_5^1$ | 60.70741 | −0.54945 |
| $a_5^2$ | −235.572 | −0.26363 |
| $a_5^3$ | 418.5119 | −0.02572 |
| $a_5^4$ | −513.913 | −0.0234 |
| $a_5^5$ | 442.8379 | 0.03342 |
| $a_5^6$ | −233.894 | 0.052785 |
| $a_5^7$ | 37.15586 | 0.029499 |
| $a_5^8$ | 34.5121 | 0.031669 |
| $a_5^9$ | −20.2372 | 0.034956 |
| $a_5^{10}$ | 2.902168 | 0.11296 |
| $a_6^1$ | −28.8041 | 0.439531 |
| $a_6^2$ | 115.2821 | 0.207014 |
| $a_6^3$ | −197.373 | 0.01631 |
| $a_6^4$ | 231.415 | 0.019933 |
| $a_6^5$ | −186.491 | −0.0228 |
| $a_6^6$ | 84.78042 | −0.03906 |
| $a_6^7$ | −0.45117 | −0.02098 |
| $a_6^8$ | −21.4232 | −0.02255 |
| $a_6^9$ | 9.152641 | −0.0195 |
| $a_6^{10}$ | −0.96241 | −0.07823 |
| $a_7^1$ | 11.1249 | −0.32587 |
| $a_7^2$ | −47.2667 | −0.14997 |
| $a_7^3$ | 77.99293 | −0.00724 |
| $a_7^4$ | −87.1509 | −0.01518 |
| $a_7^5$ | 64.99739 | 0.014645 |
| $a_7^6$ | −23.6141 | 0.026483 |
| $a_7^7$ | −6.19996 | 0.013636 |
| $a_7^8$ | 10.02615 | 0.015342 |
| $a_7^9$ | −3.22639 | 0.007742 |
| $a_7^{10}$ | 0.208847 | 0.048985 |
| $a_8^1$ | −3.27376 | 0.224287 |
| $a_8^2$ | 15.44113 | 0.099152 |
| $a_8^3$ | −24.5216 | 0.000541 |
| $a_8^4$ | 26.02449 | 0.010194 |
| $a_8^5$ | −17.6653 | −0.00852 |
| $a_8^6$ | 4.261096 | −0.01693 |
| $a_8^7$ | 3.900742 | −0.00833 |
| $a_8^8$ | −3.48001 | −0.00953 |
| $a_8^9$ | 0.807029 | −0.00066 |
| $a_8^{10}$ | −0.01025 | −0.02732 |
| $a_9^1$ | 0.643438 | −0.1265 |
| $a_9^2$ | −3.64758 | −0.05435 |
| $a_9^3$ | 5.550779 | 0.002305 |
| $a_9^4$ | −5.56581 | −0.00584 |
| $a_9^5$ | 3.344548 | 0.004061 |
| $a_9^6$ | −0.19956 | 0.009119 |
| $a_9^7$ | −1.32908 | 0.004259 |
| $a_9^8$ | 0.81409 | 0.005433 |
| $a_9^9$ | −0.11163 | −0.00219 |
| $a_9^{10}$ | −0.00999 | 0.012562 |
| $a_{10}^1$ | −0.05734 | 0.060091 |
| $a_{10}^2$ | 0.484911 | 0.023799 |
| $a_{10}^3$ | −0.69876 | −0.00298 |
| $a_{10}^4$ | 0.656384 | 0.002845 |
| $a_{10}^5$ | −0.33164 | −0.00109 |
| $a_{10}^6$ | −0.08652 | −0.0035 |
| $a_{10}^7$ | 0.228142 | −0.0017 |
| $a_{10}^8$ | −0.09539 | −0.00243 |
| $a_{10}^9$ | −6.5E−05 | 0.002214 |
| $a_{10}^{10}$ | 0.003048 | −0.00418 |

Figure 27:
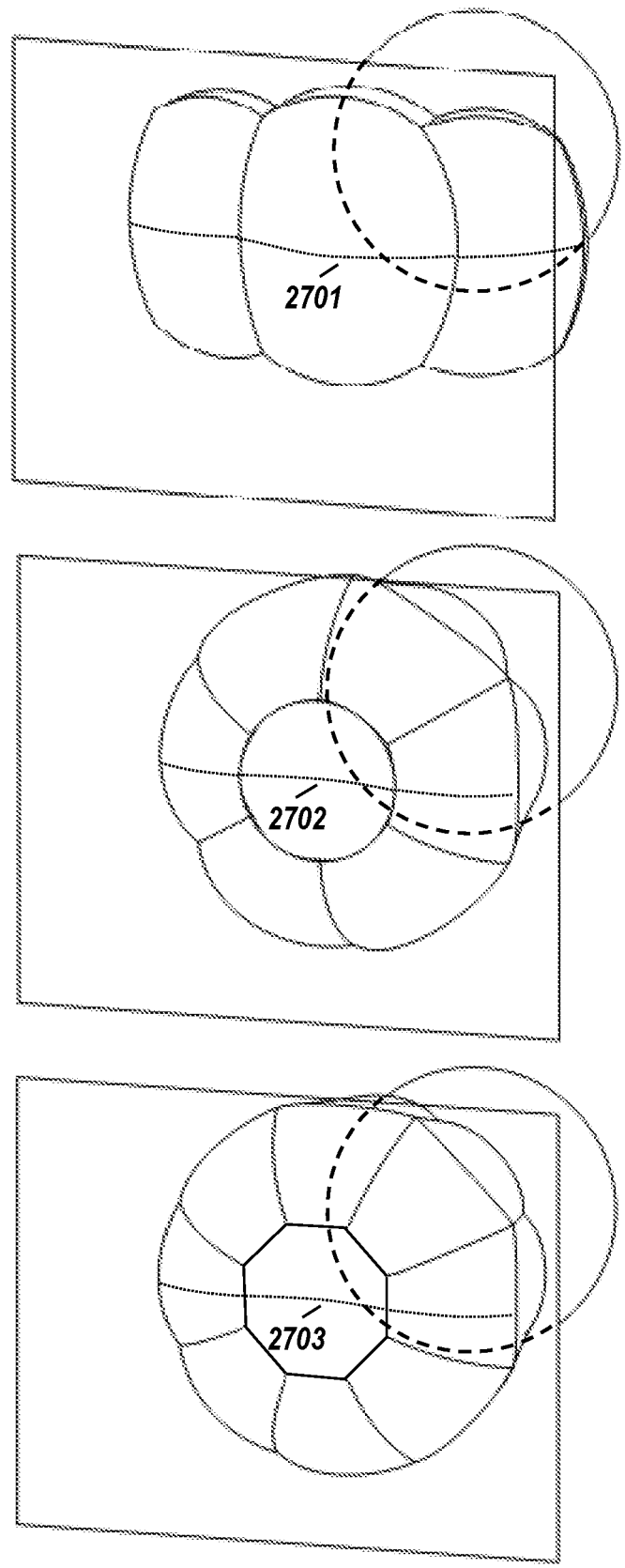
FIG. 27 presents the 3-fold (top), the 7-fold (middle) and the 9-fold (bottom) configurations.
Figure 28:
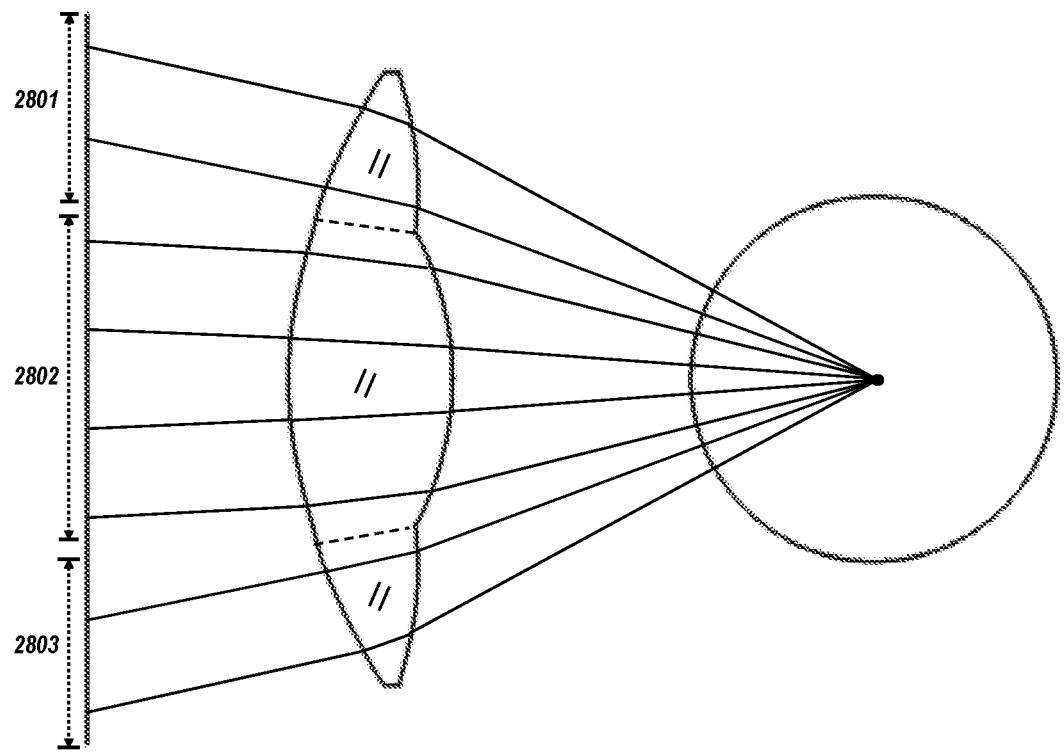
FIG. 28 shows a 2D cross-section for the 3, 7 and 9-fold designs.

FIG. 27 shows 3D views of the 3-fold (top), 7-fold (middle) and 9-fold (bottom) designs. For these designs, the digital display is placed frontwards and is divided into 3, 7 and 9 clusters respectively (the clusters are not indicated for the sake of clarity of the image). The central lenslet in these three designs can be rotationally symmetric, while the outer lenslets will be freeform. This central lenslet is the one which is going to be gazed by the eye most of the time. The boundary of the central lens of the 9-fold design shows a rather polygonal shape while the 7-fold one is circular. These are just two examples of determination of the boundaries. They are of course exchangeable, and other possible shapes are possible. In the polygonal central case the surface boundaries are obtained simply by intersection of the surfaces, which is preferred when the mold to manufacture the lenslet array is going to be made as a single piece, because surface S2 will not show steps at the boundaries between the lenslets. On the other hand, in the case of the circular central lenslet there are small steps in between the lenslets, but it is adequate to make the mold with multiple parts machined separately and assembled. Preferred 7-fold and 9-fold configurations are adequate for digital displays with aspect ratios close to 1:1. For digital displays with aspect ratios closer to 2:1 (as for example 16:9), the 3-fold design is preferable. This issue is analogous to what has been explained above for 4-fold and 2-fold configurations. Additionally, the dotted lines 2701, 2702 and 2703 indicate the profile chosen to explain the 2D cross-section shown in FIG. 28. This figure shows a 2D cross-section that corresponds to 3, 7 and 9-fold designs, because their 2D designs are identical. FIG. 28 is similar to FIG. 21 but for 3, 7 and 9-fold configurations instead of 2 and 4-fold. In this case, the 2D profile shows 3 clusters 2801, 2802 and 2803. The dotted lines inside the lens indicate the virtual separation of the different lenslets.

Figure 33:
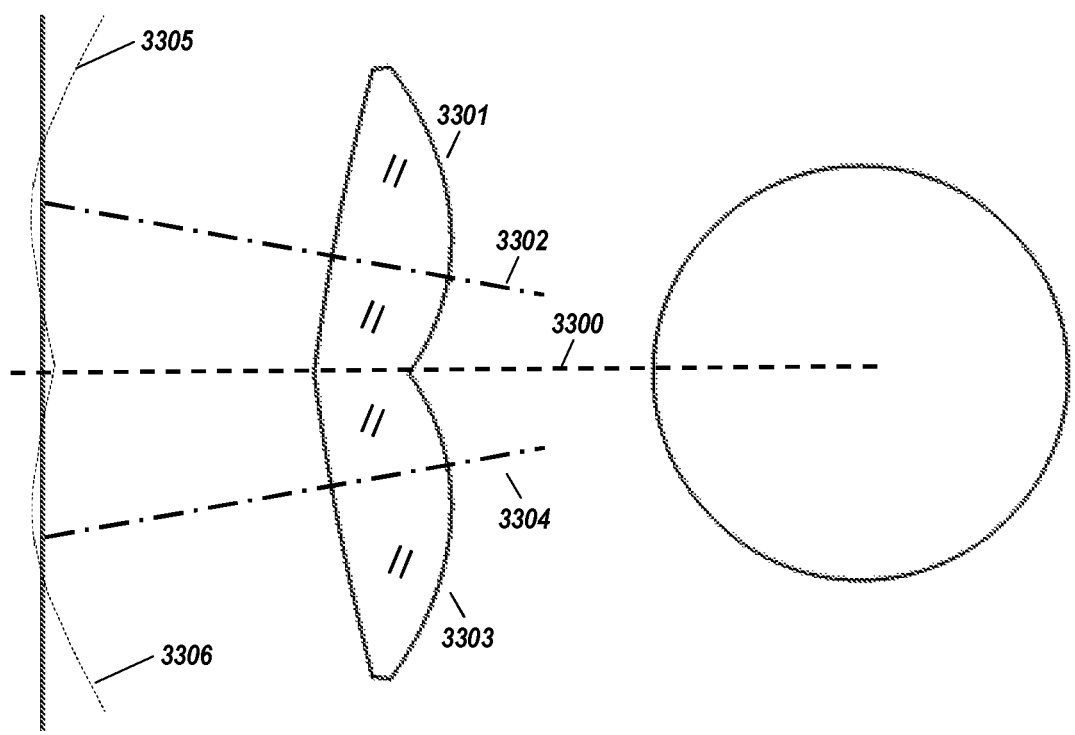
FIG. 33 shows the 2D cross-section of a 2-fold or 4-fold design which uses tilted axisymmetrical aspheric lenses.

All these designs with large lenslets can be approximated so all the lenslets are rotationally symmetric, which will usually perform less well but are easier to manufacture. For instance, FIG. 33 shows the 2D cross-section of a 2-fold or 4-fold designs made with two rotationally symmetric aspheric lenses 3301 and 3303 whose respective axes of rotational symmetry are 3302 and 3304, which are preferably tilted with respect to the symmetry line 3300. These rotational symmetric lenses 3301 and 3303 will preferably have field of curvature so their surface of best focus when reverse ray traced (i.e., where the circle of least confusion is formed) are curves as 3305 and 3306, respectively, and therefore at least the central of part of the gazed region of virtual screen will have sufficient image quality. In the case of the 3-fold, 7-fold or 9-fold designs in FIG. 27, in which the central lenslet is already rotational symmetric, the approximation would take place in the outer lenslets, which should be adjusted so the image quality in the transition from the central lenslet to the outer lenslets is similar, so the transition is not unduly noticeable.

Designs with Smaller Lenslets

In an alternative embodiment for this family of designs, the number of lenslets is increased, while for many of them their size and focal length is significantly decreased (so we will call them simply lenslets instead of large lenslets). In this embodiment, these lenslets are placed in a concentric-ring configuration, where the total number of rings can be chosen.

Figure 29:
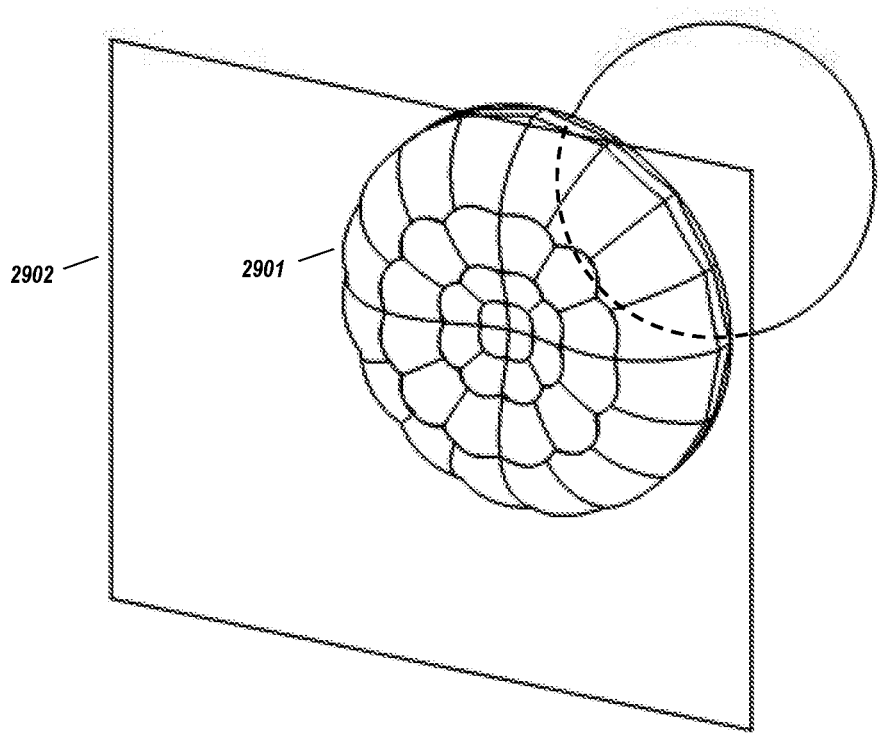
FIG. 29 presents a 3D view of a particular design with 40 small lenslets.

FIG. 29 shows a similar image to that in FIG. 21, but for this new configuration with several lenslets in each quadrant, where FIG. 21 has only one large lenslet in each quadrant. FIG. 29 shows a 4-ring design, which is the case that will be analyzed in this section. It shows a view from the surface S1 side (remaining surface S2 hidden) with the different lenslets of the lens 2901. The digital display 2902 will consequently be divided into the same number of clusters as the total number of lenslets contained in the lens.

Figure 30:
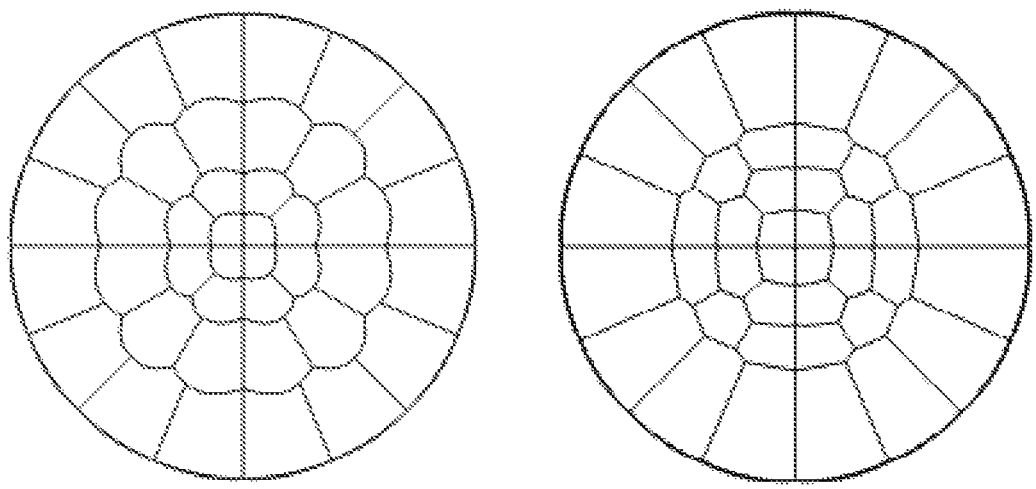
FIG. 30 shows views of surface S1 (left) and surface S2 (right) for the design with small lenslets.

FIG. 30 shows front views of both surfaces S1 (left) and S2 (right). Both show the same number of microsurfaces since they work in pairs: one microsurface of surface S1 works with its corresponding microsurface of surface S2. In this particular lens composed of 4 concentric rings, each ring contains 4 more lenslets than the adjacent ring inside it, beginning with 4 lenslets for the first inner ring. This configuration is particularly suitable to perform the ipixel interlacing of order k=2 described later in Section 6.9.1. However, different combinations of number of rings and number of lenslets for each ring are possible for this embodiment. For simpler manufacturing, the optical design of all the lenslet surfaces within a ring is identical: they are rotated instances of the same optical design and they are trimmed with different shapes to fit the concentric configuration proposed for this device.

Figure 31:
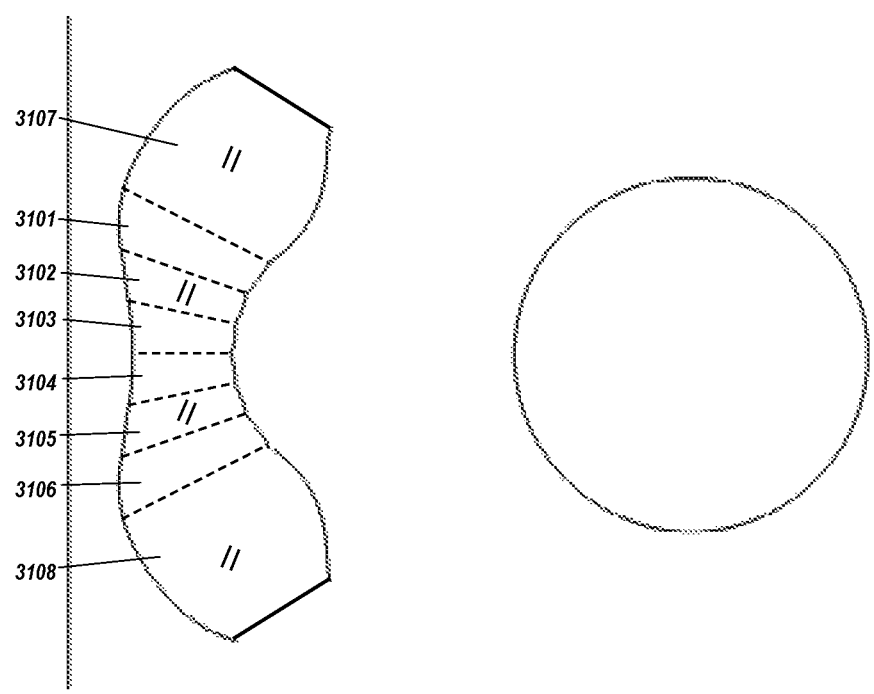
FIG. 31 is a 2D cross-section of the design in FIG. 29.

FIG. 31 shows a conceptual 2D profile of the lens of FIG. 30, taken along the planes of symmetry of each individual lenslet, where dotted lines indicate the virtual bounds between neighboring lenslets. Notice that FIG. 31 plots the 2D profile of every lenslet all in a row, but for obtaining the final lens, as shown in FIG. 30, lenslets are rotated around the symmetry axis of the system in order to obtain the desired concentric ring configuration. It will be seen from a comparison of FIGS. 30 and 31 that, in order to generate the lens of FIG. 30 by rotation, the 2D lenslets shown in FIG. 31 must actually overlap in the radial direction, and the overlaps are then eliminated by inserting the cut lines in the 3D shape. In this cross-section, S1 is designed as a continuous and differentiable surface because this minimizes the kinks in between lenslets, which helps to protect the device from optical cross-talk between neighboring lenslets, although that differentiability does not need to be kept in 3D. FIG. 31 presents the profiles of 8 different lenslets since the profile covers the whole lens (from one extreme to the other), hence this profile is symmetric with respect to the line perpendicular to the display from the eye center.

The description of the design method for these embodiments contains several aspects which are interrelated: First, the design procedure of the optical surfaces; Second, the selection of the lenslet sizes; Third, the calculation of the cluster and lenslet boundaries. The explanation that follows will cover all them.

The optical design procedure of the lenslets can be divided into two different methods: method 1, for the small lenslets, and method 2, for the large lenslets (as the lenslets 3107, 3108 contained in the outer ring). The lenslets are considered "small" here if their size is smaller than the eye pupil size, and "large" otherwise. Due to the symmetry of the lens, the lower half of the 2D cross-section of the lens is a mirrored version of the upper half. As deduced from what has been stated above, lenslets from 3101 to 3106 in FIG. 31 are generated by design method 1, while lenslet 3107 and 3108 are generated by method 2.

Figure 32:
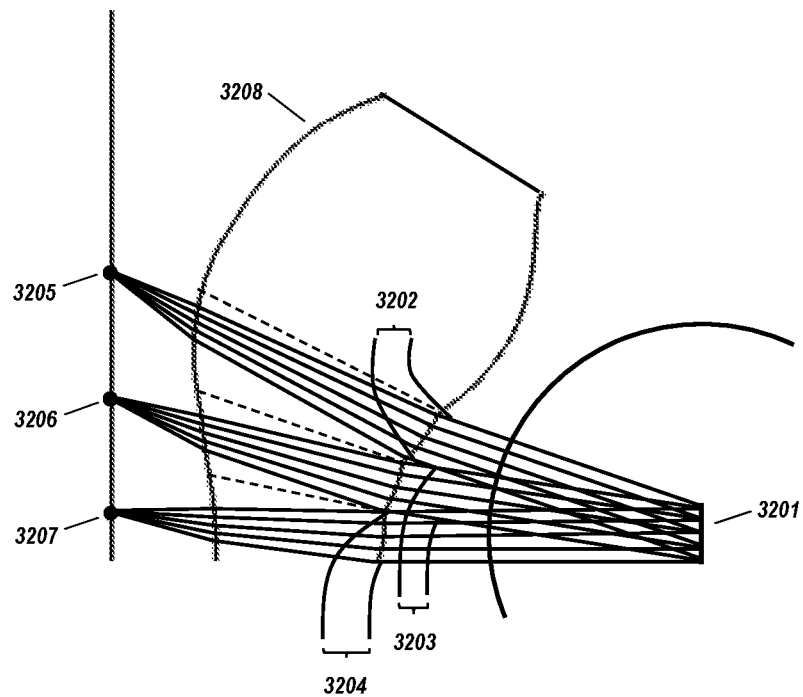
FIG. 32 explains the design procedure of the three inner lenslets of the design shown in FIG. 29.

Design method 1 is essentially the method described in Section 6.5, and is illustrated in FIG. 32. For each lenslet, we choose a bundle of reversed rays coming from an apparent eye pupil 3201 placed at the center of the eye sphere and directed towards a preferred ipixel in the virtual screen. These ray bundles are represented by 3202, 3203 and 3204 for the three different lenslets 3101, 3103, 3105 designed with this method in FIG. 31 (lenslets 3102, 3104 and 3106 are then generated by symmetry). These ray bundles are quasi-parallel since the virtual screen is very far from the eye position. The lenslet focuses this ray bundle on a chosen opixel on the digital display, following a predefined ray mapping between opixels and ipixels, so that the plane of focus (POF) coincides with the display plane. In FIG. 32, the opixels corresponding to the three ray bundles plotted are 3205, 3206 and 3207. While surface S1 is designed to be continuous and differentiable, surface S2 is designed to be continuous, with no steps between adjacent lenslets (but is not differentiable at the intersections between different lenslets).

Design method 2, employed for the outer lenslet 3208 in FIG. 32, is the same method employed for the large lenslets in Section 6.6.1, as explained with reference to FIG. 21.

Secondly, regarding the selection of the lenslet sizes, in the case shown in FIG. 31, the size of the apertures of the central lenslets has been selected to coincide to a certain small value, while the outer lenslets show a much larger aperture. The purpose of the small lenslets at the center is to allow for making the interlacing of ipixels described in Section 6.9.1, which is not necessary at the edge. The reason for making the larger outer lenslet is to increase the field of view of the device. This would not be equally achieved by adding a few small lenslets, since the overall lens profile will get closer to the eye, diminishing the eye clearance.

Figure 34:
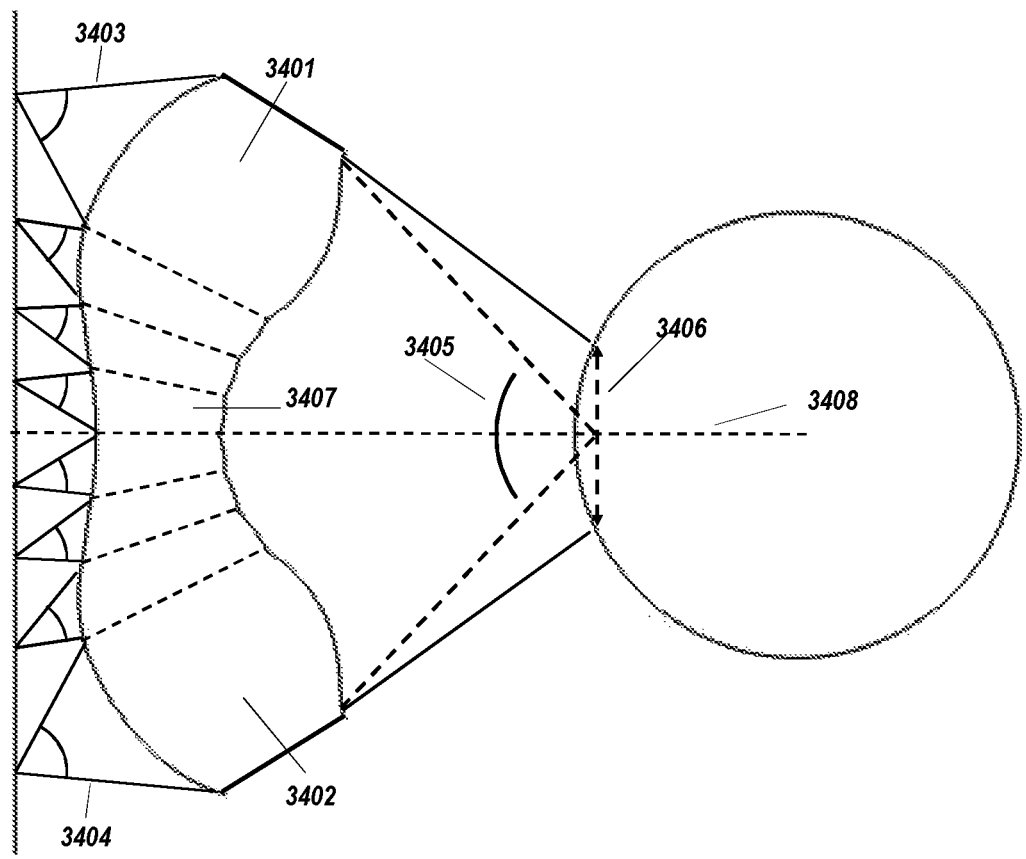
FIG. 34 shows how the étendue of the emitted light is increased due to use of large outer lenslets.

FIG. 34 shows the 2D cross-section of the design in FIG. 31 in which the angular extent of the light beam emitted from one opixel of each cluster and collected by each lenslet is shown. The aperture size d(i) of the lenslet i (where i=0 at 3103 and i=3 at 3107 in FIG. 31) projected to the plane perpendicular to its main chief ray has been selected to be equal to 2.25 mm for the inner lenslets (i=0 to i=2) and 10 mm for the outer lenslet (i=3), and all them with approximately the same focal length f=10 mm. Therefore, the f-number of the outer lenslet is smaller than that of the inner ones.

Following Winston, we can estimate a relation between different parameters, so that the étendue of the light emitted by the digital display through the lenslets in this design is approximately given by:

$$E_{disp} \approx \sum_{i=0}^{3} c(i)\frac{d(i)}{f(i)} = l\sum_{i=0}^{3} \frac{c(i)}{l} \frac{d(i)}{f(i)} = l\left(\frac{d}{f}\right) \quad (6)$$

Where f(i) is the focal length of lenslet i, c(i) is the length of cluster i, l is the length of the digital display in the 2D representation, and <d/f> denotes the weighted average of d/f.

Also, the étendue of the light entering the eye is approximately given by:

$$E_{eye} = 2PR\sin\left(\frac{FoV}{2}\right) \quad (7)$$

where PR is the linear size of the pupil range 3406 and FoV is the field of view 3405. Since both étendue values must be equal, we can conclude that smaller the f-number f/d of the outer lenslet is, the larger the average d/f value will be, and then the larger the field of view of the device will be.

Third, regarding the calculation of the cluster and lenslets boundaries, two steps are needed: one, its definition in the 2D design; and then, its definition on 3D.

Figure 35:
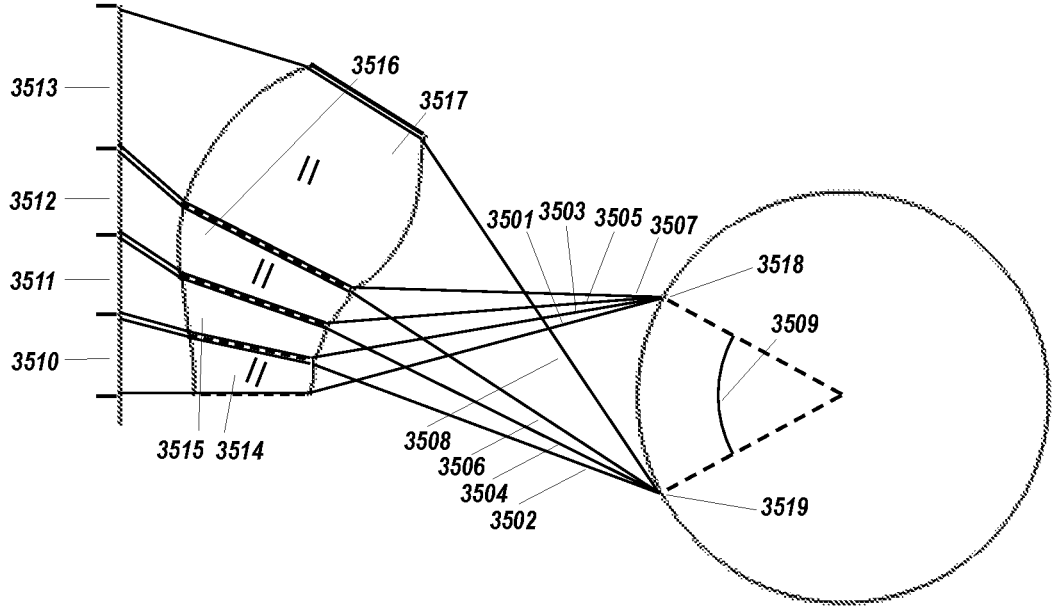
FIG. 35 explains in 2D the definition of the different clusters for the small lenslet case.

For the 2D design, the definition is similar to what has been explained in FIG. 22 for the previous designs with large lenslets. FIG. 35 shows how this device is also designed in order to avoid optical cross-talk and keep the slope discontinuities small. Rays from 3501 to 3508 come from the extremes of the different clusters 3510, 3511, 3512, 3513 of the digital display. The different clusters 3510 to 3513 are separated by the small horizontal lines on the left side of FIG. 35. These extreme rays 3501 and 3508 pass through the borders of the lenslets 3514, 3515, 3516, 3517 and then are directed towards the edges of the pupil range (the same for all lenslets), defined by angle 3509. The procedure in order to define the clusters' upper and lower bounds on the 2D design is described in the following lines with the help of FIG. 35. The four clusters analyzed here are indicated in the figure by 3510, 3511, 3512 and 3513:

1. Reversed ray 3501, coming from the upper bound of the pupil range 3518, travels towards the lower bound of surface S2 of lenslet 3514, which is placed on the symmetry axis of the design axis 3408 in FIG. 34.

2. Ray 3501 is refracted by surface S2, and travels inside lenslet 3514 parallel to the symmetry axis.

3. Since the lower bound of cluster 3510 must be placed on the symmetry axis of the design, then the surface S1 of lenslet 3514 at its lower point (which is the point where ray 3501 hits) must be parallel to the surface of the digital display in order to send the ray to cluster 3510 lower edge.

4. Ray 3502, coming from the lower bound of the pupil range 3519, travels towards the upper bound of surface S2 of lenslet 3514.

5. Ray 3502 is refracted by surface S2, and travels inside lenslet 3514. After being refracted by surface S1 of lenslet 3514, the ray impinges on cluster 3510 at its upper bound.

6. For lenslet 3515, ray 3503, coming from the upper bound of the pupil range 3518, travels towards the lower bound of surface S2 of lenslet 3515.

7. The refracted ray on surface S2 must be parallel to ray 3502 travelling inside the lens in order to ensure that no optical cross-talk occurs, and that there is no dead space between clusters on the digital display. Assuming the radii of the cusps in the lens surface are negligible, since rays 3502 and 3503 may be considered to impinge on the same physical point (despite these two points belonging to different lenslets) and travel in the same direction inside the lens (as shown in FIG. 35), the rays are coincident. Hence, the output ray 3503, after being refracted on surface S1, will also be coincident with output ray 3502 (since surface S1 is continuous and differentiable) and will impinge on the same point on the digital display, which is the upper bound of cluster 3510 and the lower bound of cluster 3511 at the same time, ensuring that the different clusters are not overlapped.

8. Rays 3504 and 3506 must satisfy analogous conditions to those explained for ray 3502 in steps 4 and 5, but for lenslets 3515 and 3516 and for clusters 3511 and 3512, respectively.

9. Rays 3505 and 3507 must satisfy analogous conditions to those explained for ray 3503 in step 6, but for lenslets 3516 and 3517 and for clusters 3512 and 3513, respectively.

10. The upper bounds of surfaces S1 and S2 of lenslet 3517 are designed so that reversed ray 3508 impinges on the upper bound of cluster 3513 of the digital display.

Notice that the pupil range has remained unaltered across the whole procedure explained above in order to define the clusters on the digital display. This means that the positions of the upper and lower bounds 3518 and 3519 of the pupil range 3509 have not changed. Alternatively, edges 3518 and 3519 can be chosen to be different for some or all of the lenslets. In particular, the lower edge 3519 of the pupil range can be at higher positions (i.e. closer to 3518) for the upper lenslets. One choice is to select the variable point 3519 so that the ray linking the eye center with the center of the lenslet surface S2 bisects the angle subtended by the pupil range at the center of the eye. This alternative embodiment with variable edge points 3518 and 3519 makes it possible, for a given field of view, to increase the pupil range angle 3509 for the central lenslets. Optical cross-talk will appear at high peripheral angles, beyond the angle fixed as constant in the example. However, that is not so critical. When the eye is turned downwards, there will be cross talk at the upper edge of the field of view, but when the eye is turned downwards, the viewer is unlikely to be paying attention to the upper edge of the field of view. Therefore, the effective pupil range is augmented with little offsetting deterioration of the image quality.

Figure 36:
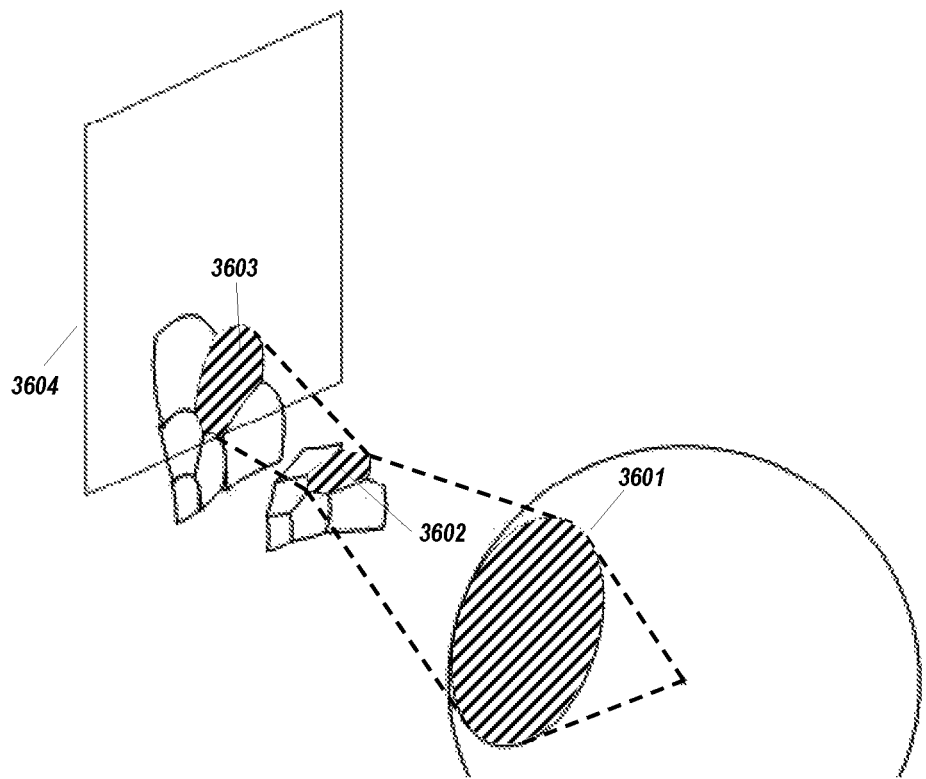
FIG. 36 explains in 3D the definition of the different clusters for the small lenslet case.
Figure 37:
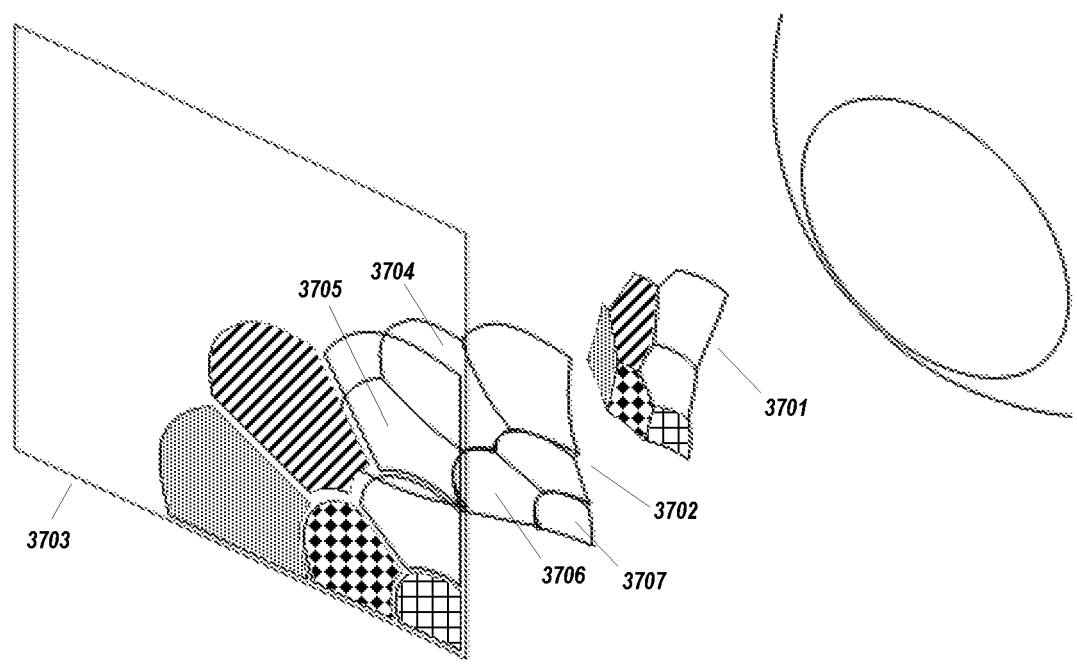
FIG. 37 explains in 3D the definition of the different clusters for the small lenslet case, as a continuation of FIG. 36.

Now, the definition of cluster and lenslets boundaries in 3D is done as illustrated in FIG. 36 and FIG. 37. For the sake of simplicity, FIGS. 36 and 37 only show one quarter of the digital display, one quarter of surfaces S1 and S2 and only the lenslets of the three inner rings of the design. The lenslets boundaries on surface S2 are calculated by the intersection of the lens units according to the replication scheme indicated in FIG. 30. In order to define the boundaries on surface S1 and for the clusters on the digital display, a reversed raytrace is carried out, throwing rays from the pupil range 3601. First, these rays are refracted by surface 3602, which is the surface S2 of a chosen lenslet, and impinge on surface 3603, which is the surface S1 of the corresponding lenslet, as shown in FIG. 36, where both surfaces are highlighted with stripes. If there is an interference of the beam print on surface S1, the condition for the minimum slope discontinuities in the steps of the 2D design must be dropped, and the ray trajectories coincident inside the lens (rays 3502 and 3503, 3504 and 3505, 3506 and 3507) will be split making a sizeable separation at their points of incidence on surface S1, to be adjusted to avoid interference in 3D.

FIG. 37 shows how clusters are defined on the digital display. As in FIG. 36, reversed rays travel from the eye, pass through S2 surface 3701 and S1 surface 3702 and finally impinge on the digital display 3703. In this way, rays refracted by the striped lenslet facet of S2 are also refracted by lenslet fact 3704 of the S1 surface 3702, and finally impinge on the cluster represented by the striped part of the surface of digital display 3703. Analogous cases are presented by three other sets of surfaces and clusters, those represented with dots, squares and lines in FIG. 37 and their corresponding S2 surfaces 3705, 3706 and 3707 S1 facet. 3603 refracts the rays towards the digital display 3703, defining the cluster corresponding to the analyzed lenslet, as shown in FIG. 37. If there is an interference of the beam print on the digital display, the condition for the coincidence of the edges of the clusters in the steps of the 2D design may be dropped. There may then be a sizable guard in between them, to be adjusted to avoid interference in 3D. Then, the intersected area of the different clusters is null, so every opixel in the digital display only belongs to one cluster.

Other Optical Designs

When the digital display is flat the lenslets corresponding to the clusters far from the center of the display have very difficult conditions to fulfill and consequently either they do not work properly or they need freeform surfaces. A similar situation is found in the case of cylindrical digital display for the lenslets towards the axial ends of the cylinder (the upper and lower regions if the axis of the cylinder is vertical). One possible solution to this situation is to add a Fresnel lens with planar facets such that there is a facet for every lenslet.

Figure 38:
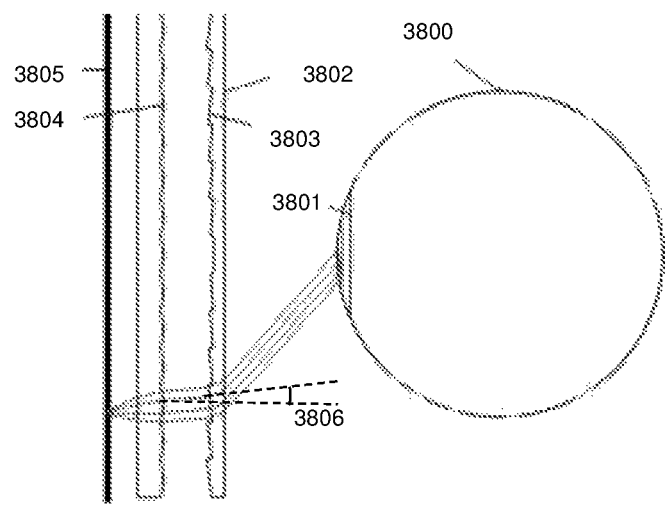
FIG. 38 is a cross sectional view of an embodiment of the present disclosure, with lenslet array and a Fresnel lens for a flat digital display.

Referring now to FIG. 38, which shows the cross section of a design for a flat digital display as the one shown in FIG. 12a, the Fresnel lens 3802 is preferably located between the eye 3800 and the lenslet array 3804. This way the (reversed) parallel rays coming from the pupil range 3801 are deflected towards the perpendicular to the lenslet array, but are still parallel. That allows all the lenslets to be identical and with rotational symmetry, or at least be much closer to be identical and with rotational symmetry. In its simpler version, the surface of the lenslet array close to the digital display can be flat, and the profile of surface S2 can be even spherical, which provides sufficient quality if the pupil range is not large (10-15 degs half angle). The separation between the Fresnel lens and the lenslet array is preferably as small as possible (even in physical contact) to minimize optical cross-talk, but for clarity a sizable gap in between them is shown in FIGS. 38 to 41. In FIG. 38, there is one facet per lenslet. Each optical channel is formed by one facet of the Fresnel lens, one lenslet and one cluster on the digital display. The tilt angle of each facet is designed so the ray coinciding with the lenslet's axis of rotational symmetry is deflected towards the center of the eye sphere. Alternatively, that condition can be relaxed so the tilt angle of each Fresnel facet is smaller, and thus easier to manufacture and causes less chromatic aberration. The ray deflected towards the center of the eye sphere is then not coincident with the lenslet's axis of rotational symmetry, but forms an angle 3806. This improves the behavior of the Fresnel facets because the chromatic aberration is decreased but degrades the performance of the lenslets because these have to work with rays further from the optical axis. The goal is to keep the image resolution higher than the human angular resolution. All the lenslets 3804 are identical and Fresnel facets 3803 may be arranged in rings around the straight line perpendicular to the flat digital display and passing through the eye sphere's center. In this case, the Fresnel facets of the same ring are identical but rotated around the normal to the digital display.

Figure 39:
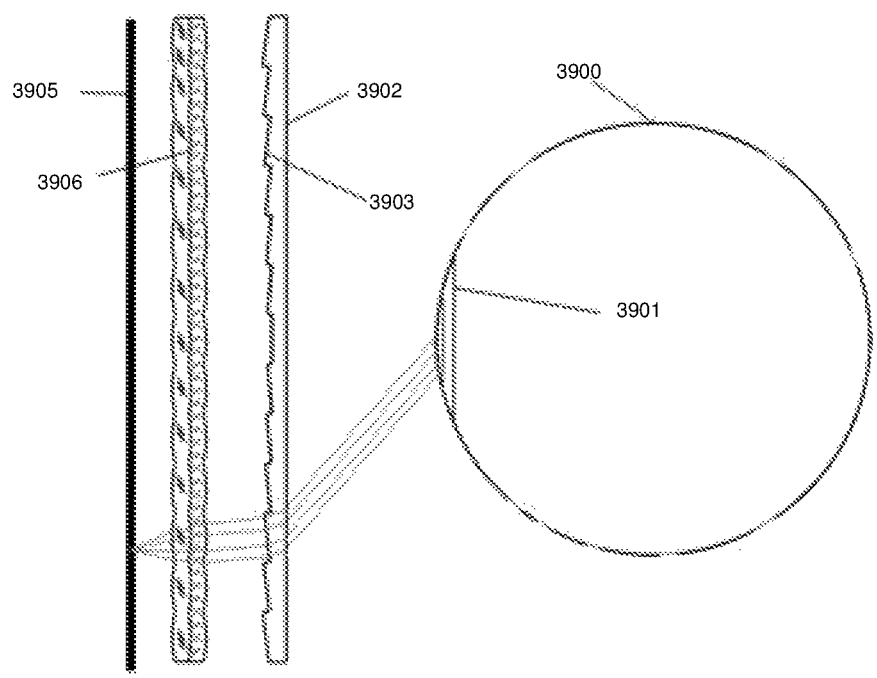
FIG. 39 is a cross sectional view of an embodiment of the present disclosure, with an achromatic doublet lenslet array and a Fresnel lens.

Note that since the Fresnel facets 3803 are flat the chromatic aberration (due to refractive index dependence on wavelength) would only cause distortion (called lateral color) but not defocusing if the RGB sources were monochromatic. This chromatic distortion can be avoided by mapping R, G and B sub-opixels independently one from the other. Nevertheless, sources are not monochromatic and then there is some defocusing effect due to chromatic aberration. This independent RGB mapping can of course be used also for any other lens design. Additionally, the chromatic aberration on the lenslet can be diminished using lenslets, of which both faces are non-flat or better using achromatic doublets 3906 as shown in FIG. 39.

Figure 40:
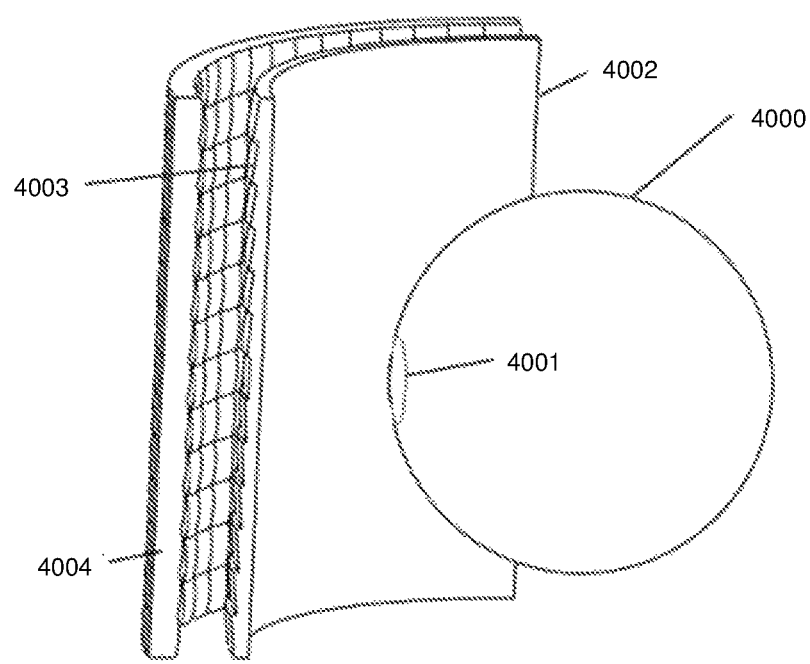
FIG. 40 is a perspective view of the lenslet array and a Fresnel lens for a cylindrical digital display with flat facets.
Figure 41A:
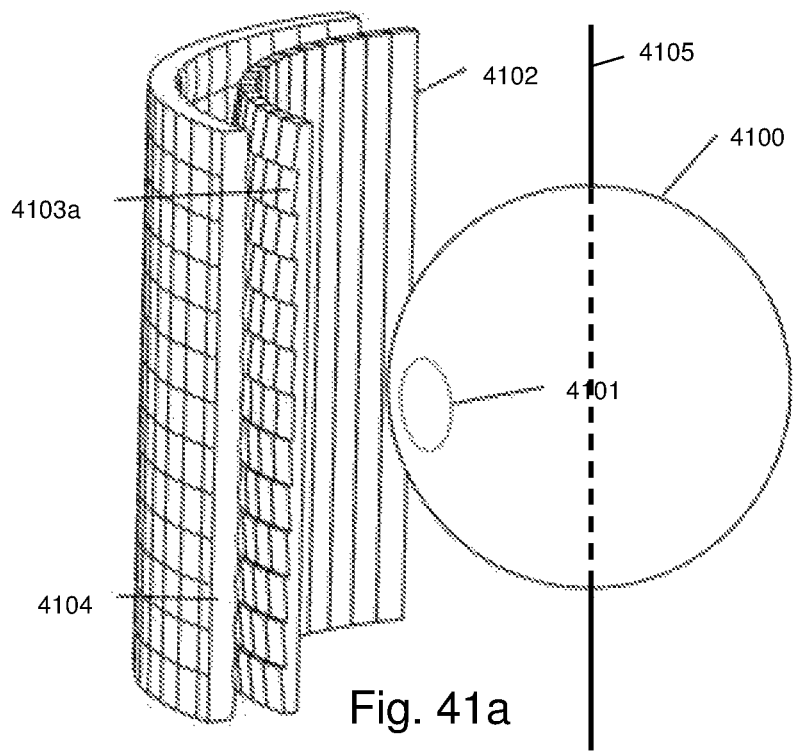
FIG. 41a is a perspective view of the embodiment of FIG. 38 with Fresnel conical facets and lenslets arranged in rows perpendicular to the cylinder axis.

Another alternative (or complementary) way to diminish chromatic aberration is using a diffractive surface instead of a conventional continuous lens surface. This can be applied to the Fresnel facets as disclosed, for instance, in U.S. Pat. No. 5,161,057 K. C. Johnson; also explained in O'Shea and Soifer. These Fresnel lenses with flat facets 4003 can also be used for cylindrical digital display as shown in FIG. 40. In this case, identical microchannels (Fresnel facets 4103 plus lenslets 4104) can be arranged in rows perpendicular to the cylinder axis (FIG. 41a).

Figure 41B:
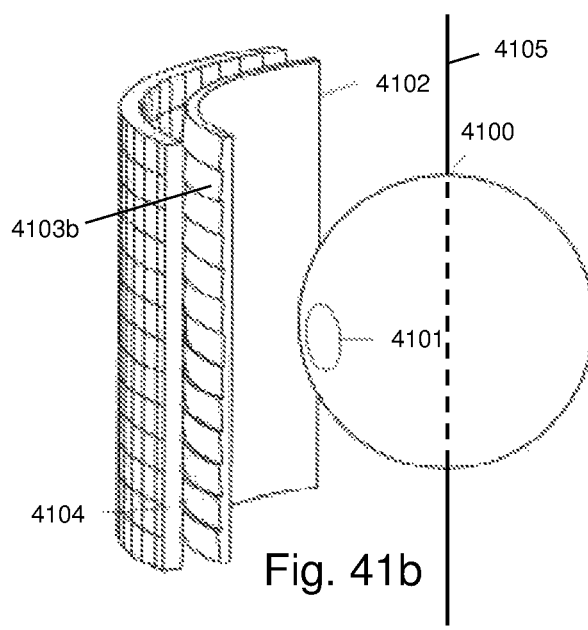
FIG. 41b is a perspective view of the embodiment of FIG. 38 with flat Fresnel facets and lenslets arranged in rows perpendicular to the cylinder axis.

As the number of optical components per cluster increases, the system performance can become better and individual component manufacturing can become easier but the full system is in general more complex, mainly due to the need for alignment of the different components. Another important disadvantage of the use of additional components, such as the Fresnel lens is the potential increase in optical cross-talk. This occurs when a ray coming from a point of the digital display reaches the pupil range through more than one channel. Since the optics of each channel is only designed for the rays coming from its corresponding cluster, then optical cross-talk is undesirable. In order to decrease the optical cross-talk between Fresnel facets 4103a of the same row, flat facets 4103a can be replaced by a Fresnel lens 4102 with continuous conical facets 4103b as shown in FIG. 41b. The disadvantage of this solution is that plane waves refracted at the Fresnel facet 4103b are no longer plane waves and consequently astigmatism appears. By introducing curvature to the meridian section of the facet, so that the facet is no longer a portion of a cone's surface, although still rotational symmetric, astigmatism can be corrected around the main chief ray. Since this curved Fresnel lens introduces an additional refractive power, the same lenslets 4104 may still be used, but may need to be located at a slightly different distance to the display to correct for the additional power.

Figure 41C:
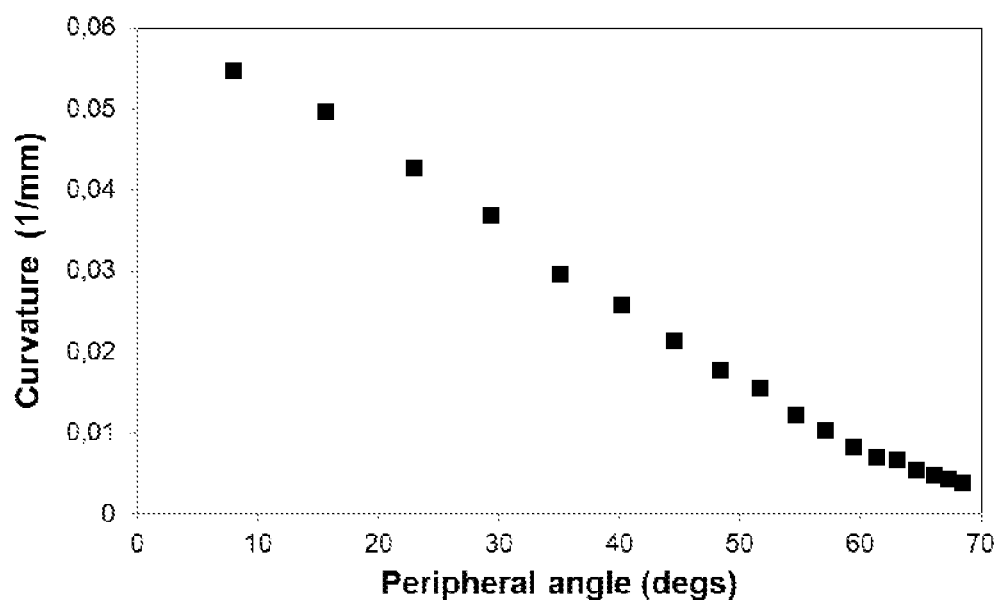
FIG. 41c shows the value of curvature for correcting the astigmatism of the facets of a Fresnel lens as a function of the peripheral angle at which that facet is seen when the eye is resting frontwards.

A similar situation happens for flat displays when the Fresnel facets are arranged in rings: optical cross-talk between Fresnel facets 3803, 3903 of the same ring is decreased when flat facets are replaced by a continuous conic facet. Again adding curvature to the meridian section gives the necessary degree of freedom to correct astigmatism around the main chief ray. FIG. 41c shows the value of the correcting tangential curvature for each facet of a Fresnel lens for a flat display such as that in FIG. 38 as a function of the peripheral angle at which that facet is seen when the eye is resting frontwards.

Figure 42:
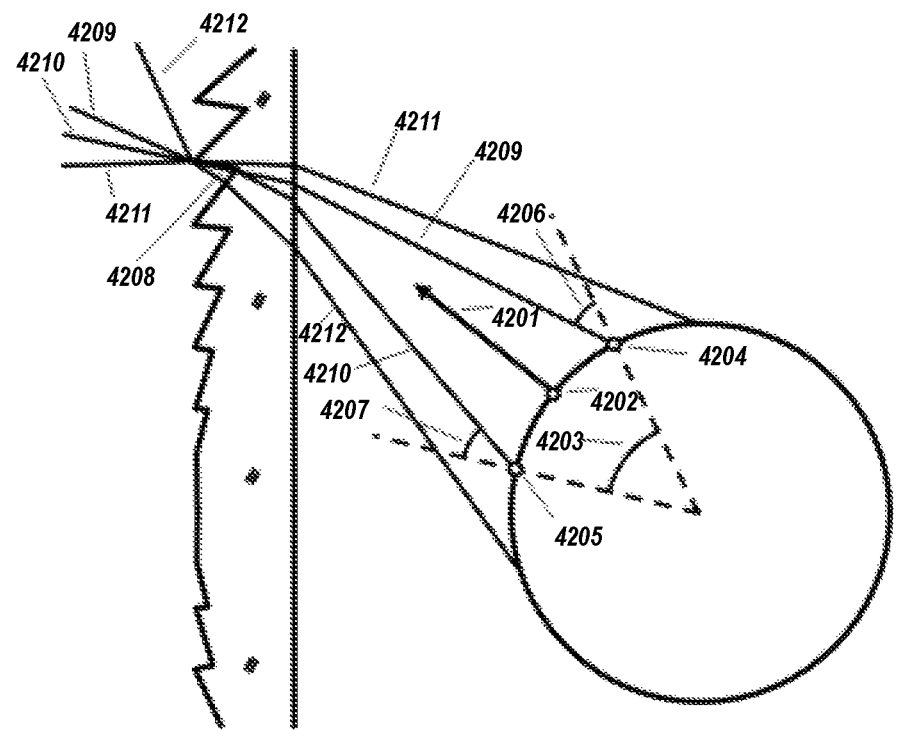
FIG. 42 is a top view schematic of gazing vector when is pointed toward one of the inactive facets of the Fresnel lens of embodiment of FIG. 38.

Every groove in the Fresnel lens has an active and an inactive facet. The design of the angle of the inactive facets of the Fresnel lens aims to minimize the influence of undesired light in the neighborhood of the gazing vector. Any ray deflected by the inactive facets of the Fresnel lens is regarded as undesired light. FIG. 42 shows certain position of the pupil 4202 with its gazing vector 4201 pointing toward one of the inactive facets 4208.

The aim of the design of a given inactive facet is that no undesired light coming from that inactive facet impinges on the pupil (at any given position) with small values of the peripheral angle. For any tilt of an inactive facet 4208, an angular range 4203 can be found for which no undesired light impinges on the eye surface. The angular range 4203 is delimited by two positions of the pupil: edge points 4204 and 4205, which are defined by rays 4209 and 4210 as indicated next. One boundary ray 4209 follows a trajectory parallel to the inactive facet inside the refractive medium of the lens, and represents the extreme case of all the rays that undergo TIR on that inactive facet. All other possible undesired rays undergoing TIR on this facet 4211 impinge on the eye out of the region free from undesired light defined by edge points 4204 and 4205. Analogously, ray 4210 follows a parallel trajectory to the inactive facet in the air (i.e. outside the refractive medium of the lens), and shows the extreme case of all the rays that are refracted on that inactive facet. The rest of possible undesired rays refracted on this facet 4212 therefore impinge on the eye outside the region defined by edge points 4204 and 4205 that is being kept free from undesired light.

In the part of the Fresnel lens closer to the eye, the preferred inactive-facet tilt-angle is chosen so the rays 4209 and 4210 limiting the region free from undesired light impinge on the eye surface with the same angle at both sides, i.e. angle 4206 is equal to angle 4207. However, at a certain distance from the eye, when the resulting point 4204 calculated that way reaches the boundary of the pupil range, the preferred inactive facet tilt angle condition is preferably changed to keeping ray 4209 at the pupil range boundary.

There is another final embodiment in which only a faceted Fresnel type lens is used (i.e., there is no additional lenslet array) but curvature is added to the flat facets to focus on the display. The curved facet will just be a standard Cartesian oval that will focus the popixel associated to the main chief ray to its corresponding ipixel. The relative position of the facet can be selected, for instance, so the main chief ray is refracted with normal incidence on surface S2. The imaging quality of this solution is only acceptable for a rather small pupil range (10-15 degs half angle), but this solution has the advantages that all the lenses are in a single piece, and the surface closer to the eye is smooth, and thus easier to clean.

Opixel to Ipixel Mapping

When using head tracking, two reference systems relative to the ipixels must be considered. One reference system $R_{ground}$ relative to the ground, in which the scene to be represented is preferably given. The second system $R_{head}$ would be relative to the head. In this section, we will refer only to the head-fixed reference system for the ipixels, while in Section 6.11 we will consider both.

Especially when used in fully immersive virtual environments, the digital information of the scene should preferably be defined in the full sphere, or a large fraction of the sphere. Therefore, a discretization (pixelization) of the coordinate system direction space should be used. The scene is then defined by three functions (R, G and B) taking different values for each of the ipixels on the virtual screen.

Consider a reference system $R_{head}$ whose origin is at the center of eye, with its first axis pointing leftwards, the second axis pointing upwards, and the third axis pointing frontwards. As an example, let us consider that the virtual screen is located at infinity, so (H,V) are the angular coordinates for an ipixel defined as H=arcsin(p) and V=arcsin(q), respectively. The unit vector of the ipixel direction is then (p, q, $(1-p^2-q^2)^{1/2}$), and H and V are the angles formed by the ipixel direction with planes whose normal vectors point leftwards and upwards, respectively. The three functions defining the scene are therefore R(H,V), G(H,V) and B(H, V). Consider the spatial coordinates (x,y) of the opixels on the digital display, which we are assuming in this example to be a rectangular digital display that could be flat or cylindrically bent.

We need to define the mapping between ipixels of coordinates (H,V) on the virtual screen and the opixels of coordinates (x,y) on the digital display, so when the opixels are lit with functions R(x,y), G(x,y) and B(x,y), the scene given by R(H,V), G(H,V) and B(H,V) on the virtual screen is recreated. In general, different mappings apply for each function R, G and B, so lateral color aberration can be corrected. Those mappings are calculated (just once) by ray tracing on the actual design, but for clarity of this explanation, a simplified mapping is presented, which can be a good approximation in some of the presented embodiments. First, continuous variables (x,y) and (H,V) are considered, and the discretization of the variables will be discussed later.

Figure 43:
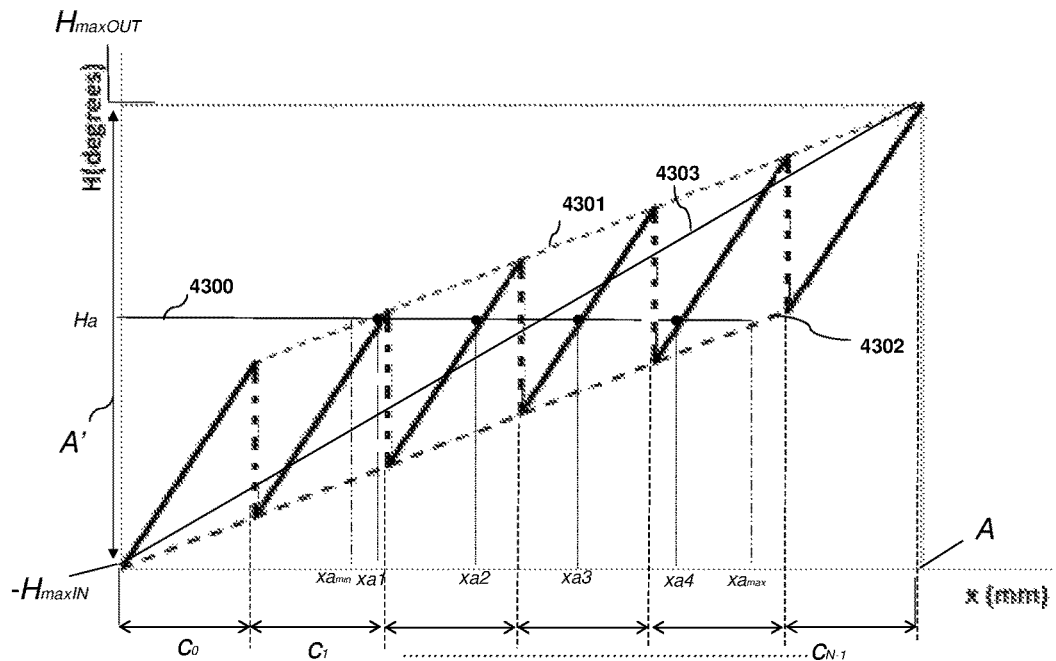
FIG. 43 is a graph showing an example of a mapping between ipixels and opixels.

Considering the case where all the lenslets have the same focal length, the relation between x and H is approximately composed by linear segments, all with the same slope 1/f, as presented in FIG. 43. In FIG. 43, each "saw tooth" represents a cluster $C_i$ of opixels, for i∈{0, N−1}. For instance, ipixel $H_a$ is mapped into opixels Xa1, Xa2, Xa3 and Xa4. Given an opixel whose abscissa is x, it belongs to cluster $C_i$, where i is the first integer greater than Nx/A, (where A is the x-coordinate length of the digital display). This opixel x is mapped to the ipixel with coordinate H given by $$H(x)=(x-x_i)/f+H_i$$

where $x_i$ and $H_i$ are the coordinates of any point on the tooth profile of cluster $C_i$. In this linear example, simple $x_i$ and $H_i$ values are given by the intersection of line 4303 with the tooth profile segments, i.e., given by $$x_i = \frac{A}{N-1}i, \; H_i = \frac{A'}{N-1}i - H_{maxIn},$$

i∈{0,N−1}

Here A'=$H_{maxIN}$+$H_{maxOUT}$, i.e., the full horizontal field.

The inverse mapping x(H) is multivalued. Then, for a given ipixel at H, we have to find first which clusters contain the opixels of the web associated to the given ipixel. This is done with the help of auxiliary lines 4301 and 4302 in FIG. 43. Those clusters $C_i$ are given by $i_{min}$<i<$i_{max}$, where $i_{min}$ is the first integer greater than $Nx_{min}$/A and $i_{max}$ is the first integer greater than $(Nx_{max}/A)-1$, where $x_{min}$ and $x_{max}$ are the abscissas of the intersection points between line 4300 and lines 4301 and 4302, which are given by:

$$x_{min}=g(H-H_{maxOUT})+A$$

$$x_{max}=g(H+H_{maxIN})$$

where $$g = \frac{A(N-1)}{A'N - \left(\frac{A}{f}\right)}$$

Then, once the clusters C, have been found, for each i the opixels coordinates are found with x(H)=(H−$H_i$)f+$x_i$, where $x_i$ and $H_i$ are given by the expressions shown above. Similar equations apply for the mapping between the y and V variables, in particular V(y)=(y−$y_i$)/f+$V_i$ and y(V)=(V−$V_i$)f+$y_i$.

Consider now the discrete case in two dimensions. The virtual screen has angular dimensions A'×B' (where B'=$V_{maxUP}$+$V_{maxDOWN}$) and a'×b' ipixels of size Δ' (so A'=Δ'a' and B'=Δ'b'). The digital display has spatial dimension A×B and a×b opixels of size Δ (so A'=Δ'a' and B'=Δ'b').

Then, each opixel is part of a matrix of indices k and l, and each ipixel is part of a matrix of indices k' and vertical index l'

$$x = \Delta \cdot k \quad k \in 0, \ldots, a-1$$

$$y = \Delta \cdot l \quad l \in 0, \ldots, b-1$$

$$H = \Delta' \cdot k' - H_{maxIN} \quad k' \in 0, \ldots, a'-1$$

$$V = \Delta' \cdot l' - V_{maxDOWN} \quad l' \in 0, \ldots, b'-1$$

There are N×M clusters, where for simplicity here N and M are factors of a and b, respectively. Each cluster is composed by a/N opixels in the horizontal dimension and b/M opixels in the vertical dimension. By substitution of these expressions into the continuous expressions, it is obtained that the ipixel (k',l') on which opixel (k,l) is mapped is given by:

$$k' = \frac{1}{f_D}(k - k_i) + k'_i$$

$$l' = \frac{1}{f_D}(l - l_j) + l'_j$$

where i and j, given by the first integer greater than Nk/a and Ml/b, are the indices of the cluster $C_{ij}$ at which opixel (k,l) belongs, and:

$$f_D = f \frac{\Delta'}{\Delta}$$

$$k_i = \frac{a}{N-1} i \quad k'_i = \frac{a'}{N-1} i$$

$$l_j = \frac{b}{M-1} j \quad l'_j = \frac{b'}{M-1} j$$

The direct mapping, that is, from opixels (k,l) to ipixels (k',l'), is the simplest way to find out the opixel to address: for a given color, as R, for each opixel (k,l) you find its corresponding ipixel (k',l'), and then assign the R value of ipixel (k',l') to opixel (k,l). Notice that the computation of k' and l' will in general not lead to integer values.

Then, the value of R to assign to opixels (k,l) can for instance be taken from the R value of the ipixel given by k' and l' rounded to the closest integer. A better approximation is obtained by an interpolation using a continuous function for R which coincides with the R values at the four closest ipixels (associated to the greatest integers smaller than k', l' and the smallest integers greater than k', l').

Note that since the mapping is surjective, the direct mapping is not efficient in the sense that the same value of R at ipixel (k',l') is read multiple times, as many times as the number of opixels in the web of that ipixel. The inverse mapping provides a more efficient way to proceed: read the R for each ipixel (k',l'), find all the opixels (k,l) in its web, and assign all them simultaneously. Moreover, this guideline for the implementation of the addressing by software of the digital display can be further optimized as discussed in section 6.9.

As in the continuous case, for the computation inverse discrete mapping, for given integer indices k' and l' of the ipixel we need to compute first which clusters $C_{ij}$ contain the opixels of the web. For this purpose, we can use the analogous formulas to those used in the continuous case for $x_{min}$ and $x_{max}$ (also $y_{min}$ and $y_{max}$), which are the formulas for $k_{min}$ and $k_{max}$ (also $l_{min}$ and $l_{max}$) given by:

$$k_{min} = g_D(k'-a') + a$$

$$k_{max} = g_D k'$$

where $$g_D = g \frac{\Delta'}{\Delta}$$

or equivalently $$g_D = \frac{f_D a(N-1)}{f_D a' N - a}$$

and:

$$l_{min} = h_D(l'-b') + b$$

$$l_{max} = h_D l'$$

with $$h_D = \frac{f_D b(M-1)}{f_D b' M - b}$$

Then, for each cluster $C_{ij}$, the k and l indices are found from:

$$k = f_D(k'-k'_i) + k_i$$

$$l = f_D(l'-l'_i) + l_i$$

where $k_i$, $k'_i$, $l_i$ and $l'_i$ are given by the expressions shown above.

Again, since the computation of k and l will in general not lead to integer values, the value of R (or G or B) to assign to ipixels (k',l') can for instance be taken from the R value of the opixel given by k and l rounded to the closest integer. A better approximation is obtained by an interpolation using a continuous function for R built which coincides with the R values at the four closest opixels (associated to the greatest integers smaller than k, l and the smallest integers greater than k, l).

Figure 55:
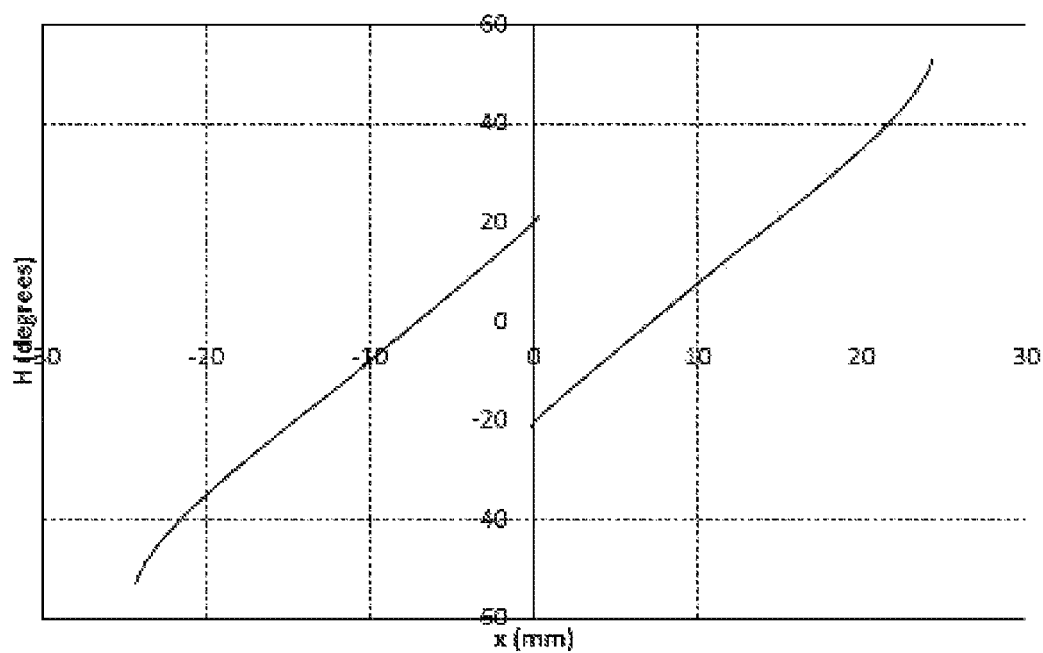
FIG. 55 describes the complete mapping H(x) between opixels and ipixels in one dimension.

Note that in a specific optical design as the ones disclosed herein, where ray-tracing is used to compute the mapping, the relation between x-y and H-V variables is not decoupled (that is, in general, H depends on both x and y, and V also depends on both x and y), and the boundaries of the clusters are not in general defined by x=constant and y=constant lines either. An example of the mapping obtained in the 2D cross section of the 2-fold design in FIG. 21 is shown in FIG. 55. This mapping therefore assigns the opixels of the digital display at the symmetry plane y=0 and the ipixels of the virtual screen at V=0.

Figure 56A:
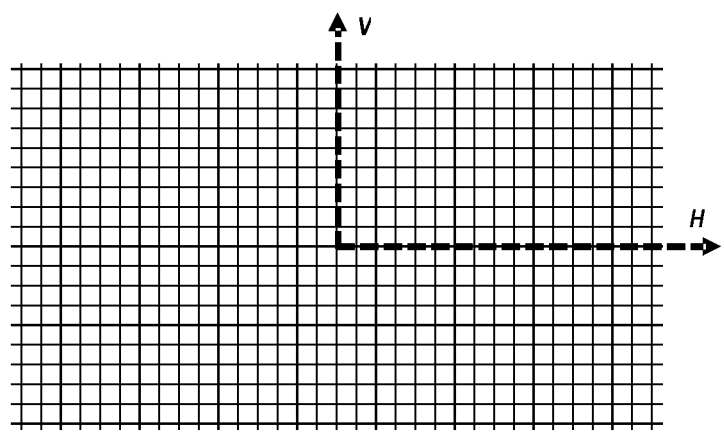
FIG. 56 describes the complete mapping H,V(x,y) between opixels and ipixels in two dimensions.
Figure 56B:
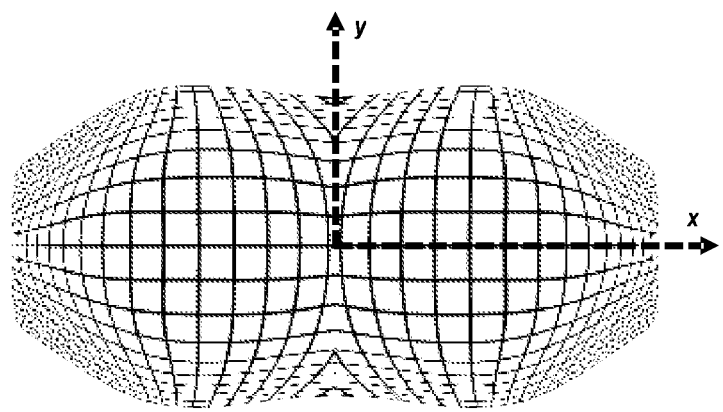

FIG. 56 also shows an example of mapping for a 2-fold configuration, but in this case, the mapping is represented in two dimensions instead in only one. This mapping can be applied to a 2-fold lens such as that in FIG. 20, for instance. The mapping algorithm is represented through a black rectangular grid on the virtual screen (FIG. 56a), and its corresponding image on the digital display (FIG. 56b). The image on the digital display clearly shows two different halves (left and right), each one corresponding to one of the two lenslets composing the lens.

The equations that describe the mapping algorithm for the 2-fold configuration can be described by the next equations:

$$V = \sum_{i=0}^{N} \sum_{j=0}^{N-i} A_{i,j} x^i y^j$$

$$H = \sum_{i=0}^{N} \sum_{j=0}^{N-i} B_{i,j} x^i y^j$$

Where H and V are the horizontal and vertical angular coordinates on the virtual screen respectively, while x and y are the horizontal and vertical coordinates on the digital display, as indicated in FIG. 56. N indicates the maximum degree of the polynomials, and $A_{i,j}$ and $B_{i,j}$ are the different coefficients for each one of the terms of the polynomials. The equations above are valid when x>0 (i.e. region of digital display corresponding to the right lenslet), while for x<0 (i.e. region corresponding to the left lenslet), the equations are the following:

$$V = \sum_{i=0}^{N} \sum_{j=0}^{N-i} (-1)^i A_{i,j} x^i y^j$$

$$H = \sum_{i=0}^{N} \sum_{j=0}^{N-i} (-1)^{i+1} B_{i,j} x^i y^j$$

Coefficients $A_{i,j}$ and $B_{i,j}$ vary among designs, but Table 4 shows their particular values for the mapping example shown in FIG. 56:

Electronic Digital Display Addressing

The digital display can be of several types, for instance, Organic Light Emitting Diodes (OLED), a transmissive Liquid Crystal display (LCD) or a reflective Liquid Crystal display on Silicon (LCOS). In all cases, a high enough resolution of ipixels on the virtual screen together with an ultra-wide FOV, imply a significant amount of information. Consider for a numerical example the case of a spherical digital display. Following FIG. 4, if $H_{maxIN}$=50 degs and $H_{maxOUT}$=75 degs, and the intended ipixel pitch is 3 arcmin, the number of horizontal ipixels would be (75+50)×60/3=2,500. For the vertical cross section, assuming $V_{maxUP}$=$V_{maxDOWN}$=45 degs, the number of vertical ipixels would be in proportion 2,500×(45+45)/(75+50)≈1,800. Therefore, the minimum amount of information to deal with is in the order of $(\pi/4) \times 2{,}500 \times 1{,}800 = 3.5$ million ipixels, where the ($\pi/4$) accounts for the case of an elliptical FOV. This minimum is a conservative number, because it can be reduced by considering that the resolution requirements of peripheral ipixels, located at the outer region of virtual screen, can be lowered since they will never be directly gazed. As presented in FIG. 9A or B, the human angular resolution decreases when the peripheral angle increases. We have calculated that matching that human resolution in the outer region of virtual screen for a pupil range of 20 degs half-angle will lower the 3.5 million opixel requirement to only 800,000 opixels.

However, since in this approach several opixels are used to create each ipixel, the total number of opixels is greater than the total number of ipixels. This allows a highly compact optics by using the lenslet structure, but introduces a formidable challenge for addressing the digital display. Taking the previous example in which the lenslet surface-S2 to eye-center distance is L=29 mm and the focal length is f=7.18 mm, the opixels size to be projected in 3 arcmin

TABLE 4

| $A_{00}$ | $A_{01}$ | $A_{02}$ | $A_{03}$ | $A_{04}$ | $A_{05}$ | $A_{06}$ |
|---|---|---|---|---|---|---|
| 0 | 0.0514 | 0 | −0.00011 | 0 | $4.52 \cdot 10^{-6}$ | 0 |

| $A_{10}$ | $A_{20}$ | $A_{30}$ | $A_{40}$ | $A_{50}$ | $A_{60}$ | $A_{11}$ |
|---|---|---|---|---|---|---|
| 0 | 0 | 0 | 0 | 0 | 0 | −0.0028 |

| $A_{21}$ | $A_{31}$ | $A_{41}$ | $A_{51}$ | $A_{12}$ | $A_{22}$ | $A_{32}$ |
|---|---|---|---|---|---|---|
| $2.2 \cdot 10^{-4}$ | $2.4 \cdot 10^{-5}$ | $-3.74 \cdot 10^{-6}$ | $1.22 \cdot 10^{-7}$ | 0 | 0 | 0 |

| $A_{42}$ | $A_{13}$ | $A_{23}$ | $A_{33}$ | $A_{14}$ | $A_{24}$ | $A_{15}$ |
|---|---|---|---|---|---|---|
| 0 | $3.9 \cdot 10^{-5}$ | $-9.2 \cdot 10^{-6}$ | $5.3 \cdot 10^{-7}$ | 0 | 0 | $-9.49 \cdot 10^{-8}$ |

| $B_{00}$ | $B_{01}$ | $B_{02}$ | $B_{03}$ | $B_{04}$ | $B_{05}$ | $B_{06}$ |
|---|---|---|---|---|---|---|
| −0.23 | 0 | −0.0011 | 0 | $-1.7 \cdot 10^{-6}$ | 0 | $-5.66 \cdot 10^{-8}$ |

| $B_{10}$ | $B_{20}$ | $B_{30}$ | $B_{40}$ | $B_{50}$ | $B_{60}$ | $B_{11}$ |
|---|---|---|---|---|---|---|
| 0.056 | −0.0028 | $3.33 \cdot 10^{-4}$ | $-2.19 \cdot 10^{-5}$ | $5.8 \cdot 10^{-7}$ | $4 \cdot 10^{-10}$ | 0 |

| $B_{21}$ | $B_{31}$ | $B_{41}$ | $B_{51}$ | $B_{12}$ | $B_{22}$ | $B_{32}$ |
|---|---|---|---|---|---|---|
| 0 | 0 | 0 | 0 | $-3.7 \cdot 10^{-5}$ | $9 \cdot 10^{-5}$ | $-1.2 \cdot 10^{-5}$ |

| $B_{42}$ | $B_{13}$ | $B_{23}$ | $B_{33}$ | $B_{14}$ | $B_{24}$ | $B_{15}$ |
|---|---|---|---|---|---|---|
| 0 | 0 | 0 | 0 | $-2.55 \cdot 10^{-6}$ | $3.4 \cdot 10^{-7}$ | 0 | would be 7.18 mm×tan(3 arcmin)=6.2 microns. Since the digital display will expand over an arc of approximately $(\theta_{maxIN}+\theta_{maxOUT})(L+f)=78.9$ mm, the number of horizontal opixels would be 78.9/0.0062≈12,700 (therefore, the number of opixels per web is (12,700/2,500)2≈26). For the vertical cross section, the number of vertical opixels would be in proportion to the angular FOV as 12,700×(45+45)/(75+50)≈9,100. Therefore, digital display would need to address in the order of $(\pi/4) \times 9,100 \times 12,700=90$ million opixels, where again the $(\pi/4)$ accounts for an elliptical FOV.

In this numerical example the selected parameters have led to 6.2 microns opixel pitch and 90 million opixels. That opixel pitch is close to what is available with present OLED on silicon technology (as the 3.8 micron square subpixels produced by MicroOled in 2013 using OLED-on-CMOS wafer technology), but 90 million opixels is beyond what is addressable with present state of the art technology. For a focal length of f=4.65 mm, the opixel pitch is reduced to 4 microns and the number of opixels reaches 90*(7.18/4.65)2=215 million.

Four solutions (see sections 6.9.1, 6.9.2, 6.9.3 and 6.9.4 below) to solve the digital display-addressing problem in the high-resolution case are disclosed next. For clarity and simplicity, the previous calculations have assumed no significant distortion in the lenslets and approximately constant cluster size. This will also be assumed in the following descriptions to illustrate the concepts: more precise calculations are within the ordinary skill in the art by using the actual mappings between ipixels and opixels of any of the disclosed optical designs.

Ipixel Interlacing

In section 6.2 the technique of ipixel interlacing was introduced to increase resolution, in which adjacent lenslets belong to different webs, each one associated to adjacent ipixels. However, interlacing can be also used to decrease the number of opixels needed. For instance, an interlacing factor of k=3 can be applied, keeping the ipixel pitch at 3 arcmin, to reduce the number of opixels from 90 million to 90/(3×3)=10 million in the f=7.18 mm case. This is only slightly higher than the Ultra High Definition (UHD) 4K standards, so also addressable in practice at present.

Parallel Addressing Via Webs

A second solution is obtained by connecting the electronic drivers of the opixels of a web physically (by hardware) in the digital display. The electronic addressing of the opixels is then done by webs instead of by individual opixels. Since only webs (or equivalently ipixels) need to be externally addressed, for both the f=7.18 mm and f=4.65 mm cases, this is only 3.5 million distinct addresses, which is less than half the number of the 4K UHD available at the time of writing. The reduction factor equals the number of opixels per web, which is 90/3.5=26 for f=7.18 mm and 215/3.5=61 for f=4.65 mm case.

Figure 44:
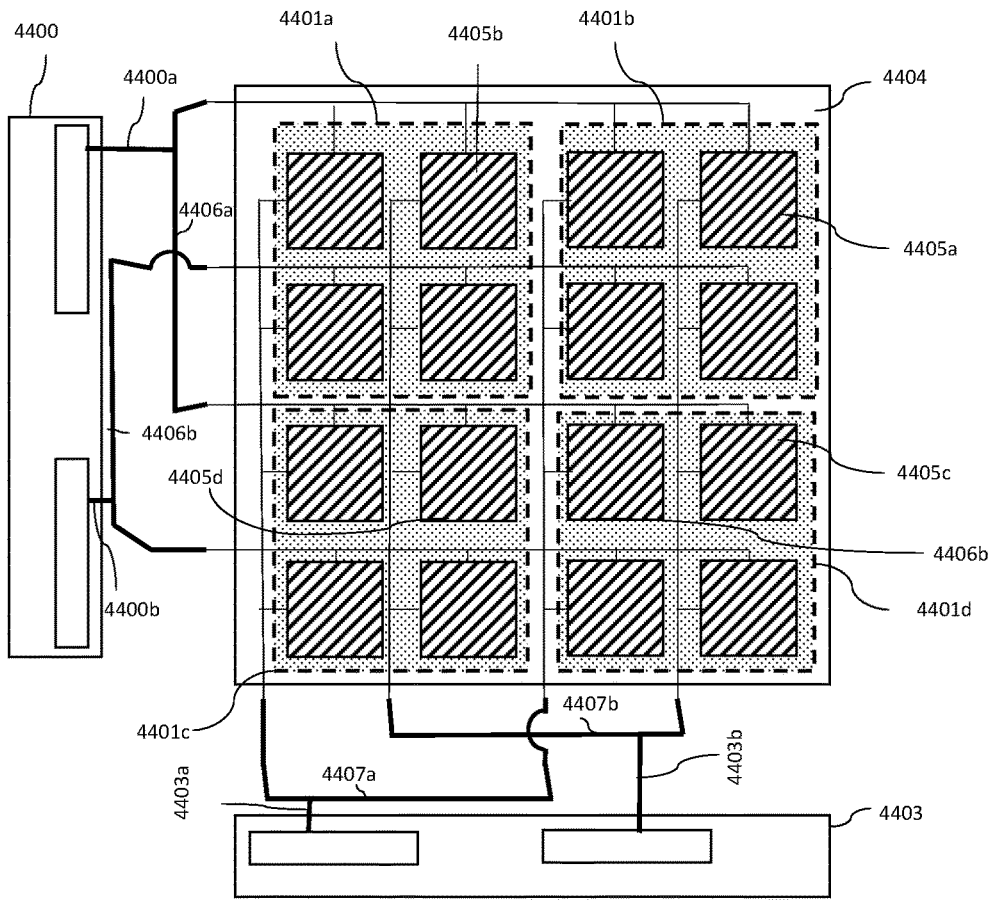
FIG. 44 is a schematic block diagram of an active matrix digital display.

To understand how the hardware interconnection of the web can be done in an efficient way, a brief explanation should be given about how the digital display is typically addressed. FIG. 44 shows a simple block diagram of the active matrix digital display, digital display presenting only 16 pixels, just for clarity of explanation. It consists of an array of pixels 4404, a select line driver 4400, and a data line driver 4403. For each opixel such as 4405a, the Select Line 4400a has to be on to allow the opixel to display the information provided by the Data Line (4403b in the example of the opixel 4405a). In this matrix, each opixel row is connected to the Select Line 4400a or 4400b and each opixel column is connected to the data line 4403a or 4403b. Observe that inside array 4404 there are 4 select lines that are parallel connected in pairs outside array 4404 so only 2 select lines (4400a or 4400b) are independent. The Select Line of the first row of opixels 4405a, 4405b, etc. is connected to the Select Line of the third row of opixels 4405c, 4405d, etc. through the connection 4406a, and the Select Lines of the second and fourth rows of pixels through the connection 4406b. The same happens with the data lines. The ones from the first and third column of pixels are connected through connection 4407a, and the same goes to the second and the fourth Data Lines using connection 4407b. These connections (4406a, 4406b, 4407a, 4407b) outside array 4404 define the webs. Due to these connections, the select lines (4400a or 4400b) and the data lines (4403a or 4403b) are not addressing individual opixels anymore but individual ipixels. This concept is trivially extensible to any number of opixels, webs and clusters.

In each cycle, the Select Line Driver 4400 only activates the Select Line n, and only the ipixel of the row n will acquire the information provided by the Data Line Driver. On the next cycle, only the Select Line n+1 is activated, thus only the ipixel of the line n+1 acquire the information. This continues until all the lines of ipixels have displayed the information, and then a new frame is initiated. If the number of opixels of the digital display is very large, the cycle's period has to be sufficiently short such that the frame rate is acceptable for the application in purpose.

FIG. 44 presents a simple block diagram of the digital display with webs. In one embodiment, a digital display may have a plurality of opixels, and a plurality of webs, each of them with a plurality of opixels. The webs do not have necessarily the same number of opixels. Just for clarity of explanation, the block diagram only presents a matrix of sixteen opixel, with four webs, each of four opixels. For example, opixels 4405a, 4405b, 4405c, and 4405d form a web. In this block diagram, the opixel are grouped into four clusters (4401a, 4401b, 4401c, 4401d), each one corresponding to a lenslet.

In another aspect of the present disclosure, the Input Select Lines and Data Lines (i.e., the externally connecting lines) are physically allocated such that different lines are connected to enter the array at a different cluster, as opposed to their all being connected at the same cluster. This feature avoids a high density of connections in a small portion of the digital display, decreasing its manufacturing complexity.

In another embodiment, the opixels of each web in the digital display may be electrically interconnected by hardware such that all of them turn on and off always at once even though they are not configured in a rectangular matrix, as occurs in a lenslet polar arrangement in FIG. 12A. Alternatively, a software solution consists in simultaneously addressing the Select Lines of the same web, and placing the same averaged information on the corresponding data lines. In any case, it implies a decrease in the number of independent Select and Data Lines.

Parallel Addressing Matching the Human Angular Resolution

Another technical solution can be used to reduce the digital display-addressing problem. It consists of decreasing the resolution of the display or the number of Select and Data lines required, by using the fact that the resolution needed close to the boundary of the clusters is relatively low. The present description will refer to the gazed region of virtual screen, but it can be trivially applied to the outer region of the virtual screen, where the human angular resolution needed is even lower and thus the reduction factor derived from the gazed region of virtual screen is conservative.

As presented in FIG. 9A, the human angular resolution decreases when the peripheral angle increases. This can be used to decrease the number of opixels in areas of the digital display that the eye only sees at a high peripheral angle. In the presented optical designs, this property of the human vision can be used to decrease the number of pixels of each cluster corresponding to each lenslet.

Figure 45:
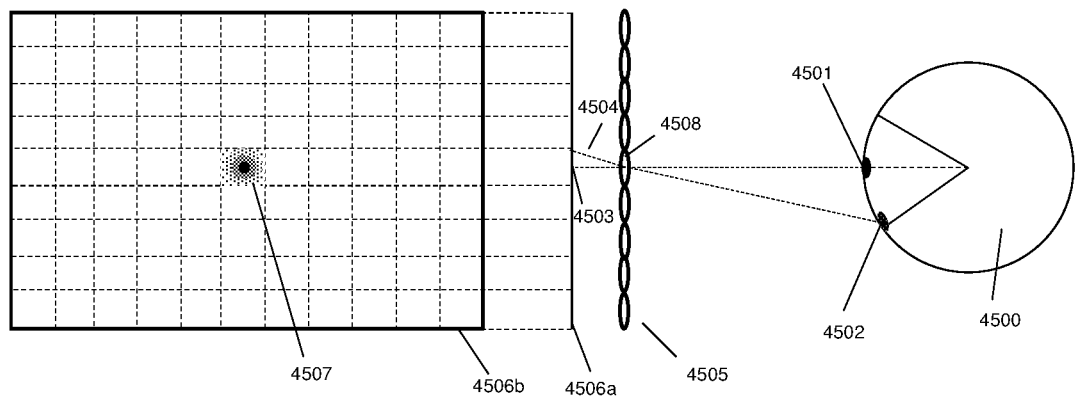
FIG. 45 is a schematic diagram showing a method for decreasing the resolution of the digital display by using the properties of the human eye resolution.

FIG. 45 shows a schematic side view of the eye 4500 with an array of lenslets 4505, and two positions of the pupil 4501 and 4502, and the digital display 4506a. The digital display is also presented in a front view 4506b, such that the density of pixels in the central cluster 4507, correspondent to the central lenslet 4508 is visible. For clarity of explanation, only this lenslet and cluster are considered, although the same concept can be applied to any lenslet. FIG. 45 shows the pupil in two positions of the pupil range. In the center pupil position 4501, the light ray coming from the central cluster of the display is normal to the pupil; in pupil position 4502, the light ray coming from the central cluster 4507 comes from the periphery of the cluster, and impinges in the eye with a peripheral angle θmax.

Let us call the function described by the dashed line in FIG. 9A or 9B, i.e. the human angular resolution, $F(\theta)$ (in cycles per degree). Considering that the distance of the display to the lenslet is approximately f, the resolution required in opixels per unit of length is given by:

$$opd(r) = \frac{2}{f}\frac{\pi}{180}F\left(\arcsin\left(\frac{2L}{E}\frac{r}{f}\right)\right)$$

where r is the distance from the center of the cluster, L is the distance from the center of the eye to the lenslets, and E is the diameter of the eye sphere. Function opd(r) provides the number of opixels that is required in each position within the cluster to meet the eye resolution.

The minimum theoretical number of opixels in a cluster required to meet the human angular resolution at any position of the cluster is given by:

$$N_{theo} = 4\int_0^{x_{max}}\int_0^{y_{max}}[opd(\sqrt{x^2+y^2})]^2 dxdy$$

where $x_{max}$ and $y_{max}$ are the horizontal and vertical semi-sides of the rectangular cluster, both of which can be approximated by d/2, where d is the lenslet pitch.

However, in practice it is interesting to compute the number of opixels in a cluster considering that the central row (at x=0) defines the addressable Data Lines (which is the row with the highest resolution requirements) and the central column (y=0) defines the addressable Select Lines (which is the column with the highest resolution requirements). With that strategy, the digital display addressing is compatible with the conventional matrix approach, as previously described. This practical number is calculated as:

$$N_{prat} = 4\int_0^{x_{max}} opd(x)dx \int_0^{y_{max}} opd(y)dy$$

Two numerical examples are presented. For both cases, L=29 mm, d=2 mm and E=26 mm. In the first numerical example (which coincides with the one used in the web addressing approach) f=7.18 mm and this human resolution matching solution leads to a reduction factor for the number of opixels of 5.2 and 10.5 times for $N_{prac}$ and $N_{theo}$, respectively. The practical 5.2 reduction factor has to be compared with the 26 factor obtained with the web addressing approach, implying that the 90 million opixels is in this case is reduced to 17 million. For the f=4.65 mm case, the 215 million opixels are reduced to 24 million.

This solution is trivially extended to all clusters, and the reduction factor is conservative since the outer region of virtual screen, which is not gazed by the eye, permits much further reductions.

TABLE 5

| f (mm) | $N_{max}$ | $N_{prac}$/reduction factor | $N_{theo}$/reduction factor |
|---|---|---|---|
| 7.18 | 112,330 | 21,751/5.2 | 10,721/10.5 |
| 4.65 | 255,216 | 28,569/8.9 | 13593/18.8 |

This reduction can be implemented in three ways: (1) by actually decreasing the number of opixels of the digital display in each cluster by making them of variable size, (2) by making them of equal size but physically interconnecting them on the circuit, and (3) by making them equal but simply simultaneously addressing the corresponding Select Lines and/or Data Lines, and placing the same averaged information on the corresponding lines. In any case, there is a decrease in the number of independent Select and Data Lines, and thus a reduction of the amount of data that it is necessary to provide to the display.

Hybrid Solution

Figure 46:
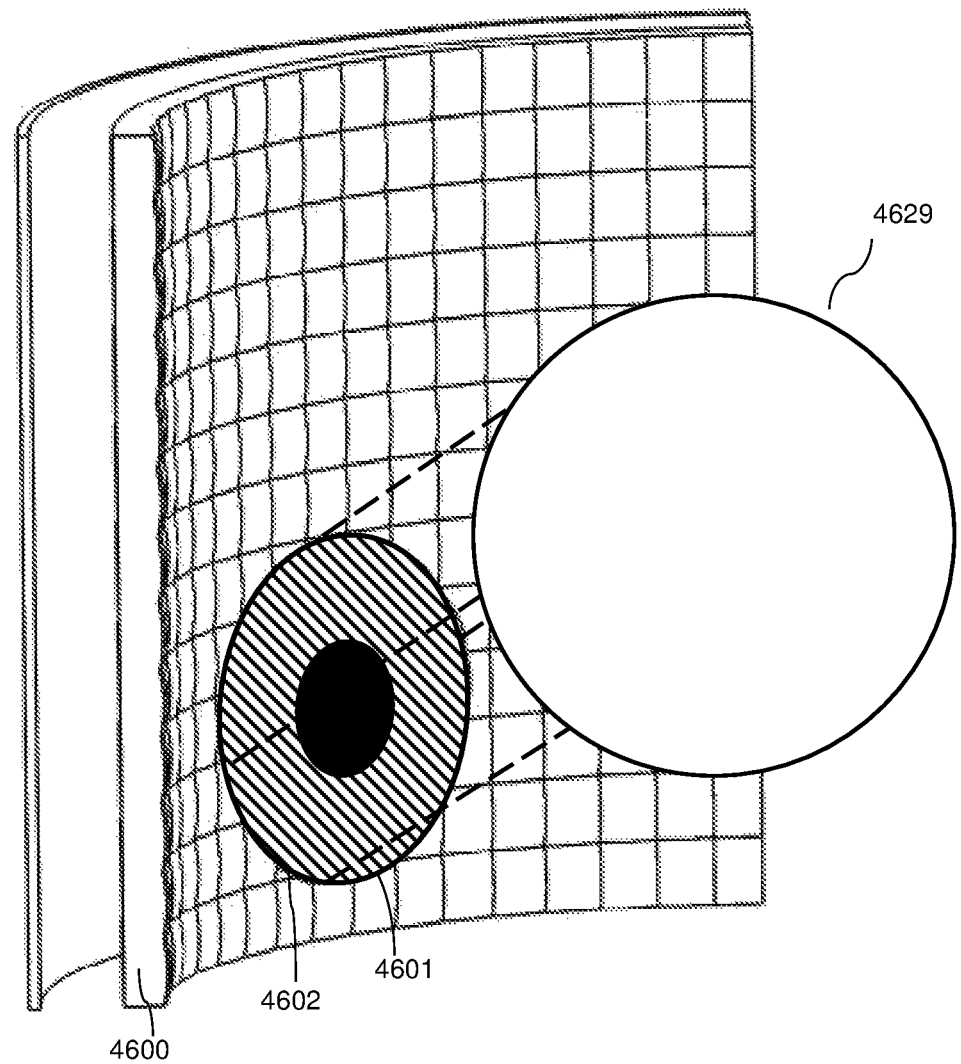
FIG. 46 shows a cylindrical lenslet array.

This hybrid solution is a combination of web addressing (section 6.9.2) and variable resolution concepts (section 6.9.3). It takes into account that the opixels in each web may have different resolution needs. If $N_{op/web}$ is the number of opixels in a web and $d^2$ is the lenslet area, then the area of the projection of the pupil range to an ipixel would be $N_{op/web}d^2$. We are implicitly assuming that the lenslet area is small compared with the pupil range area so the rounding effects in the preceding expression are negligible. Assuming this area of projection is circular, then its radius can be estimated as $R=(N_{op/web}d^2/\pi)^{1/2}$. The lenslets located approximately at the same distance from the center of such circle will have the same corresponding peripheral angle, and thus the resolution requirement on their corresponding opixels is similar. Therefore, it is possible to divide the original web into smaller radial webs each one of them gathering opixels located approximately at a constant distance to the center of that circle. Of course, we will typically get more radial webs than the webs of solution 6.9.2. FIG. 46 shows the regions on the lenslet array 4600 corresponding to two radial webs 4601 and 4602 for a certain ipixel direction, which is defined by the direction of extrusion of the pupil range from the eye 4629. In FIG. 46, the lenslet area is shown as comparable with the pupil range area for clarity. The number of opixels per radial webs $N_{op/radweb}$ can be estimated by computing the effective number of opixels after weighting by its required density for a central region of the digital display, that is:

$$N_{op/radweb} = \int_0^R \frac{1}{d^2}\left(\frac{F(\arcsin(2\rho/E)}{F(0)}\right)^2 2\pi\rho d\rho$$

For the previous examples in which eye sphere diameter E=26 mm and the lenslet side is d=2 mm, when f=7.18 mm, $N_{op/web}$=26 and $N_{op/radweb}$=1.69, while when f=4.65 mm, $N_{op/web}$=61 and $N_{op/radweb}$=1.95. The reduction factor is given by the ratio $N_{op/web}/N_{op/radweb}$, which leads to 15 for f=7.18 mm and 31 for f=4.65 mm. Therefore, this factor is superior to the practical parallel addressing matching the human angular resolution (section 6.9.3), but lower than the web addressing (section 6.9.2).

The next Table 6 summarizes the comparison of the four ways disclosed to solve the problem of addressing the high-resolution large-FOV device for examples with parameters d=2 mm, $H_{maxIN}$=50 degs, $H_{maxOUT}$=75 degs, ipixel pitch=3 arcmin, $V_{maxUP}$=$V_{maxDOWN}$=45 degs.

TABLE 6

| f (mm) | Opixels (millions) | Interlacing (k = 3) 6.9.1 | Webs 6.9.2 | Matching resolution (practical) 6.9.3 | Hybrid 6.9.4 |
|---|---|---|---|---|---|
| | | Pixels to address (millions) | | | |
| 7.18 | 90 | 10 | 3.5 | 17 | 6 |
| 4.65 | 215 | 24 | 3.5 | 24 | 7 |

It should be noticed that this addressing problem is not so critical when using a digital display of lower resolution and lower cost active matrix digital display technologies, such as IPS-LCD or LTPS OLED, of which the opixel pitch is limited to 40 microns at present. This implies that in the previous numerical example the total number of opixels would be only about $90{,}000{,}000 \times (6.2/45)^2 = 1.7$ million, similar to present full-HD technology, and therefore addressable so the webs would be managed entirely by software. However, since the focal length was 7.18 mm, the ipixel pitch would be 19 arcmin. In order to increase the ipixel resolution, the technique of interlaced ipixels disclosed above in which adjacent lenslets belong to different webs, each one associated to adjacent ipixels, can be used. For instance, if k=3, that is, the pitch between lenslets is 3d, the angular pitch of 19 arcmin in the previous example would be reduced to 19/3≈6.3 arcmin, which is believed to be acceptable for the medium resolution video gaming market.

It is within the ordinary skill in the art to combine the four types of solutions, for instance, web addressing can be applied in the gazed region of the virtual screen in combination with the parallel addressing matching the human angular resolution in the outer region of the virtual screen, which could provide a higher reduction factor than either of the two techniques separately.

Generation of Color

For simplicity, in most of the description so far, only the monochromatic solution has been described. All the concepts (as webs, clusters, etc.) apply separately for each basic RGB color, so, for instance, R clusters will not overlap (design rule R2), but R and G clusters' edges may overlap. To extend the technical solutions that were presented to a polychromatic case, three different embodiments can be used.

In one embodiment, the color can be generated with an OLED display using subpixels, that is, one opixel consists of three subpixels, Red, Green and Blue. In reality, the displays consist of three interlaced matrices of opixels, Red, Green and Blue, and each subpixel is electrically independent from each other. Each opixel appears to be a single color, combining the red, green and blue light, blurring by the optics and the limited resolution of the eye.

In another embodiment, referred to as W-RGB, a white OLED or and LCD with a backlight, where all the opixels generate the color white, can be used combined with spatially separated color filters. Alternatively, the color can be generated using the so-called W-RGBW method where, in addition to the primary RGB opixels, a fourth opixel of white color is added. White emission passes through a color filter with absorption for the Red, Green and Blue subpixels. Nevertheless, the white subpixel is not absorbed, thus the efficiency of the system is higher. This approach works because most real-world colors are near white.

The three previous embodiments described to generate color can also use the technique of subpixel rendering. This technique consists in using different subpixels of adjacent opixels to create an extra apparent opixel, which increases the apparent resolution, which is usually known as pseudoresolution (T. Tsujimura, "OLED displays: Fundamentals and Applications" Wiley, 2012).

In another embodiment, using a white OLED, a liquid crystal color filter is used controlled by software/firmware and synchronized with the OLED. The color filter changes sequentially, and at each moment the color filter passes one color, red, blue or green. The color is provided by temporal multiplexing, i.e. the switching rate is fast enough that the eye integrates the three images of the primary colors to form the images. This technique is described, for instance, by Johnson et al. in U.S. Pat. No. 5,822,021, and can be used to reach a very high resolution, because the opixel density can be increased by a factor of three.

In another embodiment, the optics can be used to generate the color. Each cluster associated with a lenslet can be monochromatic, i.e. only has pixels of one of the primary colors (RGB). Two of the neighboring clusters would have the other primary colors, and the color generation is made by spatial integration of the light passing through the eye pupil from multiple lenslets, which should be small enough to prevent color artifacts. This embodiment simplifies considerably the fabrication process, since only one cluster size color filter are used. The smaller single pixel use masks for RBG opixels patterning or color filters for each pixel (in the W-RGB and W-RGBW cases) are no longer required. Therefore, the cluster colors can be either provided using RBG patterning with the pitch of the clusters, or color filters with the pitch of the clusters for the W-RGB and W-RGBW cases), or using white digital display with color filters on the surface of each lenslet. Additionally, since no subpixels exist, the number of opixels can be decreased by a factor of three.

Figure 47:
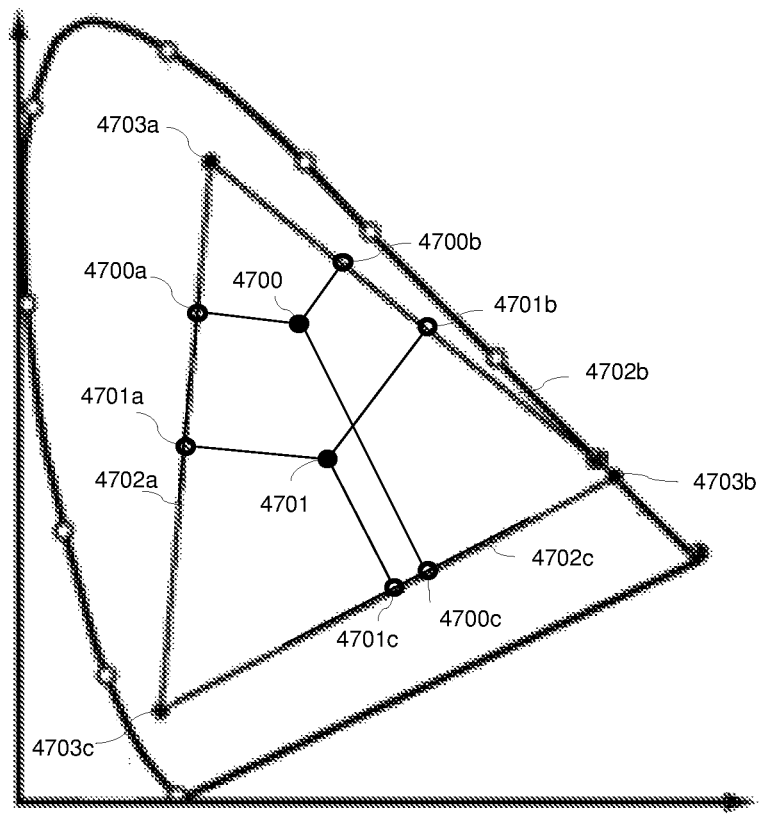
FIG. 47 is a CIE chromaticity diagram with a color gamut for bi-chromatic clusters.

In another embodiment, each cluster can be bi-chromatic, each one having a pair of the three primary colors RGB in all possible combinations (RG, GB, and RB). One advantage over the traditional color patterning is that the bi-color opixels can be patterned in stripes with one-dimensional mask alignment, which is easier than the two-dimensional alignment required for classical RGB subpixel arrangements. Similar to the monochromatic cluster case, the color generation is made by spatial integration of the light passing through the eye pupil from multiple lenslets. However, since most real-world colors are close to white, in this bi-chromatic cluster case the colors of each lenslet can be generated closer to white, and the color integration will minimize, or at least can reduce, the appearance of color artifacts. FIG. 47 demonstrates the principle, using the CIE chromaticity diagram. Points 4703*a*, 4703*b* and 4703*c* at the corners of the inner triangle correspond to Green (G), Red (R) and Blue (B) emissions, respectively. Each of the colors 4700*a*, 4700*b*, 4700*c*, 4701*a*, 4701*b* and 4701*c* along the sides of the RGB triangle is generated with the combination of only two out of the RGB colors. The colors that can be generated by only two RGB colors are defined by the sides of the triangle, lines 4702*a*, 4702*b* and 4702*c*. However, by performing spatial integration of the three points 4700*a*, 4700*b*, and 4700*c*, or 4701*a*, 4701*b* and 4701*c*, the colors 4700 and 4701, respectively can be generated, as well as any other color within the RGB triangle. The selection of the color combinations to achieve minimum distance to the color to be represented will be preferably done in the Lab color space (http://en.wikipedia.org/wiki/Lab_color_space) instead of in the CIE diagram, since in Lab color space the metric of color distances is easier to define. Additionally, since there are only 2 subpixels in each cluster, the number of opixels can be decreased by a factor of 3/2.

In another embodiment, a fast transmissive LCD (for instance, ferroelectric type) with sequential color with LED backlight can be used. In this approach, the R, G and B LEDs are turned on and off sequentially and the LCD displays the information synchronously. The same principle can be applied also to a reflective digital display, such as the LC on silicon (LCOS) or Digital Micromirror Devices (DMD), although in this case an LED thin frontlight (as those disclosed by T. Shuimizu et al. in U.S. Pat. No. 7,163,332 B2) has to be used to light the digital display.

Tracking

Multiple tracking systems are of interest to combine with the present disclosure. Position and orientation tracking is used in Virtual Environments (VEs) where the orientation and the position of a real physical object (in our case, the HMD) is required to present the VE fixed to the physical ground. To get the information about the changes in the position and orientation of this object we require the three coordinates of its position (x, y, z), and three angular coordinates namely, pitch (elevation), roll, and yaw (azimuth). Thus, six degrees of freedom (DOF) are the minimum required to fully describe the position and orientation of an object in 3-D. The response time of the head tracker is important for avoiding what is called cyber sickness.

Three types of sensors are commonly used in tracker technologies to compute the three angular coordinates. First, Magnetic sensors are divided into two groups, those that measure the complete magnetic field and those that measure vector components of the field. The vector components are the individual points of the magnetic field. Second, accelerometers are often small micro electro-mechanical systems (MEMS), and are indeed the simplest MEMS devices possible, consisting of little more than a cantilever beam with a proof mass (also known as seismic mass). Damping results from residual gas sealed in the device. As long as the Q-factor is not too low, damping does not result in a lower sensitivity. Third, gyroscopes measure the orientation vector, based on the principles of angular momentum conservation, see for example http://en.wikipedia.org/wiki/Angular_momentum.

Among the three types of sensors, gyroscopes are the most energy consuming. For this reason, a 6-axis solution (without gyroscopes) emulating a 9-axis sensor has been developed (e-compass with emulated gyro). In order to obtain the position (x, y, z), and three angular coordinates pitch (elevation), roll, and yaw (azimuth), an optical tracking system can be used, in which the glasses incorporate a constellation of infrared emitters whose emission is captured by a camera and the image is processed. Alternatively, a microcamera can be incorporated on the glasses which detects several fixed reference points in the scene located at several distances (so parallax is appreciable) as an initial calibration, and are used to compute the position and orientation of the head.

For a true immersive experience, visual information has to be complemented with acoustic information. The audio information feeding the head-set can be in 3D including the computation of the phase of the sound waves coming from a particular virtual sound source, the 3D angular response of each ear for an average human, and the processing with the head-tracking. In this option, each localized audio source is not only described by its audio signal but also with the trajectory that this source makes in the space referenced to the ground so it is possible to compute the audio channels for each ear at any position of the head.

Finally, another tracking element that can be useful consists in the dynamic adaptation of the pupil range using an eye-tracker. This allows increasing the f-number in the central lenslets of designs such as that of FIG. 33, which are particularly demanding. Prior art as US 2004/008971 uses such an eye tracker, but their microlens array is totally different from the ones referred to here. In our case, the eye-tracker will feed the eye gazing direction to the control electronic system, and an instantaneous pupil range will be computed (preferably with a diameter 20% larger than the actual pupil, to allow for tolerances and delays in the eye-tracker). Then, the cluster edges will be computed and the information sent to the digital display. An example of eye-tracking system that can be integrated in our system is based on a microcamera that looks at least one of the eyes and the analysis of the projected elliptical shape of the pupil and the iris allows estimating with enough accuracy the gazing vector, as described in A. Canessa et al. "The Perspective Geometry of the Eye: Toward Image-Based Eye-tracking", Chapter 1 in Human-Centric Machine Vision, ISBN 978-953-51-0563-3, 2012.

Specific User Corrections

The embodiments disclosed so far considered that each of the user's eyes will be looking at an image on a virtual screen, which can be a sphere of radius R. Since the preferred visualization will be stereoscopic, the represented objects will be perfectly visualized by users with normal vision when the 3D objects are positioned at the same distance as the virtual screen. When the 3D objects are further from or closer to the user than the virtual screen, the eyes will focus at the object depth and therefore a slight defocus will be perceived. This is the so-called accommodation-convergence problem usual in 3D stereo display systems.

Users affected by defects of vision can wear their ordinary spectacles or contact lenses in front of the present embodiments. However, it is also possible to design specific optics to correct for users affected by myopia of $-D$ diopters ($D>0$), just increasing the inverse of the virtual screen radius $1/R$ by the amount $1/D$. Analogously, for a user affected with hyperopia of $+D$ diopters ($D>0$) $1/R$ can be decreased by the amount $1/D$.

Alternatively, an approximate correction of myopia or hyperopia can be achieved using the lenses designed for normal vision users by just changing the distance of the digital display to the lens. Such distance can be computed by ray tracing on the lenslet to optimize the image formation on the corresponding virtual sphere image with reduced or enlarged radius. In that ray trace, the ipixel-to-opixel mapping should be also computed. Therefore, this approximate correction for myopia or hyperopia will require the adjustment of the distance from the digital display to the lens and modification of the mapping by software.

Correction of astigmatism (and combinations of astigmatism and myopia or hyperopia) can be done by considering in the design the two virtual image spheres associated to the tangential and sagittal foci and the orientation of the tangential and sagittal planes. Alternatively, the design can be performed using a standard model for the user eye and ray-tracing through it up to the retina.

Different users may also have different interpupilary distance. Obviously, the mounting can be designed to allow for adjusting the relative separation between the left and right lens and digital display sets for each individual user. Alternatively, the optical design can be done for a typical interpupilary distance as 63.5 mm, and ray traces can be performed to calculate the opixel-to-ipixel mapping corresponding to different interpupilary distances (ranging from 58 to 74 mm typically), particularly the cluster boundaries. Therefore, this approximate correction of the interpupilary distance will require the adjustment of the modification of the mapping by software. In some particular embodiments, as a two-fold design, only correcting the cluster boundaries can be an acceptable correction.

Mounting

Figure 57A:
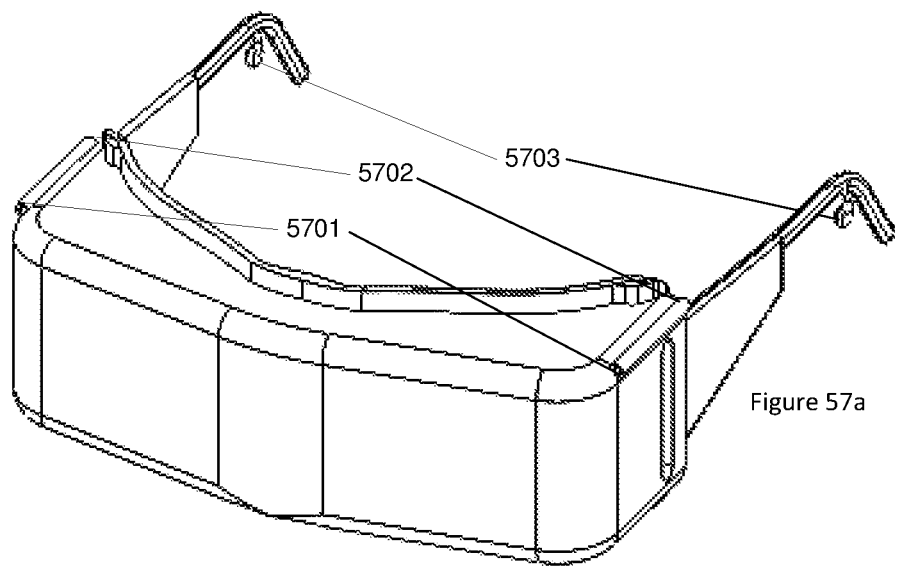
FIGS. 57a and 57b (collectively FIG. 57) show two perspective views (front and back) of a display using a pair of glasses mounting with side pieces.
Figure 57B:
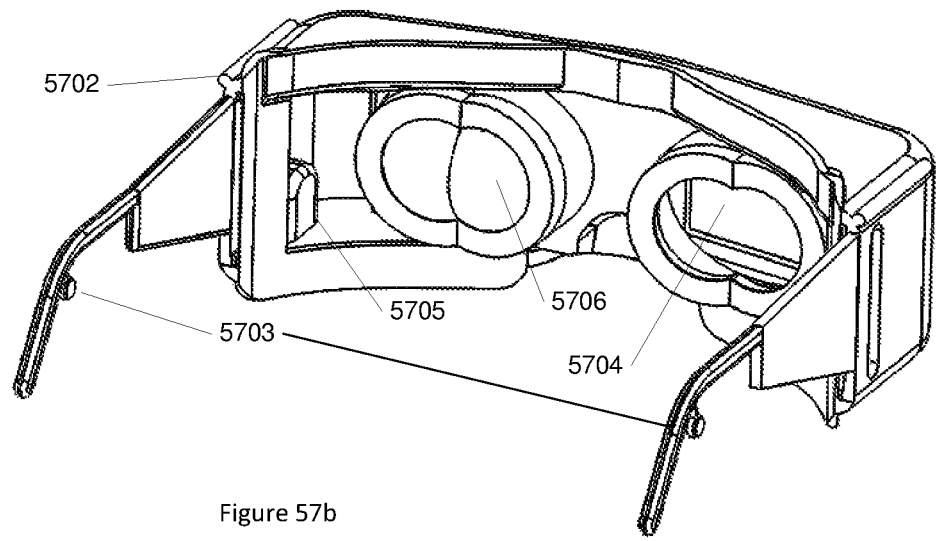
Figure 58A:
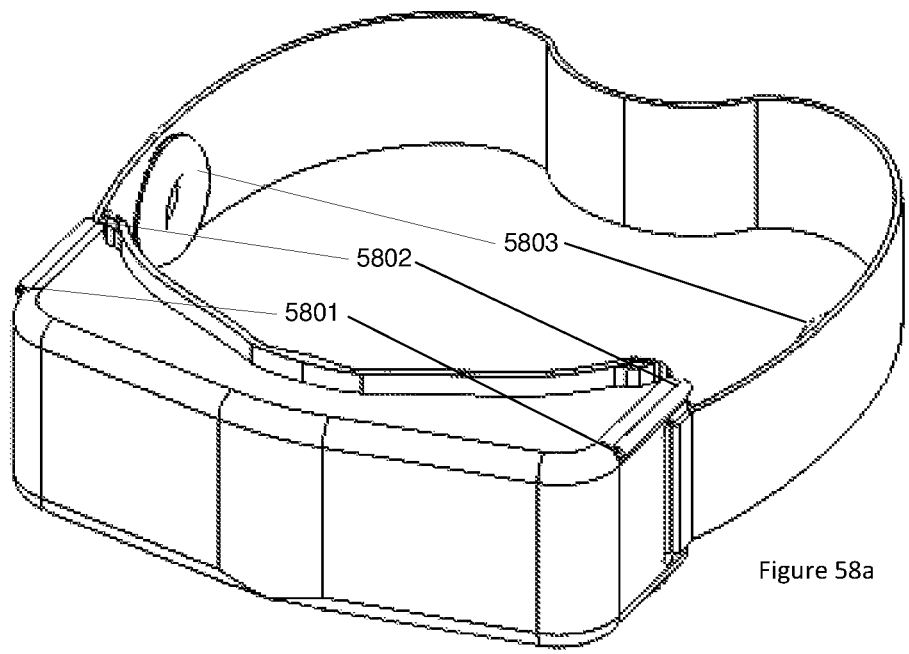
FIGS. 58a and 58b (collectively FIG. 58) show two perspective views (front and back) of a display using a goggles mounting with an elastic belt strap.
Figure 58B:
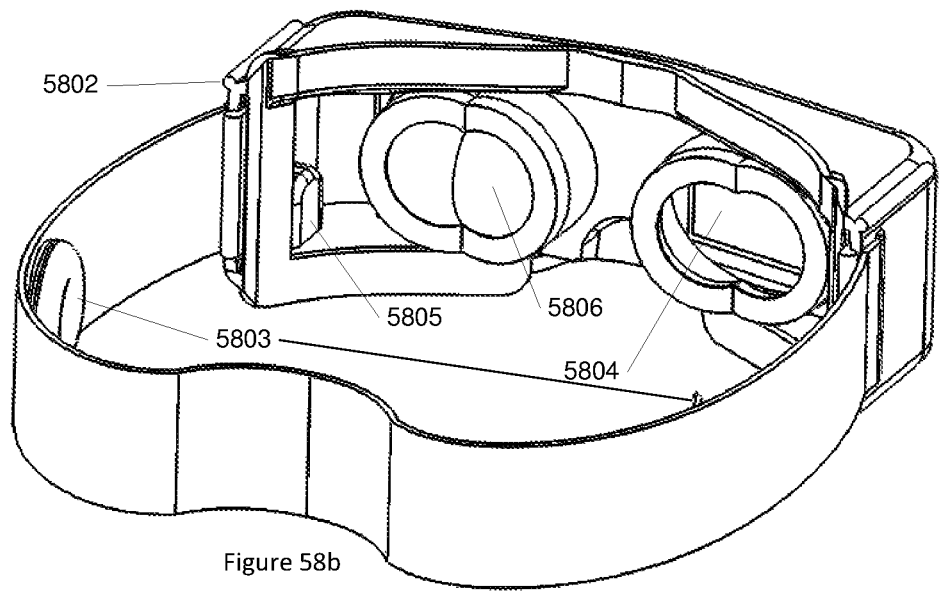

FIG. 57a shows the front view of a mounting for embodiments of the present disclosure. This mounting resembles that of conventional glasses with its side pieces that fit over the user's ears. It contains a pair of cameras 5701, a pair of microphones 5702, and also a pair of earphones 5703. FIG. 57b shows the back view of the same embodiment. The lenslet array has been removed from the right hand side to show the display 5704. This lenslet array 5706 is only shown in the left hand side display device. The head tracking system 5705 is located inside the mounting. FIG. 58 shows an embodiment using a goggle like mounting, with an elastic belt strap to fix the mounting to the head. It also contains a pair of cameras 5801, a pair of microphones 5802, and also a pair of earphones 5803. FIG. 58b shows the back view of the same embodiment. The lenslet array has been removed from the right hand side to show the display 5804. This lenslet array 5806 is only shown in the left hand side display device. The head tracking system 5805 is allocated inside the mounting.

Figure 59:
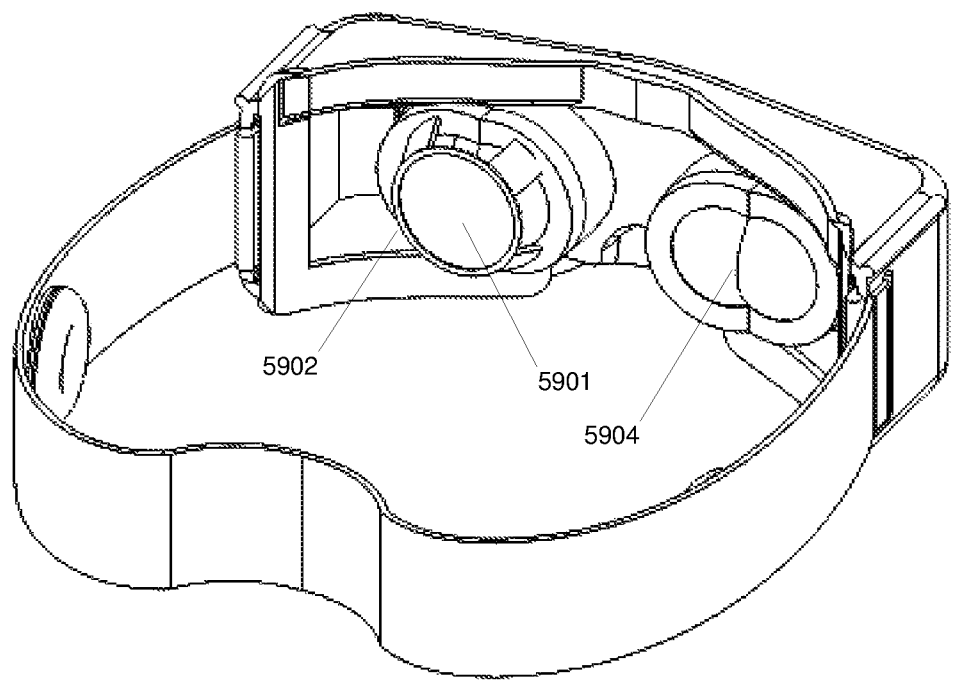
FIG. 59 shows the back side of a display using a goggles mounting that contains additional prescription glasses (only left hand side shown).

More than 60% of adults in USA wear eyeglasses. Several adaptations of the optical system of the display device can be done to fit those users who use prescription glasses as discussed in section 6.12. FIG. 59 shows one approach, in which the prescription glasses 5901 (only left hand side is shown) are integrated in the display device mounting, located between the eye and the lenslet array 5904 with the aid of mounting feature 5902.

The preceding description of the presently contemplated embodiments is not to be taken in a limiting sense, but is made merely for the purpose of illustrating the general principles. Variations are possible from the specific embodiments described. For example, although specific embodiments have been described, the skilled person will understand how features of different embodiments may be combined.

In most of this description, it was assumed for the sake of simplicity that the display is digital, and is driven by a digital electronic image processing device, but that is not limiting. It was also assumed that the display consists of an array of distinct physical elements, called "pixels," each of which is capable of producing light of a selected intensity, and preferably of a selected color, but is not capable of spatially modulating the light over the area of the pixel, so that the spatial resolution of the display is limited by the pixel width. That also is not limiting. The skilled reader will understand how the principles of the present application may be applied to other types of display, including types hereinafter to be developed.

Certain numerical examples have been given, based on the number and sizes of pixels of display devices, and the capabilities of driver hardware and software, available at the time of writing. It is expected that better displays and better drivers will become available in the future, and the skilled reader will understand how to adapt the present teachings to make use of better displays and better drivers as they become available.

The invention is therefore not limited by the above described embodiments, method, and examples, but includes all embodiments and methods within the scope and spirit of the invention. Accordingly, reference should be made to the appended claims, rather than to the foregoing specification, as indicating the full scope of the invention.

Annexes

Annex A

Figure 48:
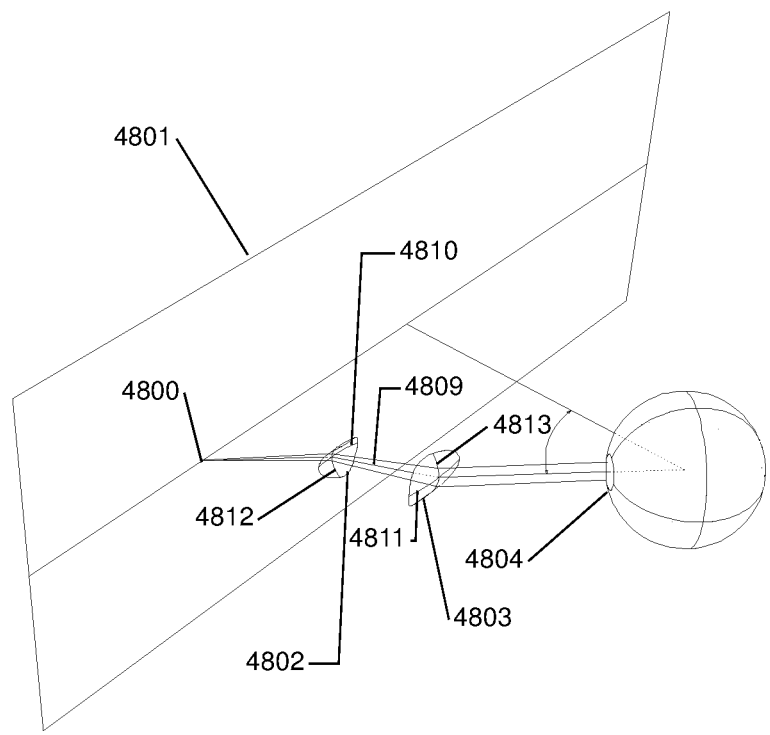
FIG. 48 is a schematic perspective view of a single freeform lens for a flat digital display.
Figure 49:
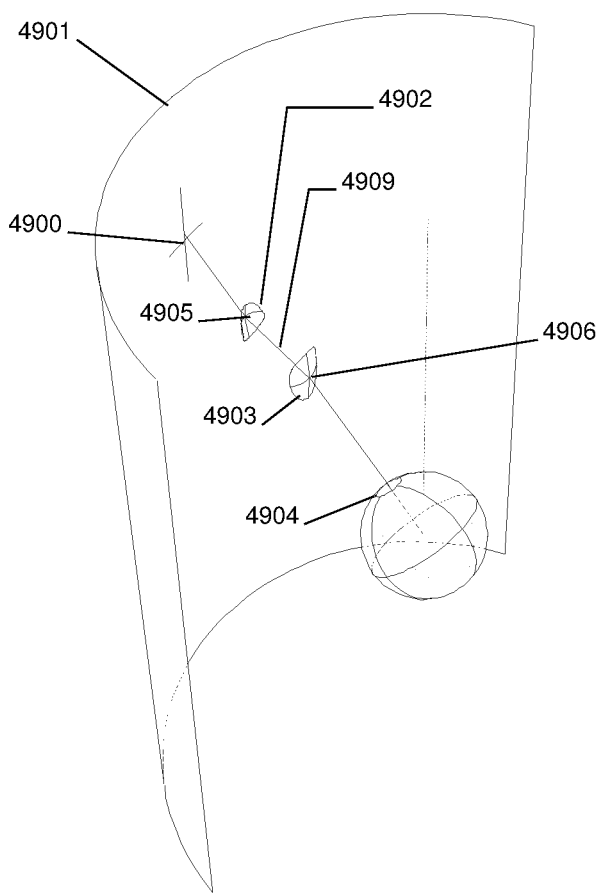
FIG. 49 is a schematic perspective view of a single freeform lens for a cylindrical digital display.

Consider the case shown in FIG. 48 where the light from an opixel 4800 of the digital display 4801 is refracted first by the refracting surface S1 4802 and second by the refracting surface S2 4803 to be directed towards the eye pupil 4804. The medium between surfaces S1 and S2 has refractive index n while the remaining media between the digital display and the eye pupil have refractive index 1. FIG. 49 shows the same case for a cylindrical digital display 4901.

The points 4905 and 4906 as well as the surface normal at these points are such that the ray coming from the center of the opixel 4900 reaches the center of the eye sphere after the refractions at the surfaces S1 and S2. This ray is called main chief ray. We are going to assume that there are a couple of surfaces S1 and S2 such that neighbor rays of the main chief ray fulfill an aplanatic condition.

Figure 50:
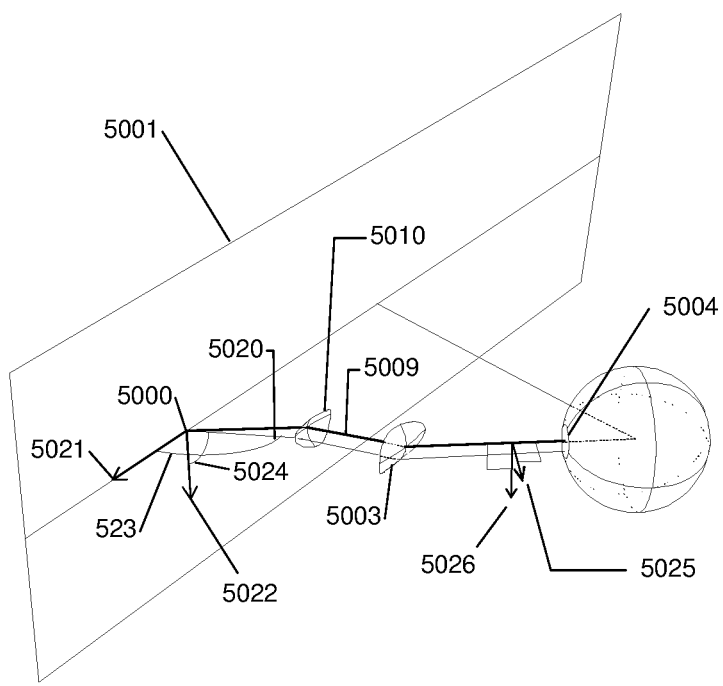
FIG. 50 is a schematic perspective view of a single freeform lens for a flat digital display.

The aplanatic condition that we are going to use is explained in FIG. 50. Consider a neighbor ray 5020 of the main chief ray 5009 issuing also from point 5000 and forming angles α 5023 and β 5024 with the orthogonal axes 5021 and 5022. These axes are contained in the digital display plane 5001 (in the case of non-flat digital display then, these axes define a plane tangent to the digital display at the point 5000). When the aplanatic condition is fulfilled, this neighbor ray exits the lenslet parallel to the main chief ray and such that its x,y coordinates with respect to two orthogonal axes (5025 and 5026) perpendicular to the exit trajectory fulfill $x=f_x \cdot (\cos(\alpha)-\cos(\alpha_{Chief}))$ $y=f_y \cdot (\cos(\beta)-\cos(\beta_{Chief}))$ where $\alpha_{Chief}$ and $\beta_{Chief}$ are the angles α and β for the main chief ray, and $f_x, f_y$ are two constants. Let us also assume that the surfaces S1 and S2 (i.e., the lenslet defined by these surfaces) have a plane of symmetry which is the plane defined by the trajectory of the main chief ray. In the example of FIG. 48, this plane coincides with a horizontal plane containing the center of the eye sphere, for easing the following explanation. In FIG. 49, the symmetry plane coincides with a vertical plane also containing the center of the eye sphere for the same reason.

We are going to calculate the two principal curvatures for each one of the refracting surfaces at the points 4905 and 4906 such that the main chief ray and its neighboring rays issuing from 4900 fulfill an aplanatic condition after the two refractions. Because of the symmetry plane of the lenslet, one of the two principal lines of curvature is the intersection of the surface and the plane of symmetry. These principal lines of curvatures are 4810 and 4811 (FIG. 48). The other lines of curvatures 4812 and 4813 are the perpendicular to the first ones. The 4 lines of curvature (2 for S1 and 2 for S2) are shown in FIG. 48 and FIG. 49.

Figure 51:
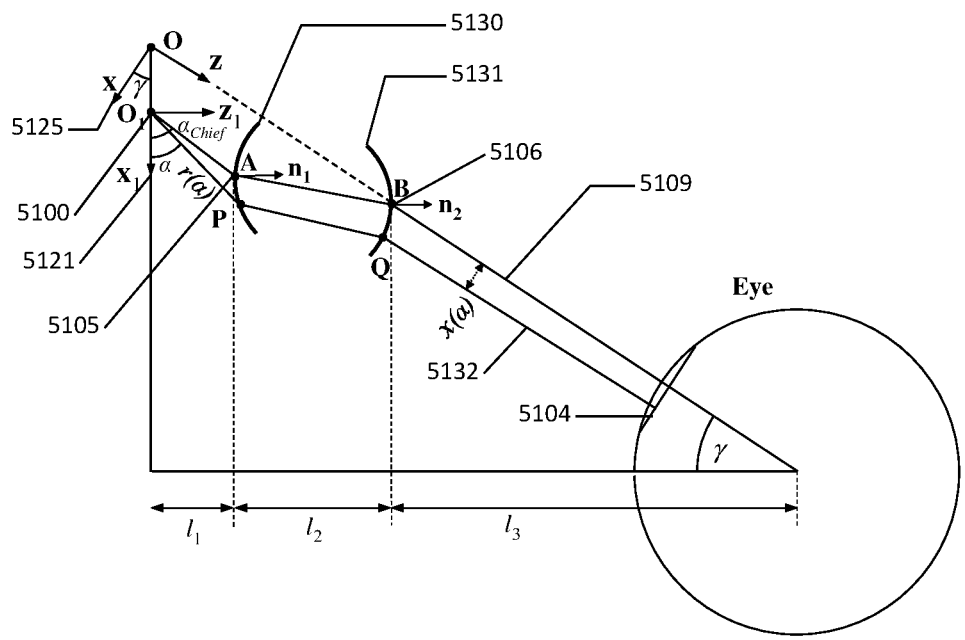
FIG. 51 is a schematic cross section of a single free form lens to show the principal curvatures of the refractive surfaces such that the main chief ray fulfills an aplanatic condition.

FIG. 51 shows the cross section of the system across the plane of symmetry of the lenslet. In order to simplify the notation of the following equations let us call A and B to the points of intersection of the main chief ray with the surfaces S1 and S2, i.e., the points 4905 and 4906 of FIG. 49, and let us call the points 4800 of FIGS. 48 and 4900 of FIG. 49, which are equivalent, $O_1$. Consider a spherical wavefront emerging from the point 5100 of FIG. 51 ($O_1$). These rays are refracted at the lenslet, formed by the two surfaces S1 and S2 (whose cross sections are 5130 and 5131) being redirected towards the eye pupil as a set of parallel rays. The refractive index of the medium between surfaces S1 and S2 is n (for example n=1.492 for acrylic material). Let us establish two coordinate systems, the first defined by vectors x and z and the point O, and the second defined by vectors $x_1$ and $z_1$ and the point $O_1$. The remaining vectors y and $y_1$ are normal to the plane of the drawing in FIG. 51. The coordinates (x,y,z) and ($x_1,y_1,z_1$) of the two systems are related by $$\begin{pmatrix} x \\ y \\ z \end{pmatrix} = \begin{pmatrix} \cos\gamma & 0 & -\sin\gamma \\ 0 & 1 & 0 \\ \sin\gamma & 0 & \cos\gamma \end{pmatrix} \begin{pmatrix} x_1 \\ y_1 \\ z_1 \end{pmatrix} + c \begin{pmatrix} \cos\gamma \\ 0 \\ \sin\gamma \end{pmatrix}$$

where c is distance between the points O and $O_1$. The aplanatic condition using variables p and q ((p=cos α and q=cos β) and taking into account the symmetry plane remains as, $$x = f_x(p-p_0)$$

$$y = f_y q$$

where $p_0 = \cos(\alpha_{Chief})$. FIG. 51 shows the generic neighbor 5132 and the chief ray 5109. Observe that, in general and unlike conventional aplanatic systems (see for instance G D Wassermann and E Wolf "*On the Theory of Aplanatic Aspheric Systems*" 1949 Proc. Phys. Soc. B 62 2. doi: 10.1088/0370-1301/62/1/302), the vectors $x_1$ (5121) and the vector x (5125) are not parallel.

The surface normal vectors at the points A and B are $n_1$ and $n_2$ respectively. After two refractions this ray coincides with the axis z. Note that in this example $\alpha_{Chief} = \pi/2 - \gamma$. Consider now other rays, for example a ray passing through the points P and Q. The optical path l from $O_1$ to a wavefront normal to z (after the two refractions) is $$l = r(p,q) + n|A-B| - z \cdot B + \text{const} = r(p,q) + n|A-B| - z(p,q) + \text{const} \quad (8)$$

where r (p,q) is the length of the vector from $O_1$ to A, i.e., $r(p,q) = |A-O_1|$ and, as said before, p, q are respectively the direction cosines with respect $x_1, y_1$ of a ray issuing from $O_1$. A and B are given by $$A = r(p,q)\{p\cos\gamma - \sqrt{1-p^2-q^2} \sin\gamma, q, p\sin\gamma + \sqrt{1-p^2-q^2}\cos\gamma\} + c\{\cos\gamma, 0, \sin\gamma\}$$

$$B = \{f_x(p-p_0), f_y q, z(p,q)\} \quad (9)$$

in the coordinate system xyz.

Along the curvature lines of surfaces S1 and S2 contained in the plane of symmetry, we have q=0. According to Fermat's principle, a light ray trajectory between any two points must be such that the optical path length is an extreme value. Therefore, when two points $O_1$ to B are fixed, then Fermat's principle implies that $\partial l/\partial p=0$ when this derivative is singled out at q=0. Similarly for the other line of curvature $\partial l/\partial q=0$ when this derivative is singled out at $p=p_0$. From these expressions we get:

$$r_p = n\frac{(A-B)}{|A-B|} \cdot A_p \quad (10)$$

$$r_q = n\frac{(A-B)}{|A-B|} \cdot A_q$$

where the partial derivatives in the preceding equations are singled out for q=0 and for $p=p_0$. This equation represents the refraction at the point A.

Similarly, the second refraction (at B) is given by:

$$z_p = n\frac{(A-B)}{|A-B|} \cdot B_p \quad (11)$$

$$z_q = n\frac{(A-B)}{|A-B|} \cdot B_q$$

where again the partial derivatives in the preceding equations are singled out for q=0 and for $p=p_0$. We can also calculate from equations (9):

$$A_p = r_p(p,0)\{p\cos\gamma - \sqrt{1-p^2}\sin\gamma, 0, p\sin\gamma + \sqrt{1-p^2}\cos\gamma\} + \quad (12)$$

$$r(p,0)\left\{\cos\gamma + \frac{p}{\sqrt{1-p^2}}\sin\gamma, 0, \sin\gamma - \frac{p}{\sqrt{1-p^2}}\cos\gamma\right\}$$

$$B_p = \{f_x, 0, z_p(p,0)\}$$

Using the last 4 equations we can eliminate $r_p$ and $z_p$ and after some calculus (derivation and rearranging terms) we can get two expressions for $A_p$ and $B_p$ as functions of (r, z, p, $p_o$, $f_x$, γ, n, c). For instance, substitute Eq. (12) into Eq. (10) and (11), solve for $r_p$ and $z_p$ and use the result to eliminate $r_p$ and $z_p$ of Eq. (12). The derivatives of these two expressions with respect p give the expression for $A_{pp}$ and $B_{pp}$ as functions of (r, $r_p$, z, $z_p$, p, $p_o$, $f_x$, γ, n, c). These two expressions ($A_{pp}$ and $B_{pp}$) can be singled out for the value $p=p_o$. Then, once we know $A_0=A(p_0,0)$ and $B_0=B(p_0,0)$, we can calculate $A_p(p_o,0)$, $B_p(p_o,0)$, $r_p(p_o,0)$, $z_p(p_o,0)$, $A_{pp}(p_o,0)$ and $B_{pp}(p_o,0)$. The curvature of a curve can be expressed as (see for instance http://en.wikipedia.org/wiki/Curvature#Local_expressions):

$$\kappa = \frac{|A_p \times A_{pp}|}{|A_p|^3} \quad (13)$$

For our case, the curvature $\kappa_1$ of the principal line of curvature (the one contained in the plane xz) of the surfaces S1 and S2 at the points $A_0$ and $B_0$ can be calculated as:

$$\kappa_{A1} = \frac{|A_p \times A_{pp}|}{|A_p|^3}\bigg|_{(p_0,0)} \quad (14)$$

$$\kappa_{B1} = \frac{|B_p \times B_{pp}|}{|B_p|^3}\bigg|_{(p_0,0)}$$

For the remaining curvature lines, the equivalents to Eq. (12) are:

$$A_p = r_p(p_0, q)\{p\cos\gamma - \sqrt{1-p_0^2-q^2}\sin\gamma, q, p\sin\gamma+\sqrt{1-p_0^2-q^2}\cos\gamma\} + r(p_0,q)\left\{\frac{q}{\sqrt{1-p_0^2-q^2}}\sin\gamma, 1, -\frac{q}{\sqrt{1-p_0^2-q^2}}\cos\gamma\right\} \quad (15)$$

$$B_q = \{0, f_y, z_q(p_0, q)\}$$

Using equations (15) with (10) and (11), we can eliminate $r_q$ and $z_q$ and after some calculus (derivation and rearranging terms) we can get two expressions for $A_q$ and $B_q$ as functions of $(r, z, p, p_o, f_x, \gamma, n, c)$. The derivatives of these two expressions with respect q give the expression for $A_{qq}$ and $B_{qq}$ as functions of $(r, r_q, z, z_q, p, p_o, f_x, \gamma, n, c)$. Then, once we know $A_0 = A(p_o, 0)$ and $B_o = B(p_o, 0)$, we can calculate $A_q(p_o, 0)$, $B_q(p_o, 0)$, $r_q(p_o, 0)$, $z_q(p_o, 0)$, $A_{qq}(p_o, 0)$ and $B_{qq}(p_o, 0)$ and finally the curvatures $\kappa_{A1}$ and $\kappa_{B1}$.

The curve defined by the intersection of the rays $p=p_0$ and the surface S1, or the curve defined by the intersection of the trajectory of these rays when they cross surface S2 are not curvature lines necessarily, although they are tangent to the curvature lines at the points $A_0$ and $B_0$. Then, the normal curvature of these lines (for the definition of normal curvature see for instance D. J. Struik "Lectures on Classical Differential Geometry" Dover, 2012) coincides with the curvature of the lines of curvature. This normal curvature is then the vector component of the curvature vector on the direction of the normal to the surface. If $\varphi_A$ and $\varphi_B$ are respectively the angles formed by the normal to the surfaces S1 and S2 with the curvature vectors, then the curvature $\kappa_2$ of the remaining principal curvature lines at the points $A_0$ and $B_0$ can be calculated as:

$$\kappa_{A2} = \cos\varphi_A \frac{|A_q \times A_{qq}|}{|A_q|^3}\bigg|_{(p_0,0)} \quad (16)$$

$$\kappa_{B2} = \cos\varphi_B \frac{|B_q \times B_{qq}|}{|B_q|^3}\bigg|_{(p_0,0)}$$

Figure 52:
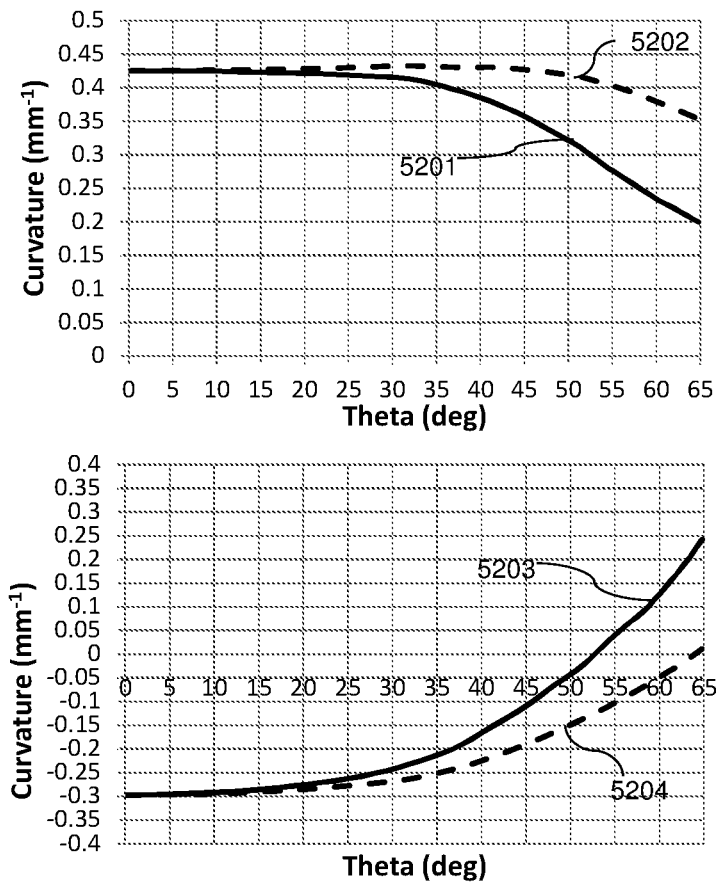
FIG. 52 shows the calculated curvatures for both surfaces of a single lenslet as a function of the peripheral angle.

As an example, FIG. 52 shows the calculated curvatures (in 1/mm units) for specific designs as a function of the peripheral angle at which the center of each lenslet is viewed when the eye is looking frontwards. The parameters of the design for all lenslets in this example are f=4 mm, lenslet material PMMA, the normal vectors to surfaces S1 and S2 at the intersection points of the main chief ray perpendicular to the digital display, and the distance of those points to the digital display are 2 and 7 mm, respectively. Line 5201 and 5202 are the $\kappa_{A1}$ and $\kappa_{A2}$ curvatures of surface S1, respectively. Lines 5203 and 5204 are the $\kappa_{B1}$ and $\kappa_{B2}$ curvatures of surface S2, respectively.

Annex B

Figure 53:
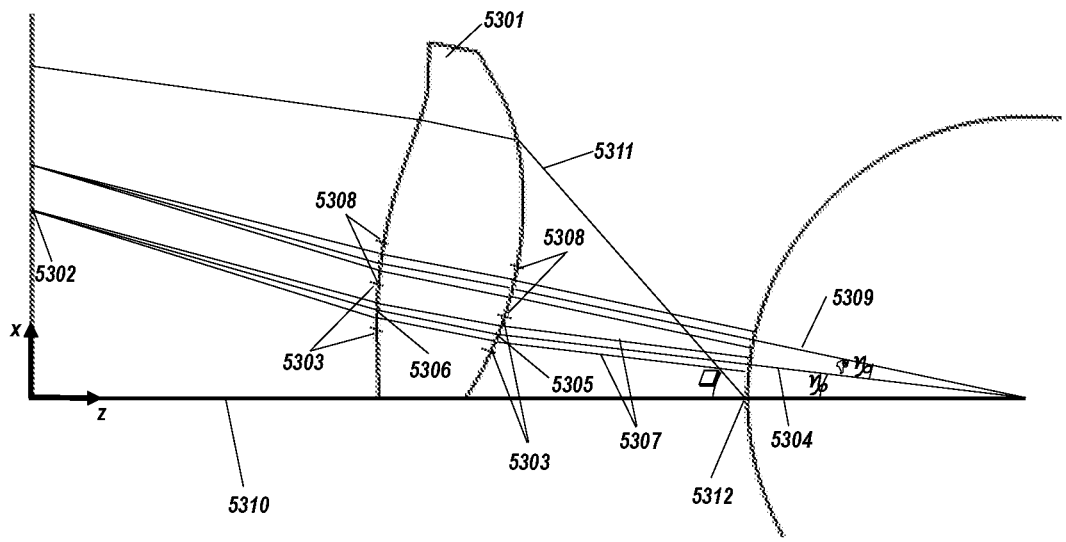
FIG. 53 explains in 2D the design of each lenslet.

FIG. 53 shows the cross-section of one large lenslet 5301 across the plane of symmetry. Analogously to the case explained in Annex A, the light from opixel 5302 of the digital display is refracted by surfaces S1 and S2 and directed towards the eye pupil. The profiles of the lens cross section at y=0 are designed as a first-order continuous union of very small parabolic segments 5303 (for instance, the lenslet in FIG. 53 is composed of over 60 segments, but cannot be perceived since they are very small and there are not discontinuities between them). Each segment has been designed using the procedure explained in Annex A. Since they are very small, the second order approximation given by the calculation of two lens curvatures derived in Equations (1)-(6) of Annex A and described in FIG. 51 defines perfectly the entire shape of these segments.

Consider now the design of one of the segments 5303. As explained in 6.14.1 Annex A, once we define the position of opixel 5302, main chief ray 5304, points at which the main chief ray intercepts refractive surfaces 5305 and 5306, and values for $f_x$ and $f_y$ (which can be prescribed to vary along the lenslet shape), we are able to build small segments 5303 in the neighborhood of intersection points 5305 and 5306. For this purpose, the two principal curvatures for each one of the refracting surfaces at the points 5305 and 5306 are calculated, such that the main chief ray 5304 and its close parallel rays 5307 are focused on point 5302 after the two refractions, guaranteed in this approximation order by Equations (8) to (15). Besides these conditions, the condition of the smoothness of the macro lens is imposed as well. This means that two consecutive segments (e.g. 5303 and 5308) will have the same slope at their union. The size of any segment is defined by the angular extension $\Delta\gamma$ between two consecutive main chief rays (e.g. 5304 and 5309, not to scale). FIG. 53 shows the case when the angle $\Delta\gamma$ is 0.5°.

Figure 54:
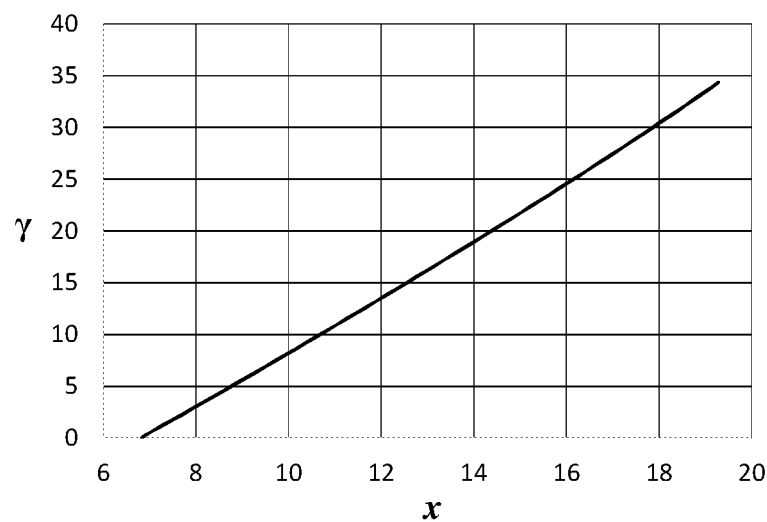
FIG. 54 describes the mapping γ(x) between opixels and ipixels.

Let us establish a coordinate system where the x axis coincides with the digital display (the axis y is perpendicular to the cross-section plane). Let also define the angle $\gamma$ as the angle between the main chief ray (e.g. 5304) and the optical axis 5310. Different choices of function $f_x(x)$ ($f_x$ is now variable along the lens) lead to different designs and different mapping between opixels and ipixels. Since each segment is an aplanatic lens, then $f_x = \Delta x/\Delta\gamma$ is fulfilled in a neighborhood of the opixel (e.g. 5302). After integrating the last term along the lens one gets the mapping $x(\gamma)$, and $\gamma(x)$ as well. By proper choice of function $f_x(x)$, different mappings of interest can be achieved. For the design presented in FIG. 53, the corresponding mapping is given in FIG. 54.

Besides the 2D shape of the anastigmatic lens in the plane of symmetry y=0, the procedure provides information of another principal curvature (in the direction perpendicular to the plane of symmetry) of the lens, which is also variable along the lens. These transversal curvatures are obtained as a function of x using the same procedure explained in the previous section by prescribing the function $f_y(x)$ (now also $f_y$ is in general variable along x). Therefore, we get all the information needed to express the freeform surfaces with an equation of the type:

$$z(x,y) = c_0(x) + c_1(x)y^2 \quad (17)$$

Where $c_0(x)$ is a polynomial fitting of each profile in FIG. 53, and $c_1(x)$ is ½ of the transversal curvatures, and this makes a good starting point for the freeform surface optimization described in Section 6.6.1.

The angle between the ray 5311 coming from the fixed eye pupil 5312 and the optical axis 5310 is used to define the field of view of the system as twice that angle when ray 5311 hits the rim of the display. A desired field of view can be obtained by proper selection of function $f_x(x)$.

We claim:

1. A display device comprising:
   a display, operable to generate a real image comprising a plurality of object pixels; and
   an optical system, comprising an array of a plurality of lenslets, arranged to generate an immersive virtual image from the real image, the immersive virtual image comprising a plurality of image pixels, by each lenslet projecting light from the display to a respective pupil range, wherein the lenslets comprise at least two lenslets that cannot be made to coincide by a simple translation rigid motion;

wherein the pupil range comprises an area on the surface of an imaginary sphere of from 21 to 27 mm diameter, the pupil range including a circle subtending 15 degrees whole angle at the center of the sphere;

wherein the object pixels are grouped into clusters, each cluster associated with a lenslet, so that the lenslet produces from the object pixels a partial virtual image comprising image pixels, and the partial virtual images combine to form said immersive virtual image;

wherein imaging light rays falling on said pupil range through a given lenslet come from pixels of the associated cluster, and said imaging light rays falling on said pupil range from object pixels of a given cluster pass through the associated lenslet;

wherein said imaging light rays exiting a given lenslet towards the pupil range and virtually coming from any one image pixel of the immersive virtual image are generated from a single object pixel of the associated cluster.

2. A display device according to claim 1, wherein the array is placed at a distance from the imaginary sphere between 5 and 40 mm, the array subtending a solid angle from the closest point of the imaginary sphere comprising a cone with 40 degs whole angle, wherein the display is on a side of the array remote from the imaginary sphere, at a distance from the array of no more than 80 mm.

3. A display device according to claim 2, wherein the array is placed at a distance from the imaginary sphere between 10 and 20 mm, the array subtending a solid angle from the closest point of the imaginary sphere comprising a cone with 50 degs whole angle, wherein the display is on a side of the array remote from the imaginary sphere, at a distance from the array of no more than 40 mm.

4. A display device according to claim 1, wherein the partial virtual images combined to form said immersive virtual image are interlaced.

5. A display device according to claim 1, wherein the rays directed towards the pupil range and virtually coming from at least one image pixel of the immersive virtual image are generated from a plurality of object pixels, each of which object pixels belong to different clusters.

6. A display device according to claim 5, wherein the rays directed towards the pupil range and virtually coming from more than 10% of the image pixels of the immersive virtual image are generated from a plurality of object pixels, each of which object pixels belong to different clusters.

7. A display device according to claim 5, wherein the object pixels generating the rays towards the pupil range and virtually coming from any one image pixel of the virtual image are operated such that said object pixels are caused to display the same information.

8. A display device according to claim 7, wherein the object pixels generating the rays towards the pupil range and coming from any one image pixel of the virtual image are electrically connected together in series or parallel.

9. A display device according to claim 7, further comprising a display driver that addresses the object pixels generating the rays towards the pupil range and coming from any one image pixel of the virtual image with the same information to display.

10. A display device according to claim 1, wherein at least one lenslet aperture encloses a 2 mm diameter circle.

11. A display device according to claim 1, wherein the virtual image is consistent as seen from all positions within the pupil range, without adjustment responsive to pupil tracking.

12. A display device according to claim 1, wherein the display is part of a spherical shell, concentric with said imaginary sphere, and wherein the lenslet array is formed by lenslets all of them lying on another spherical shell concentric with the display, wherein the lenslets are superposable so that the overlapping parts of their optically active surfaces coincide.

13. A display device according to claim 1, wherein the display is a cylindrical shell, that cylinder having an axis that passes through the center of the imaginary sphere, wherein the lenslet array is formed by lenslets all of them lying on another cylindrical shell coaxial with the display, and wherein the optically active surfaces or the lenslets have cross-sections in planes perpendicular to the axis of the cylinder that are superposable so that the overlapping parts of the optically active surfaces coincide.

14. A display device according to claim 1, wherein the display is flat.

15. A display device according to claim 1, further comprising a mounting operative to maintain the device in a substantially constant position relative to a normal human head with one eye at the position of the imaginary sphere.

16. A display device according to claim 1, further comprising a second said display device, a mounting to position the first and second display devices relative to one another such that the positions of the respective imaginary spheres match the relative positions of the two eyes of a human being, and a display driver operative to cause the two displays to display objects such that the two virtual images combine to form a single image when viewed by a human observer with eyes at the positions of the respective imaginary spheres.

17. A display device according to claim 16, wherein the mounting is operative to maintain the device in a substantially constant position relative to a human head with the eyes at the positions of the two imaginary spheres.

18. A display device according to claim 16, wherein the mounting includes mounting features to hold corrective lenses in front of users' eyes with a defect of vision.

19. A display device according to claim 16, wherein the first and second displays form a single display.

20. A display device according to claim 1, arranged to produce partial virtual images each of which contains a part projected by an eye onto a 1.5 mm fovea of said eye when said eye is at the position of the imaginary sphere with its pupil within the pupil range, said part of each said virtual image having a higher resolution than a peripheral part.

21. A device according to claim 1, further comprising a camera and a display driver operative to reproduce on the display an image captured by the camera.

22. A device according to claim 1, further comprising a head-tracking device and a display driver operative to reproduce on the display an image fixed to the physical ground.

23. A display device according to claim 1, further comprising a system to adjust the distance from the array of lenslets to the digital display to compensate for interpupillary distance or defects of vision of the user.

* * * * *